US010389976B2

(12) United States Patent
Nishi et al.

(10) Patent No.: US 10,389,976 B2
(45) Date of Patent: Aug. 20, 2019

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventors: Tomohiro Nishi, Tokyo (JP); Masato Akao, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,519

(22) PCT Filed: Jan. 12, 2017

(86) PCT No.: PCT/JP2017/000778
§ 371 (c)(1),
(2) Date: Jul. 27, 2018

(87) PCT Pub. No.: WO2017/141584
PCT Pub. Date: Aug. 24, 2017

(65) Prior Publication Data
US 2019/0014288 A1 Jan. 10, 2019

(30) Foreign Application Priority Data
Feb. 16, 2016 (JP) ................................ 2016-026487

(51) Int. Cl.
H04N 7/15 (2006.01)
H04N 7/14 (2006.01)
H04N 5/272 (2006.01)

(52) U.S. Cl.
CPC ................. H04N 7/15 (2013.01); H04N 7/14 (2013.01); H04N 7/147 (2013.01); H04N 5/272 (2013.01)

(58) Field of Classification Search
CPC .......... H04N 7/15; H04N 7/14; H04N 5/2628; H04N 7/147; G06F 3/013
(Continued)

(56) References Cited

U.S. PATENT DOCUMENTS

2011/0085017 A1* 4/2011 Robinson ............ H04L 12/1827
348/14.08
2012/0274736 A1* 11/2012 Robinson ................. H04N 7/15
348/14.16
2015/0085056 A1* 3/2015 Van Broeck ............ G06F 3/013
348/14.1

FOREIGN PATENT DOCUMENTS

JP 07-030877 A 1/1995
JP 07030877 A * 1/1995
(Continued)

OTHER PUBLICATIONS

International Search Report and Written Opinion of PCT Application No. PCT/JP2017/000778, dated Mar. 7, 2017, 16 pages of ISRWO.

Primary Examiner — Melur Ramakrishnaiah
(74) Attorney, Agent, or Firm — Chip Law Group

(57) ABSTRACT

To achieve a configuration enabling identification of to which viewing user the displayed user displayed on the display unit is speaking. The configuration includes a display image generation unit that generates dialog pair identification information enabling identification of to which viewing user among the plurality of viewing users the displayed user on the display unit is speaking, and outputs the generated information together with the displayed user, to the display unit. The display image generation unit generates, as the dialog pair identification information, an arrow or an icon, a face surrounding frame or a face side line, a virtual viewpoint background image or the like, directed from the displayed user forming the dialog pair to the viewing user forming the dialog pair, and displays the generated dialog pair identification information together with the displayed user, on the display unit.

18 Claims, 43 Drawing Sheets

(58) Field of Classification Search
USPC .......................................... 348/14.01–14.16
See application file for complete search history.

(56) References Cited

FOREIGN PATENT DOCUMENTS

| | | | |
|---|---|---|---|
| JP | 3139100 | B2 | 2/2001 |
| JP | 3289730 | B2 | 6/2002 |
| JP | 2012-070081 | A | 4/2012 |
| JP | 2012070081 | A * | 4/2012 |
| JP | 2012-088538 | A | 5/2012 |
| JP | 2013-070081 | A | 4/2013 |
| JP | 2014-096701 | A | 5/2014 |

* cited by examiner

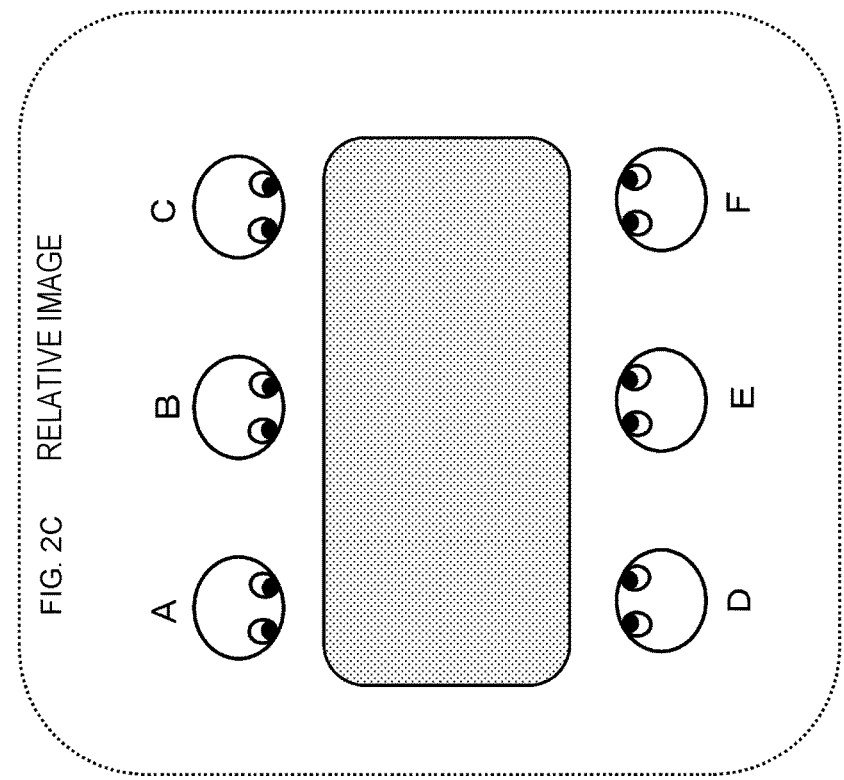
FIG. 2C  RELATIVE IMAGE
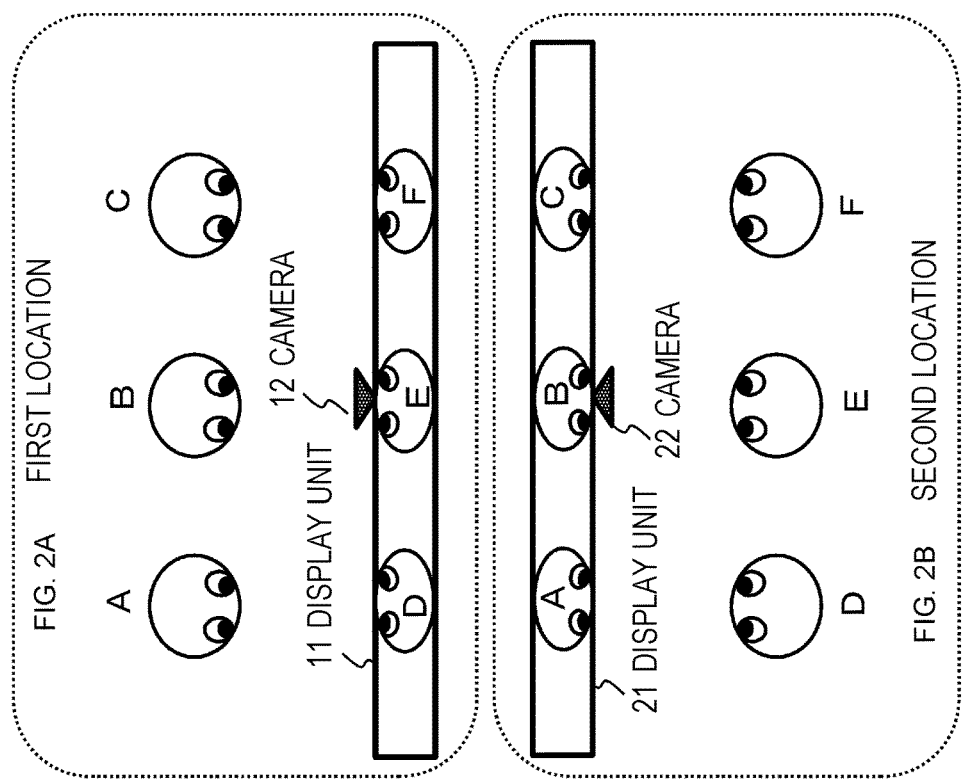
FIG. 2A  FIRST LOCATION
FIG. 2B  SECOND LOCATION

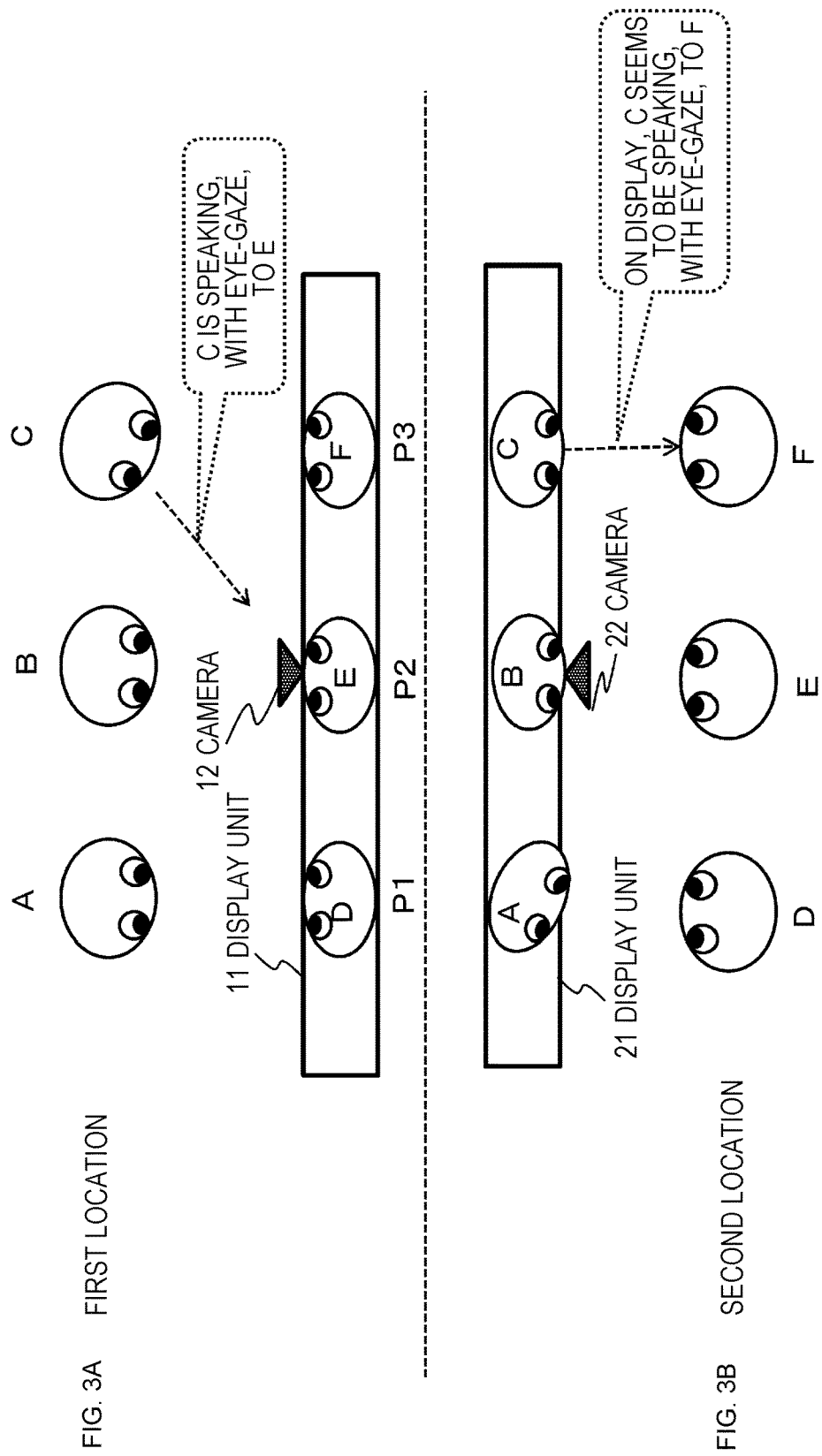

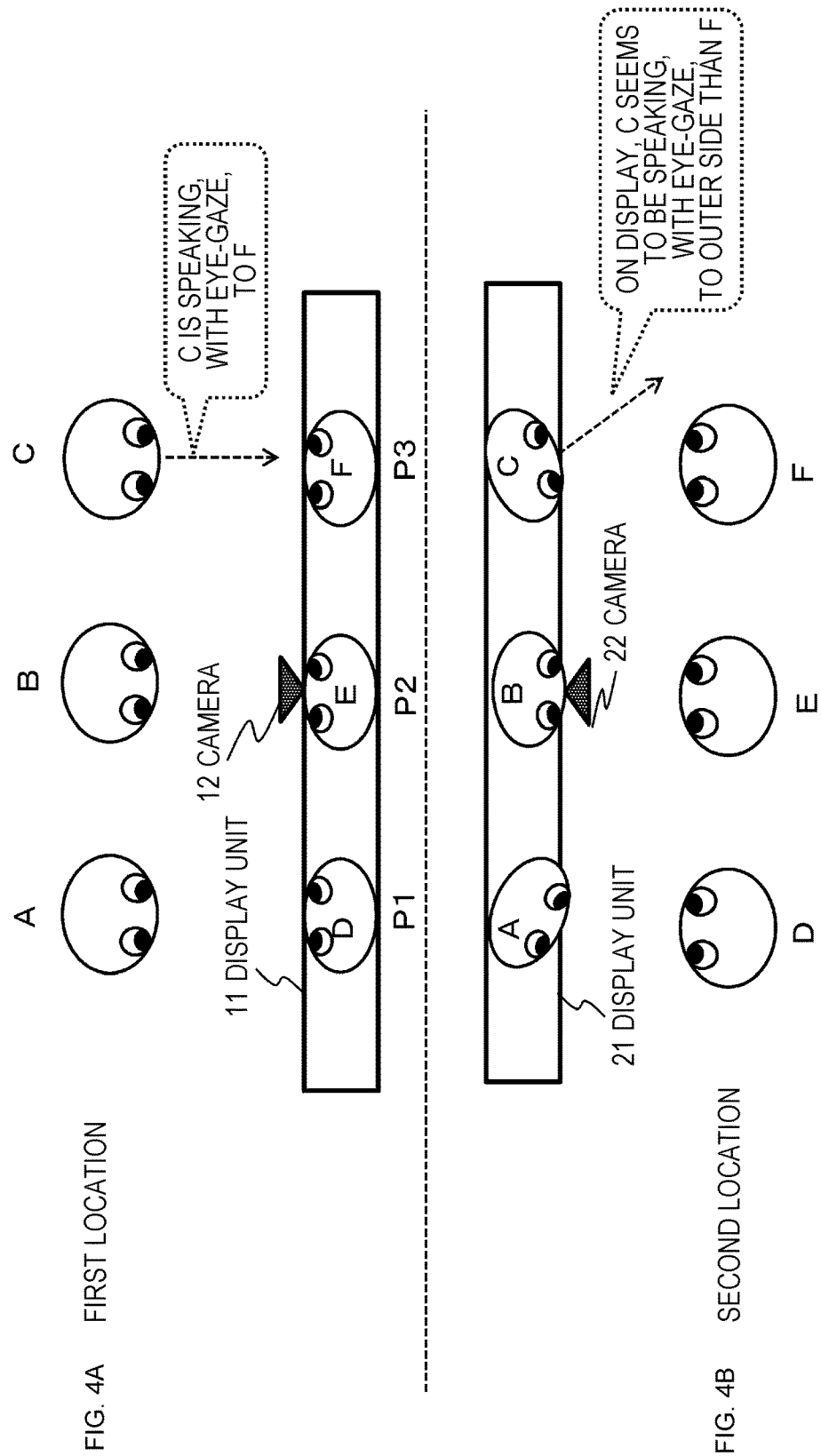

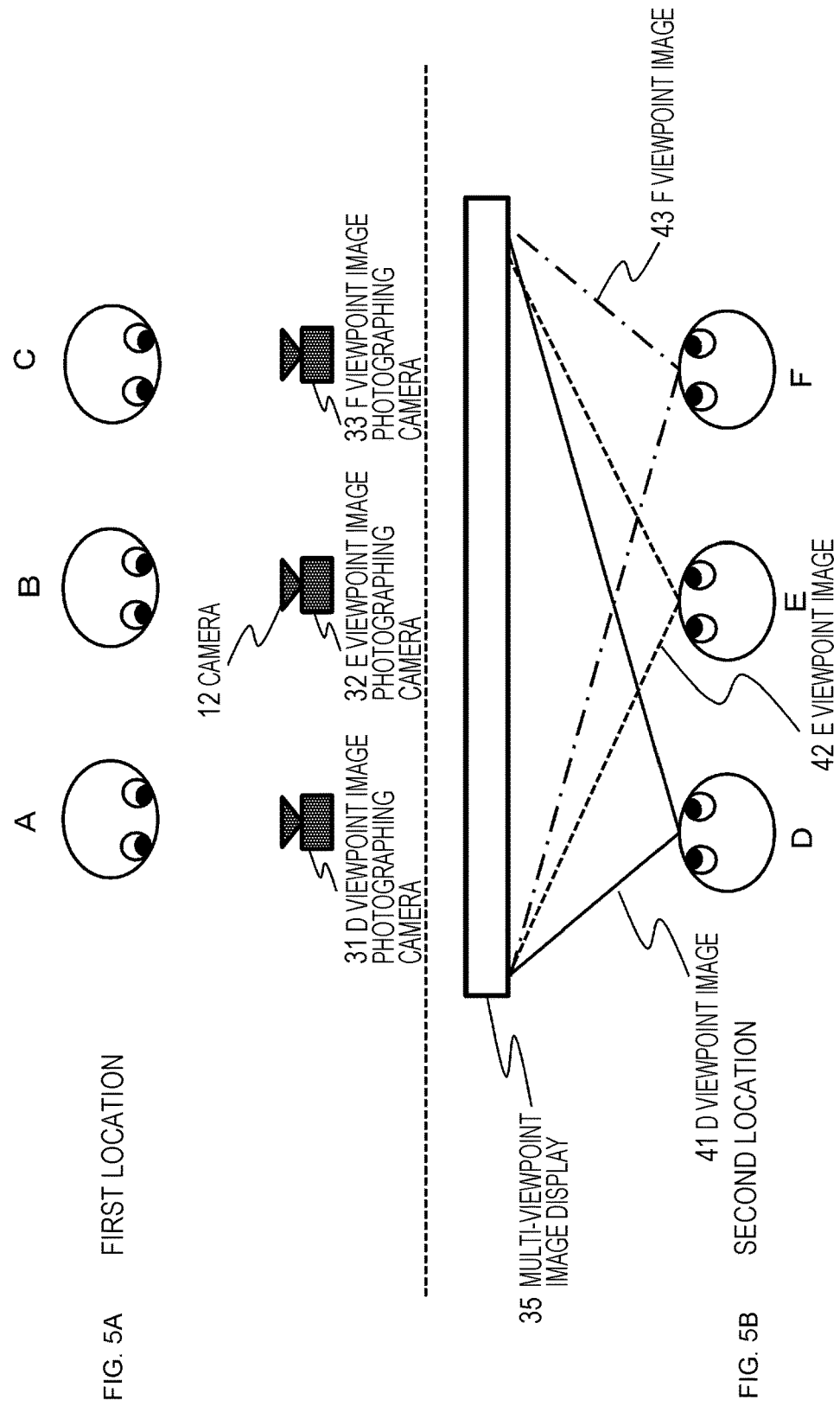

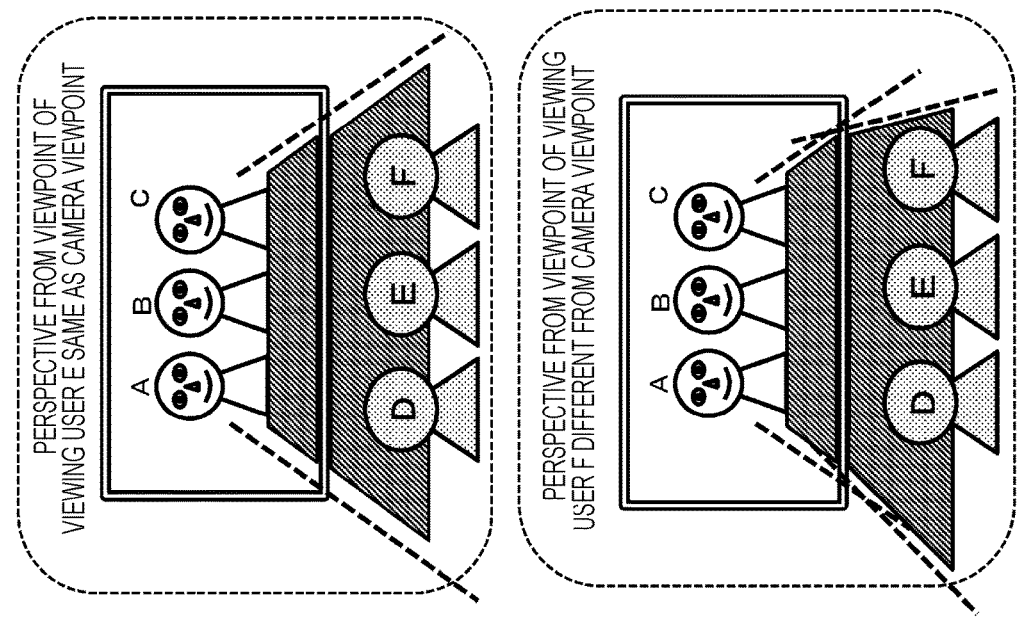
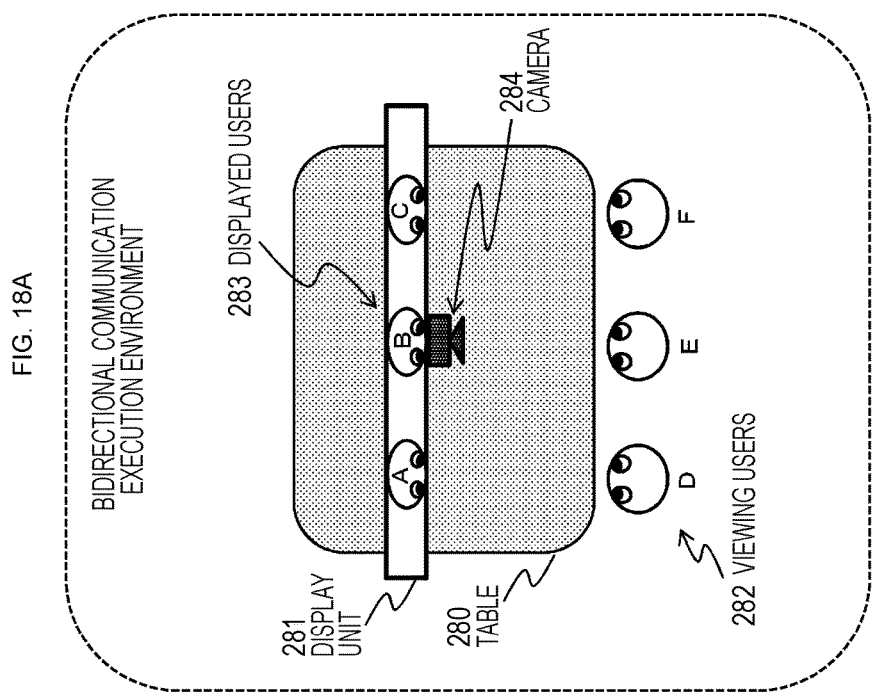

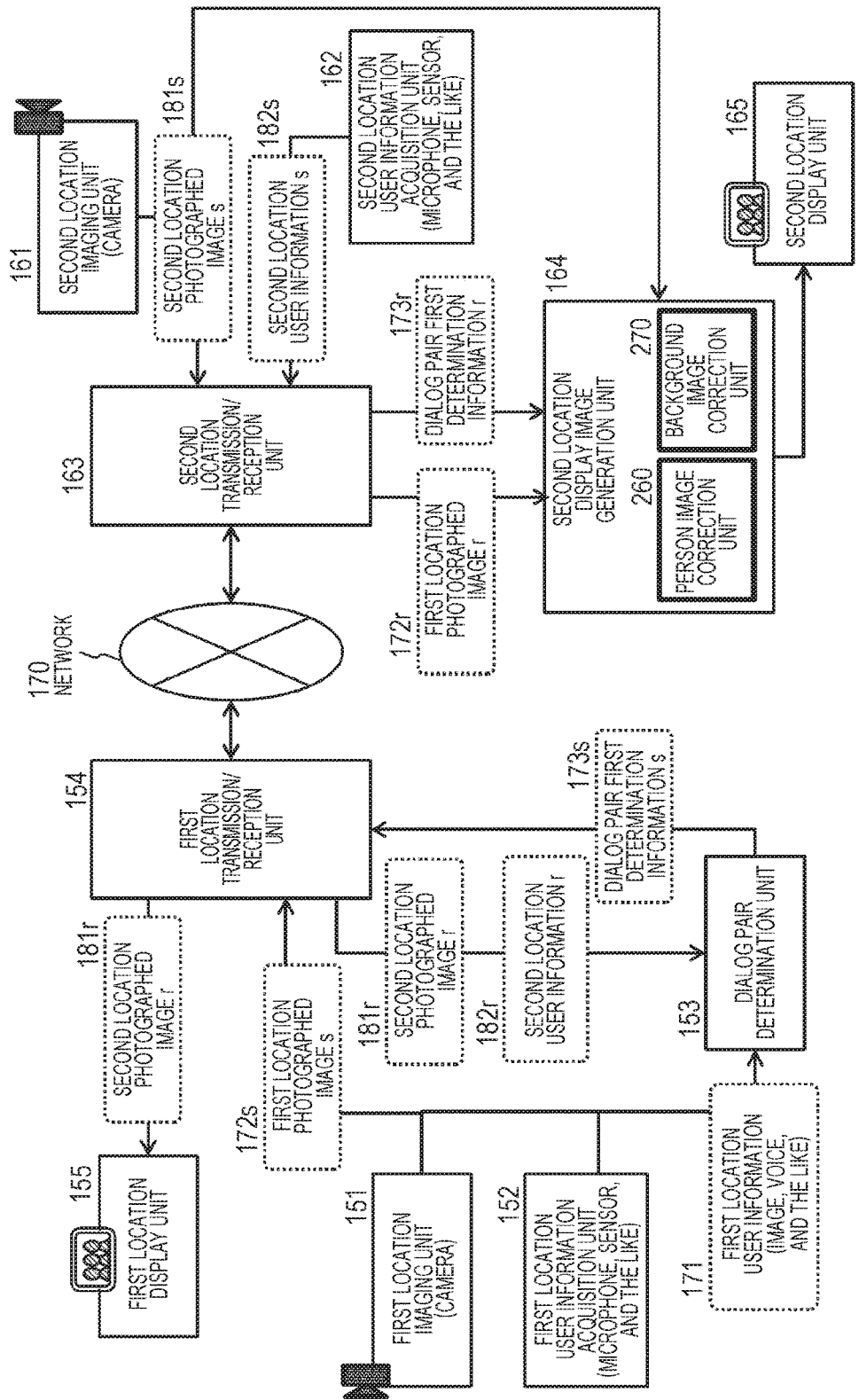

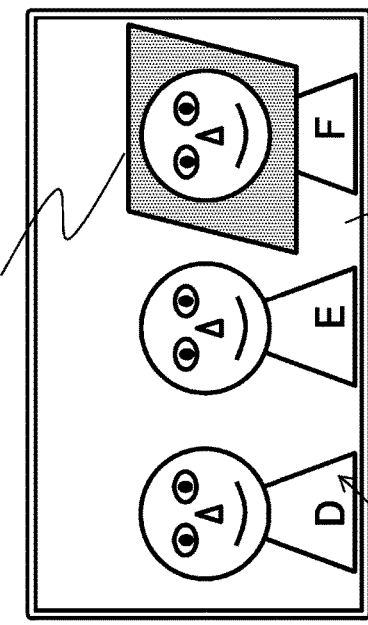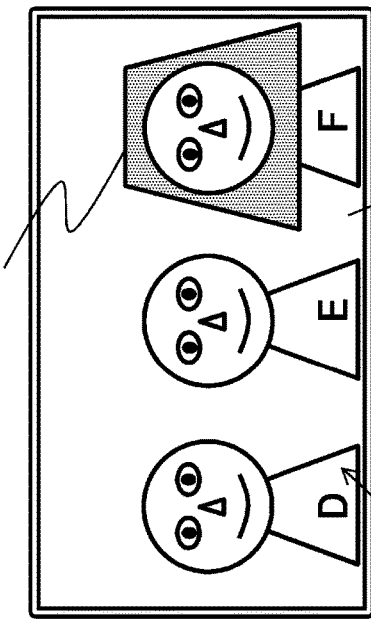

FIG. 23B

FACE SURROUNDING FRAME CALCULATION EXAMPLE

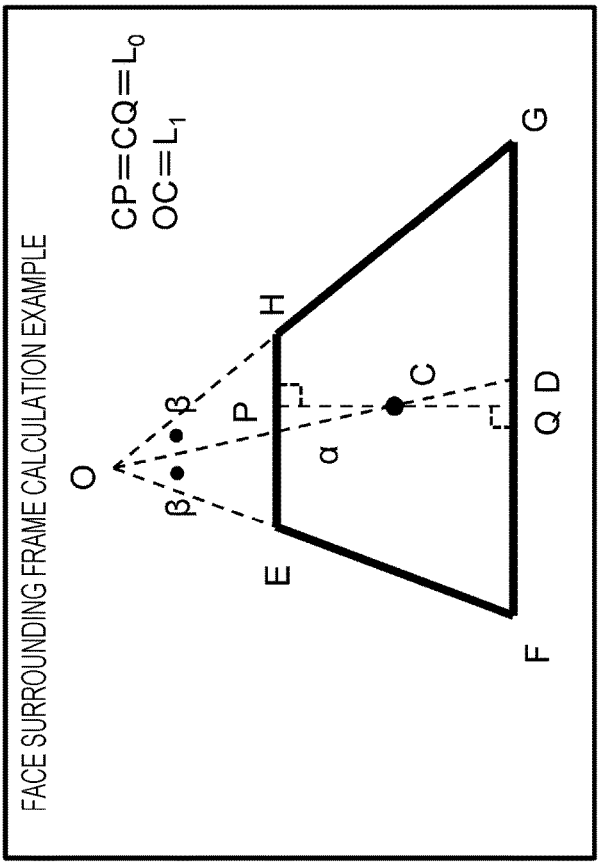

EXAMPLE OF DIALOG PAIR

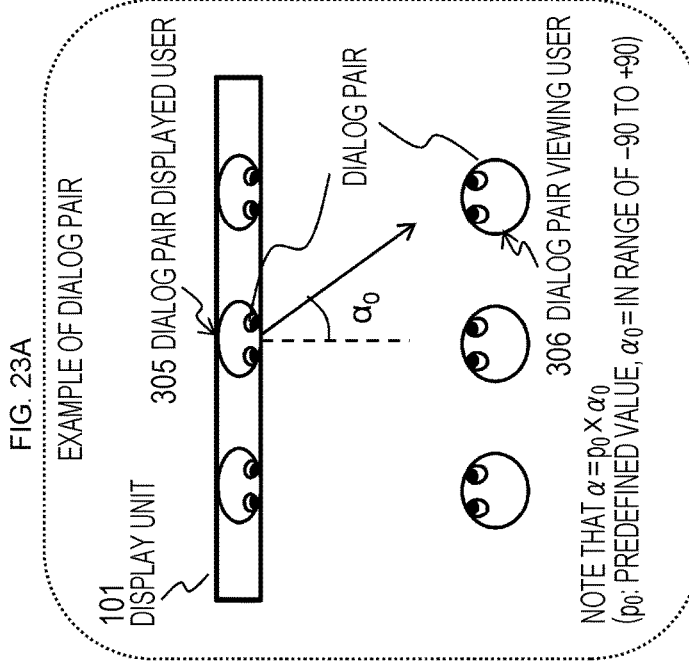

NOTE THAT $\alpha = p_0 \times \alpha_0$
($p_0$: PREDEFINED VALUE, $\alpha_0$ = IN RANGE OF −90 TO +90)

FIG. 23C

FACE SURROUNDING FRAME CALCULATION PROCEDURE

DEFINE CENTER POSITION OF FACE OF DISPLAYED USER OF DIALOG PAIR AS C,
DEFINE POINTS VERTICALLY AWAY FROM C BY PREDEFINED DISTANCE $L_0$ AS P AND Q.
DISTANCE OF OC = $L_1$, AND ANGLE $\beta$ IS DEFAULT VALUE.

(s1) CALCULATE INCLINATION ANGLE $\alpha$ FROM POSITIONAL RELATIONSHIP OF DIALOG PAIR.
(s2) OBTAIN POINT O IN UPPER POSITION FROM POINT C BY PREDEFINED DISTANCE $L_1$ ON LINE SHIFTED BY ANGLE $\alpha$.
(s3) DRAW LINES OF AND OG SHIFTED FROM O BY ANGLE $\beta$.
(s4) DEFINE EFGH SURROUNDED BY PARALLEL LINES PASSING THROUGH P AND Q,
    AND BY LINES OF AND OG AS FACE SURROUNDING FRAME EFGH.

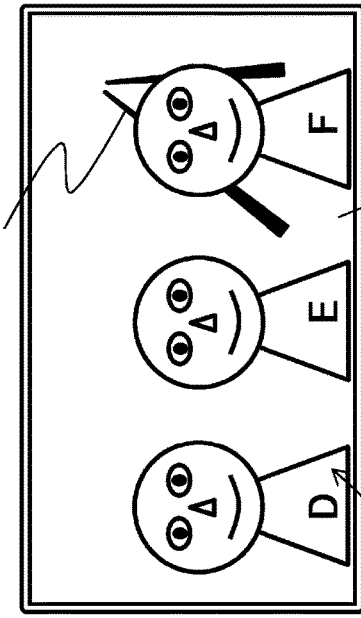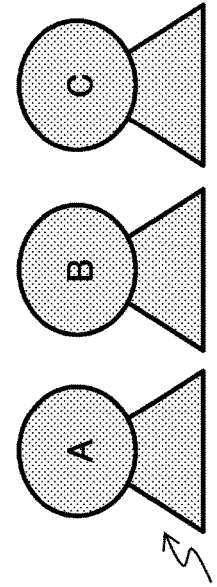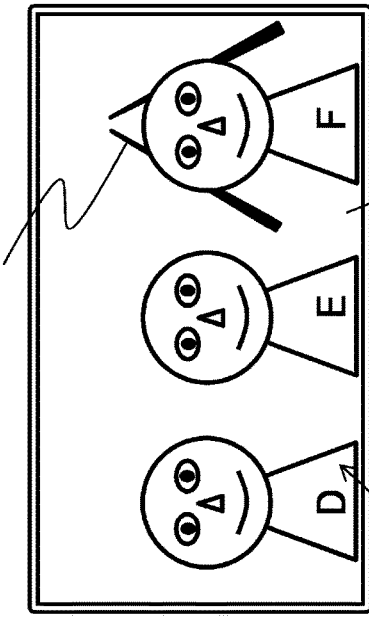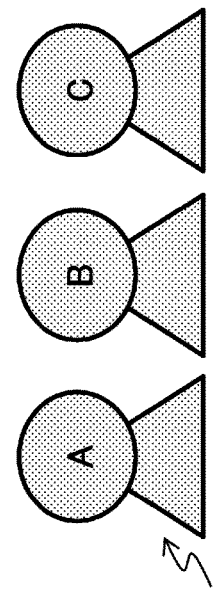
FIG. 24A / FIG. 24B

FIG. 26B

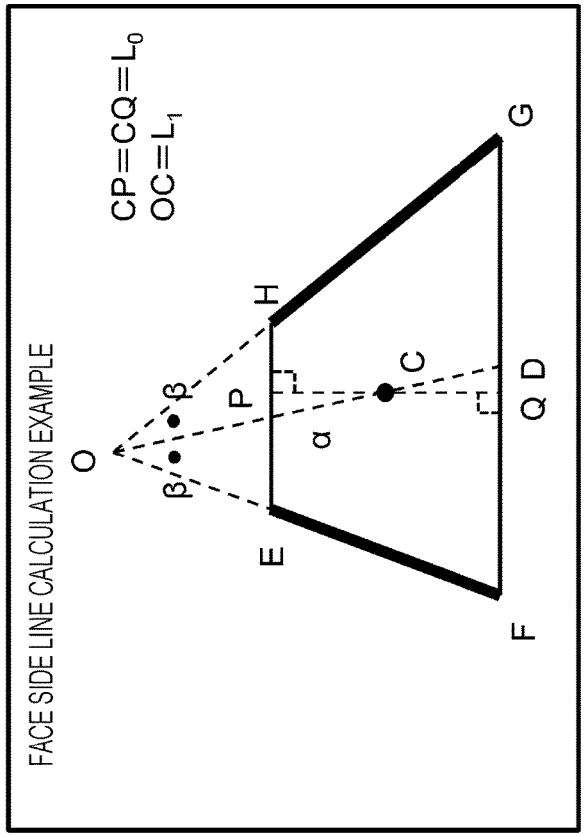

FACE SIDE LINE CALCULATION EXAMPLE $CP = CQ = L_0$
$OC = L_1$

FIG. 26A

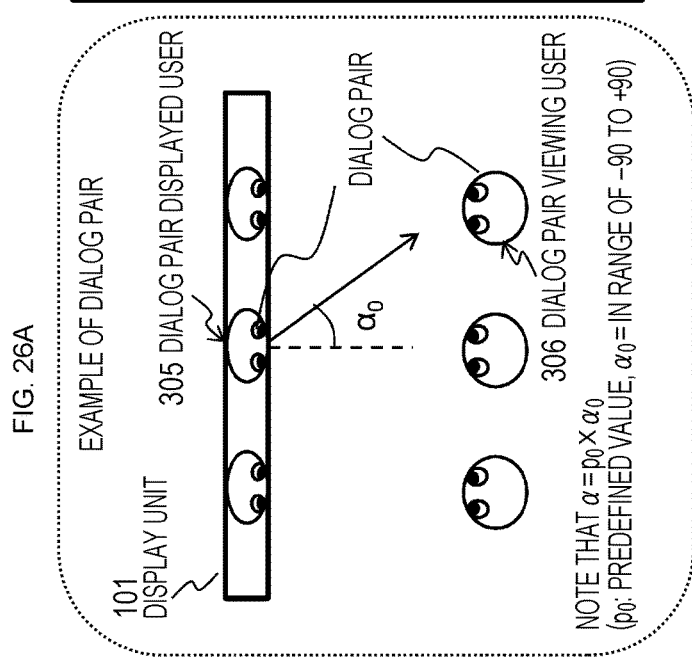

EXAMPLE OF DIALOG PAIR

305 DIALOG PAIR DISPLAYED USER
DIALOG PAIR
306 DIALOG PAIR VIEWING USER
101 DISPLAY UNIT

NOTE THAT $\alpha = p_0 \times \alpha_0$
($p_0$: PREDEFINED VALUE, $\alpha_0 =$ IN RANGE OF $-90$ TO $+90$)

FIG. 26C

FACE SIDE LINE CALCULATION PROCEDURE

DEFINE CENTER POSITION OF FACE OF DISPLAYED USER OF DIALOG PAIR AS C.
DEFINE POINTS VERTICALLY AWAY FROM C BY PREDEFINED DISTANCE $L_0$ AS P AND Q.
DISTANCE OF $OC = L_1$, AND ANGLE $\beta$ IS DEFAULT VALUE.

(s1) CALCULATE INCLINATION ANGLE $\alpha$ FROM POSITIONAL RELATIONSHIP OF DIALOG PAIR.
(s2) OBTAIN POINT O IN UPPER POSITION FROM POINT C BY PREDEFINED DISTANCE $L_1$ ON LINE SHIFTED BY ANGLE $\alpha$.
(s3) DRAW LINES OF AND OG SHIFTED FROM O BY ANGLE $\beta$.
(s4) OBTAIN EFGH SURROUNDED BY PARALLEL LINES PASSING THROUGH P AND Q, AND BY LINES OF AND OG, AND DEFINE EF AND GH AS FACE SIDE LINES.

FIG. 27A

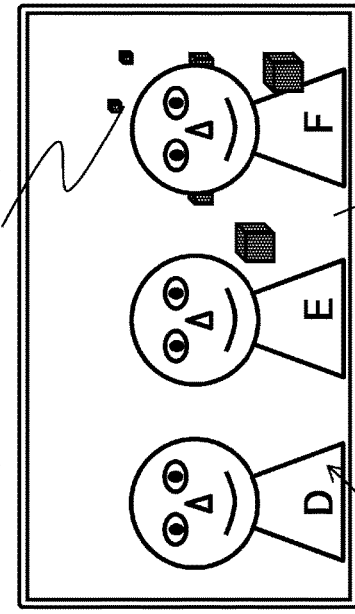 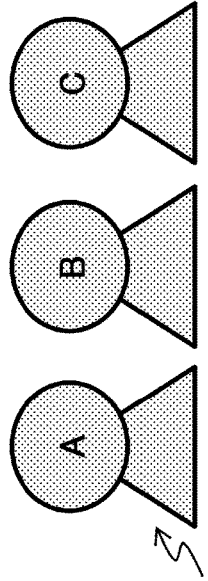

EXAMPLE 1, IN WHICH DIALOG PAIR IS REPRESENTED BY FACE SIDE BOX (WHEN DIALOG PAIR IS IN FRONT DIRECTION)

321 DIALOG PAIR IDENTIFICATION INFORMATION (FOR EXAMPLE, DIALOG PAIR F–C)
101 DISPLAY UNIT
110 DISPLAYED USERS (D, E, AND F)
130 VIEWING USERS (A, B, AND C)

FIG. 27B

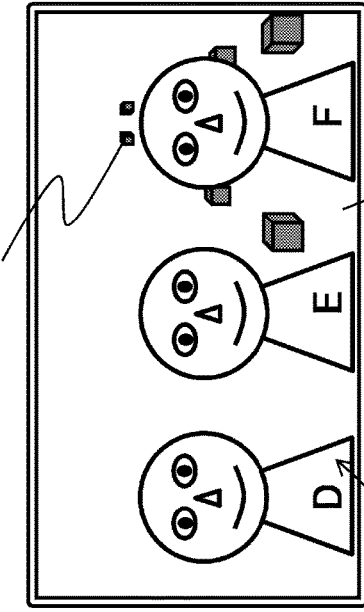 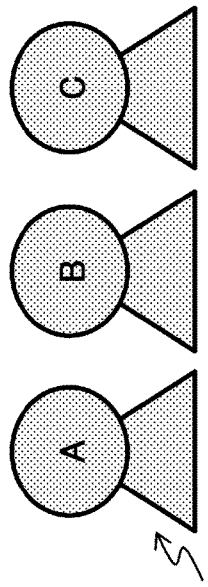

EXAMPLE 2, IN WHICH DIALOG PAIR IS REPRESENTED BY FACE SIDE BOX (WHEN DIALOG PAIR IS IN RIGHT DIRECTION)

322 DIALOG PAIR IDENTIFICATION INFORMATION (FOR EXAMPLE, DIALOG PAIR F–B)
101 DISPLAY UNIT
110 DISPLAYED USERS (D, E, AND F)
130 VIEWING USERS (A, B, AND C)

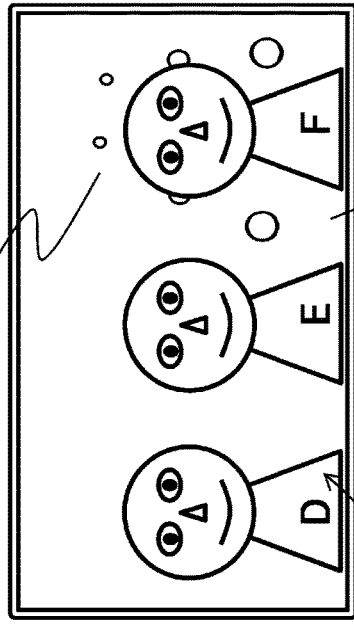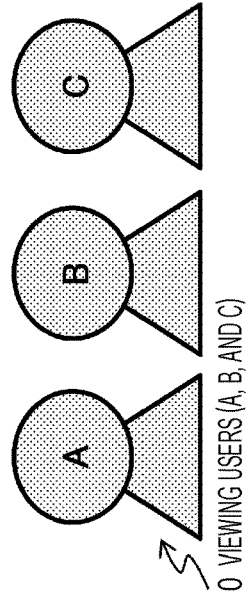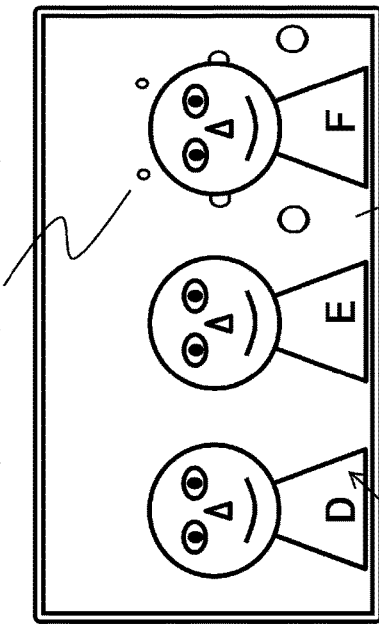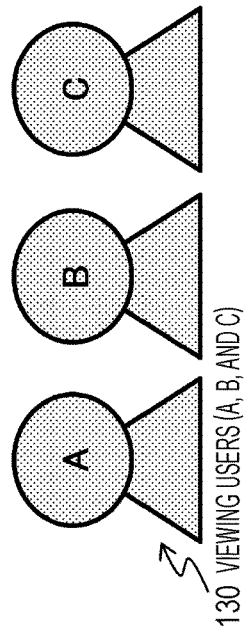
FIG. 28A / FIG. 28B

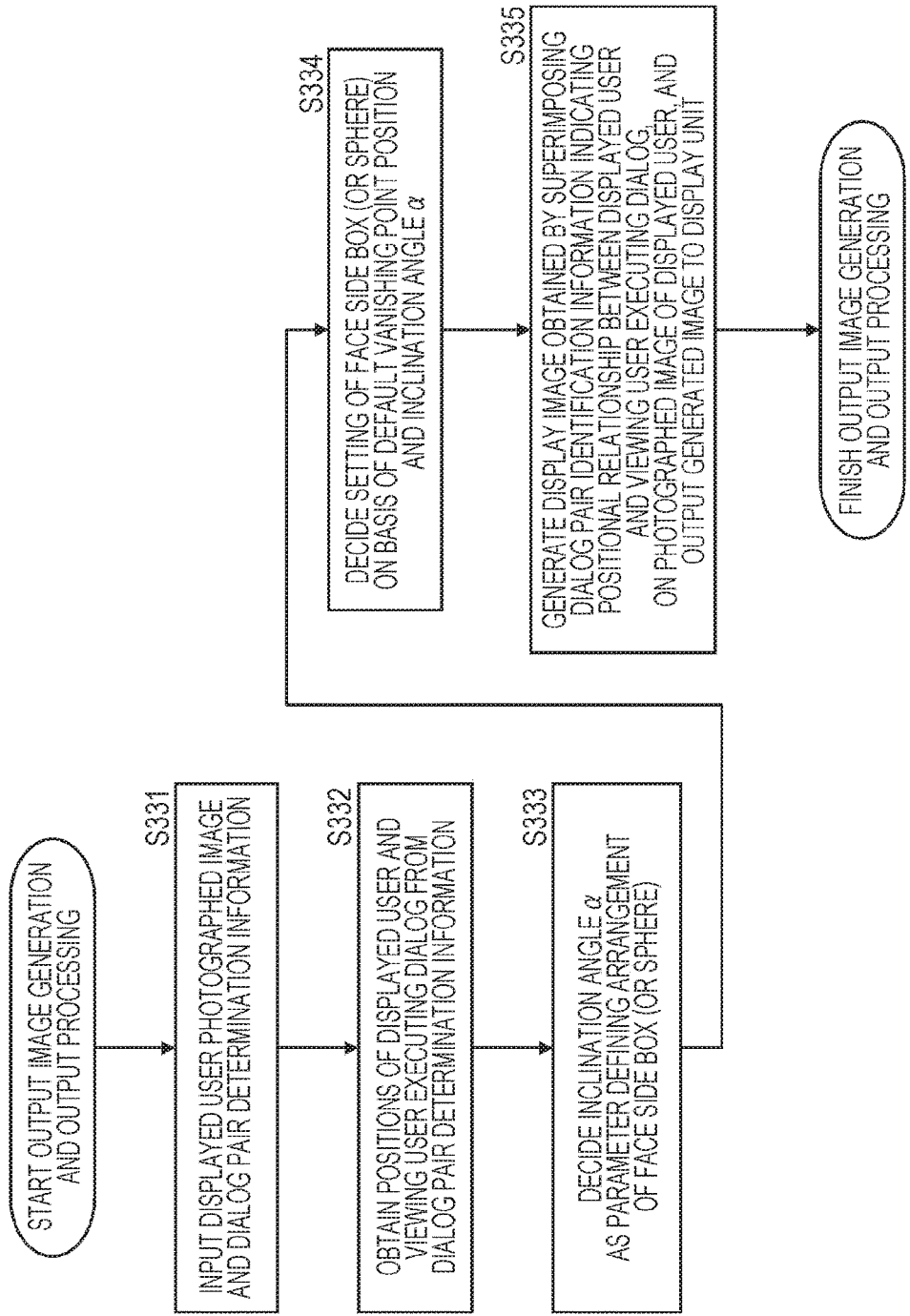

FIG. 30A

EXAMPLE OF DIALOG PAIR

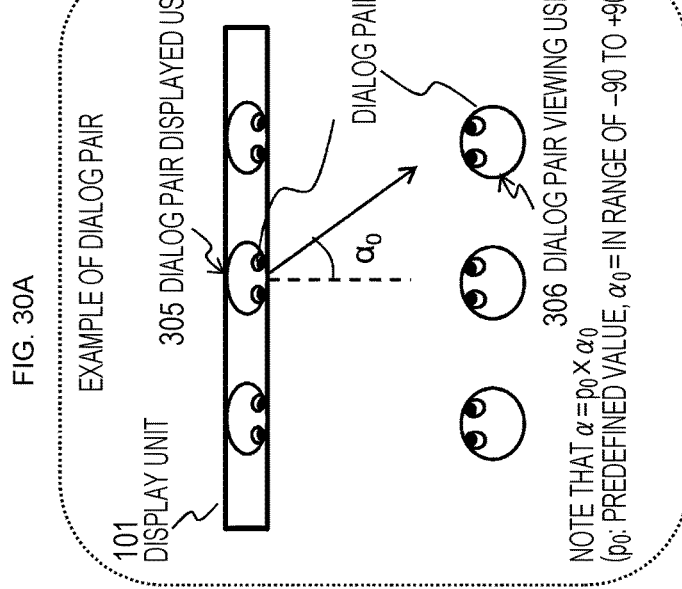

305 DIALOG PAIR DISPLAYED USER
DIALOG PAIR
306 DIALOG PAIR VIEWING USER
101 DISPLAY UNIT

NOTE THAT $\alpha = p_0 \times \alpha_0$
($p_0$: PREDEFINED VALUE, $\alpha_0$ = IN RANGE OF −90 TO +90)

FIG. 30B

FACE SIDE BOX CALCULATION EXAMPLE

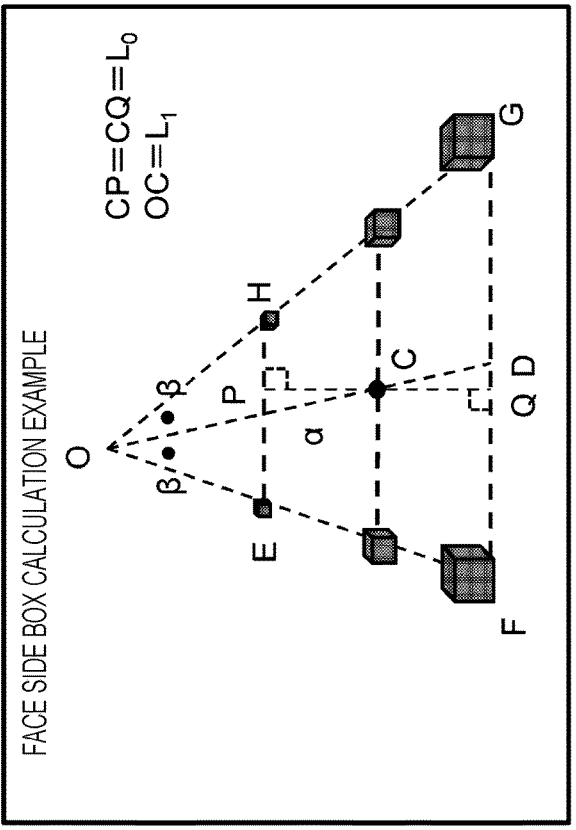

FACE SIDE BOX CALCULATION PROCEDURE

DEFINE CENTER POSITION OF FACE OF DISPLAYED USER OF DIALOG PAIR AS C,
DEFINE POINTS VERTICALLY AWAY FROM C BY PREDEFINED DISTANCE $L_0$ AS P AND Q.
DISTANCE OF $OC = L_1$, AND ANGLE $\beta$ IS DEFAULT VALUE.

(s1) CALCULATE INCLINATION ANGLE $\alpha$ FROM POSITIONAL RELATIONSHIP OF DIALOG PAIR.
(s2) OBTAIN POINT O IN UPPER POSITION FROM POINT C BY PREDEFINED DISTANCE $L_1$ ON LINE SHIFTED BY ANGLE $\alpha$.
(s3) DRAW LINES OF AND OG SHIFTED FROM O BY ANGLE $\beta$.
(s4) OBTAIN INTERSECTIONS EFGHIJ OF PARALLEL LINES PASSING THROUGH C, P, AND Q,
      AND OF AND OG, AND SET BOX AT INTERSECTIONS EFGHIJ TO BE FACE SIDE BOX

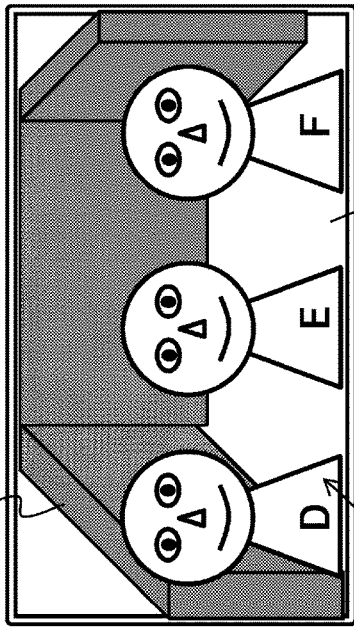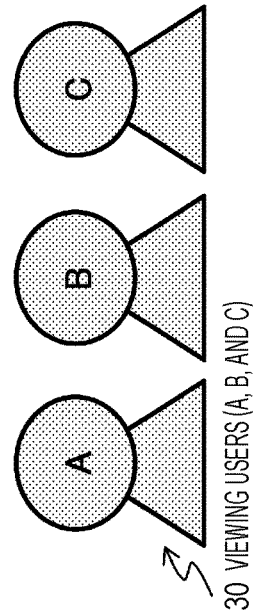
FIG. 31A — EXAMPLE 1, IN WHICH DIALOG PAIR IS REPRESENTED BY PERSPECTIVE TRANSFORMATION (WHEN DIALOG PAIR IS IN FRONT DIRECTION)
FIG. 31B — EXAMPLE 2, IN WHICH DIALOG PAIR IS REPRESENTED BY PERSPECTIVE TRANSFORMATION (WHEN DIALOG PAIR IS IN RIGHT DIRECTION)
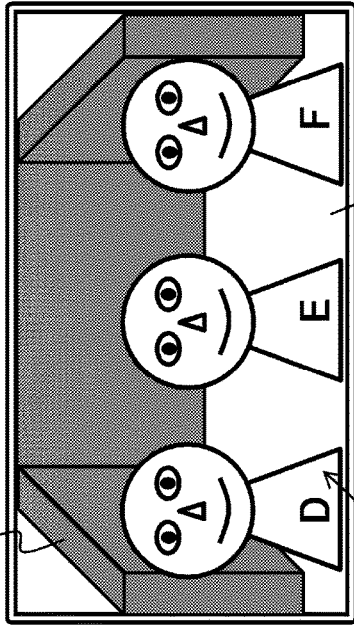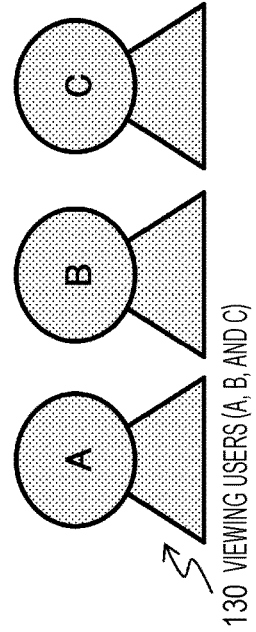

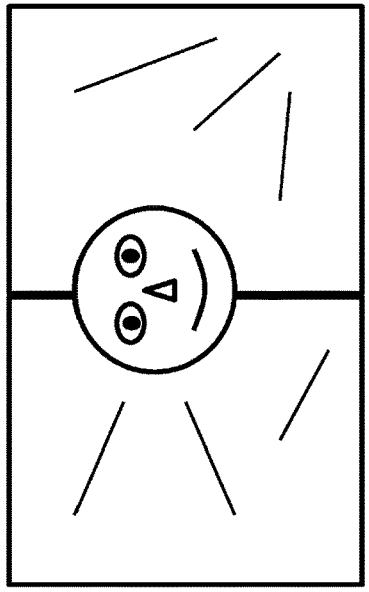

FIG. 33A

EDGE DETECTION EXAMPLE a

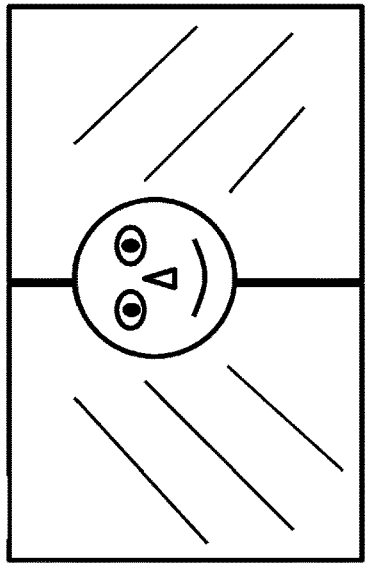

FIG. 33B

EDGE DETECTION EXAMPLE b

FIG. 33C

EDGE DETECTION AND PERSPECTIVE TRANSFORMATION CONFORMITY DETERMINATION PROCESSING
(s1) DIVIDE BACKGROUND INTO RIGHT/LEFT SECTIONS ABOUT FACE POSITION AS CENTER.
(s2) OBTAIN STRAIGHT LINE EDGES INCLUDED IN EACH OF BACKGROUNDS OF LEFT AND RIGHT REGIONS.
(s3) OBTAIN FREQUENCY DISTRIBUTION IN EDGE DIRECTION.
IN CASE WHERE
EDGES ARE ALIGNED DIAGONALLY UPWARD TO RIGHT, IN LEFT REGION AND
EDGES ARE ALIGNED DIAGONALLY UPWARD TO LEFT, IN LEFT REGION
(CASE OF ABOVE EXAMPLE a), PERSPECTIVE TRANSFORMATION IS EXECUTED TO IMAGE DETERMINED TO BE SUITABLE FOR PERSPECTIVE TRANSFORMATION.
IF CONDITIONS ARE NOT SATISFIED (CASE OF ABOVE EXAMPLE b), PERSPECTIVE TRANSFORMATION IS NOT TO BE EXECUTED TO IMAGE DETERMINED TO BE UNSUITABLE FOR PERSPECTIVE TRANSFORMATION.

FIG. 34

FOR NINE PIXELS $P_i$ INCLUDING PIXEL OF BACKGROUND REGION AND SURROUNDING EIGHT PIXELS, EDGE DETECTION FILTERS $D_{X_i}$ AND $D_{Y_i}$ ARE MULTIPLIED TO CALCULATE SCORES.
$S_x = \Sigma_i P_i \times D_{X_i}$,  $S_y = \Sigma_i P_i \times D_{Y_i}$   (i=0...8)

EXAMPLE OF EDGE DETECTION FILTER
Sobel FILTER $$D_x = \begin{pmatrix} -1 & 0 & 1 \\ -2 & 0 & 2 \\ -1 & 0 & 1 \end{pmatrix} \quad D_y = \begin{pmatrix} -1 & -2 & -1 \\ 0 & 0 & 0 \\ 1 & 2 & 1 \end{pmatrix}$$

Previtt FILTER $$D_x = \begin{pmatrix} -1 & 0 & 1 \\ -1 & 0 & 1 \\ -1 & 0 & 1 \end{pmatrix} \quad D_y = \begin{pmatrix} -1 & -1 & -1 \\ 0 & 0 & 0 \\ 1 & 1 & 1 \end{pmatrix}$$

WHEN SCORES SATISFY $|S_x| < S_{th}$ AND $|S_y| < S_{th}$ WITH RESPECT TO PREDEFINED VALUE $S_{th}$, PIXEL IS DETERMINED AS NOT BEING EDGE REGION, AND REMOVED FROM PROCESSING TARGET THEREAFTER.

EDGE ANGLE IS CALCULATED BY FOLLOWING FORMULA.
$\alpha_2 = \tan^{-1}(S_x / S_y)$   ($0° \leq \alpha_2 < 180°$)

ABOVE CALCULATION IS PERFORMED FOR ALL PIXELS TO OBTAIN FREQUENCY DISTRIBUTION OF EDGE ANGLE.

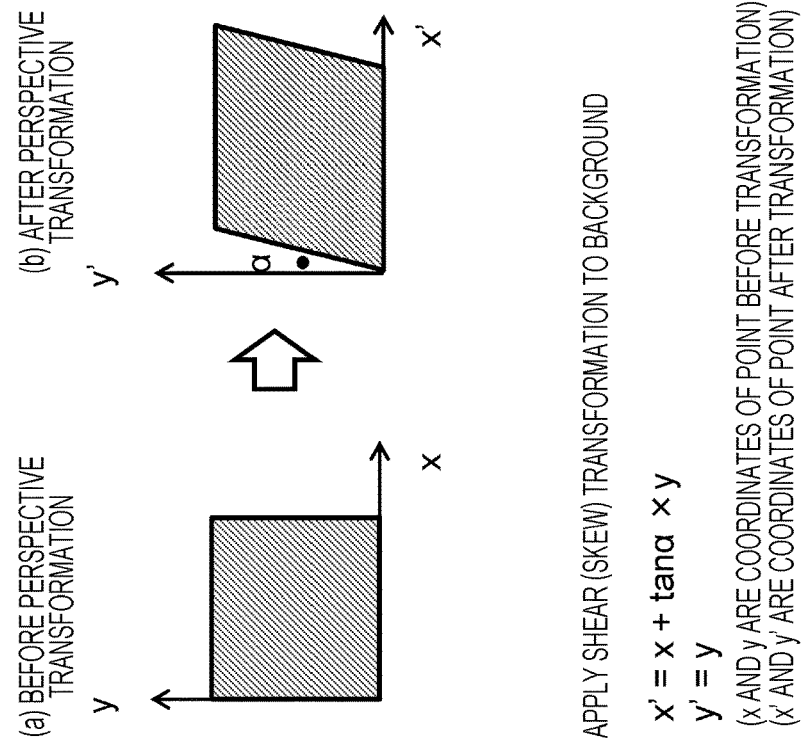
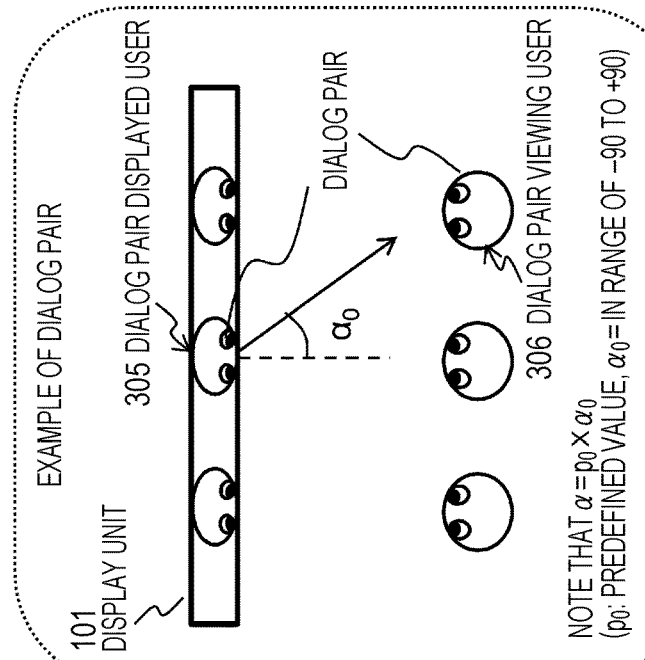

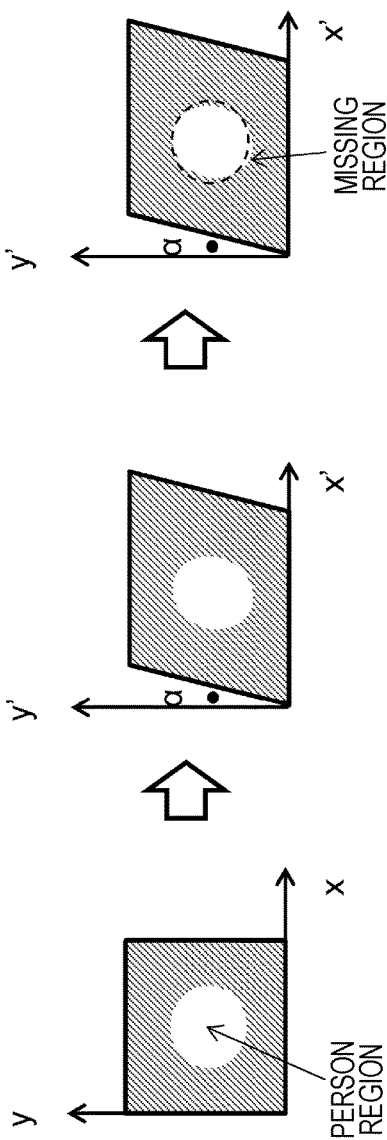

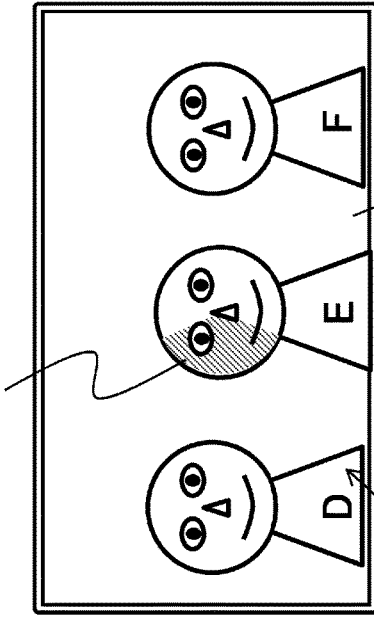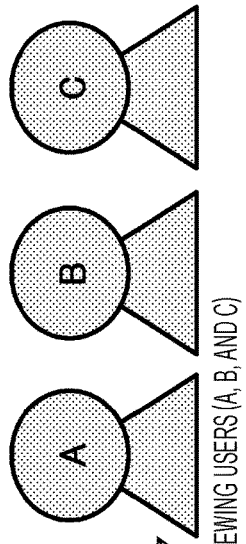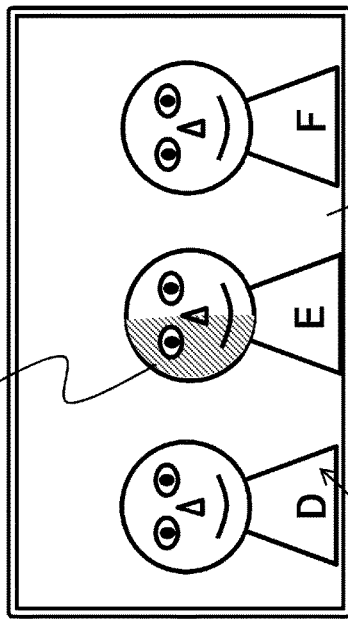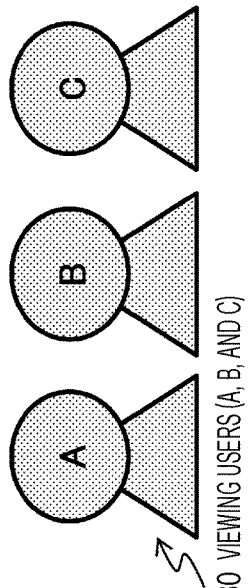
FIG. 38A / FIG. 38B

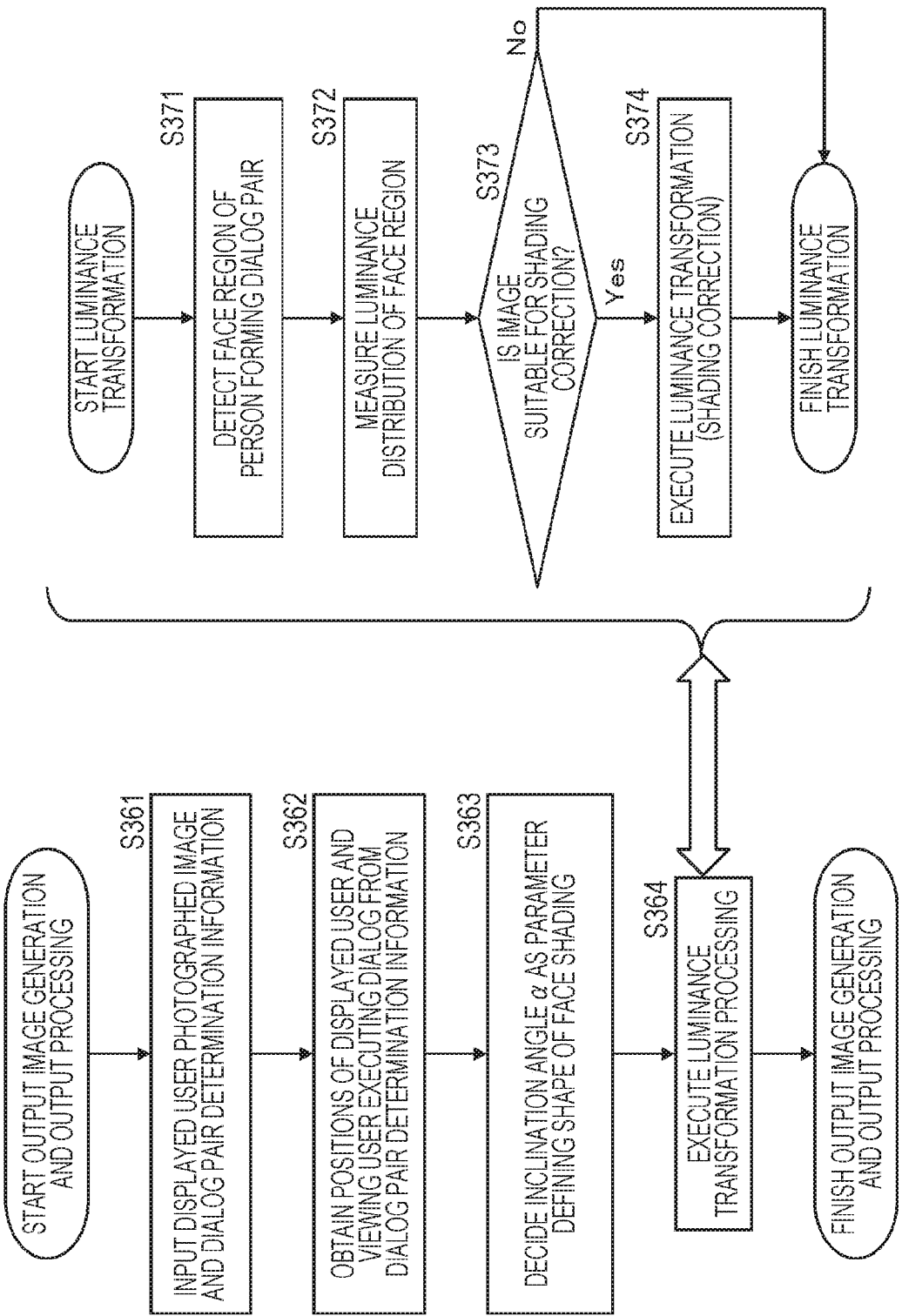

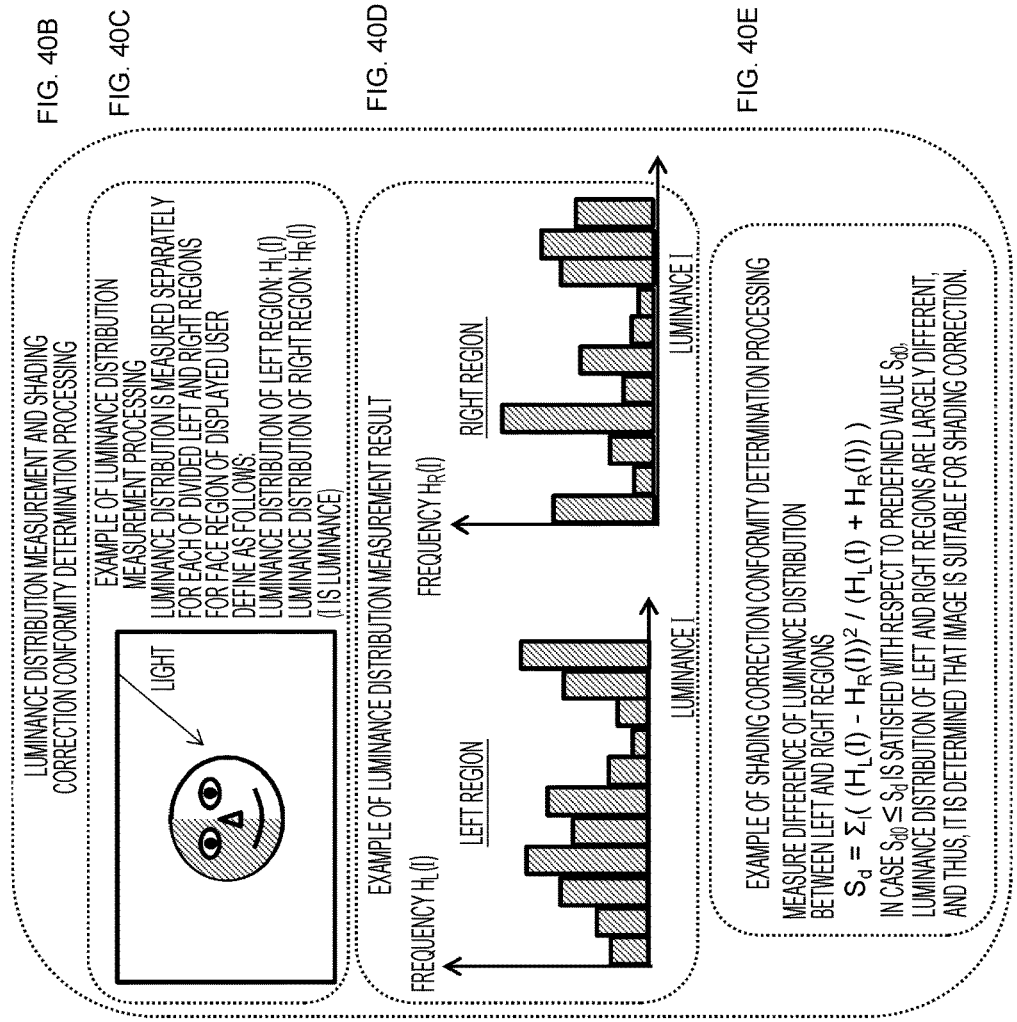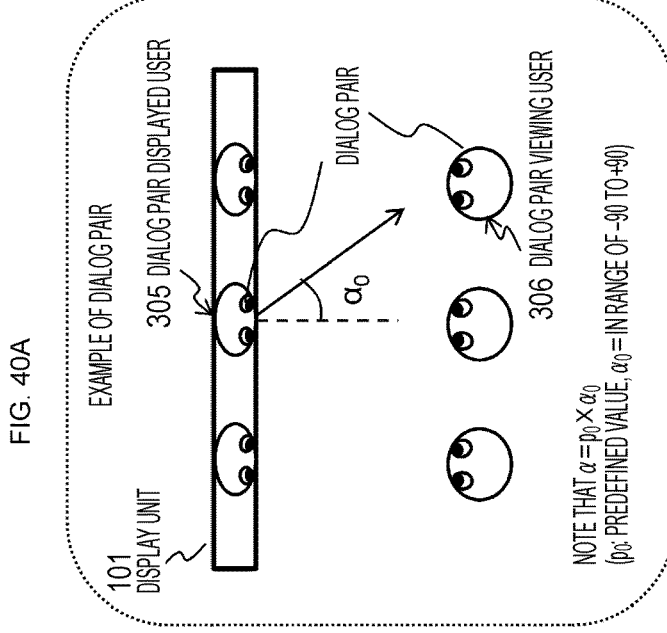

FIG. 41

EXAMPLE OF EXECUTION OF SHADING CORRECTION PROCESSING

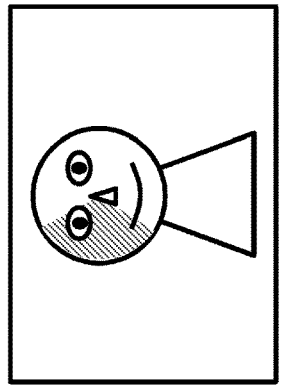

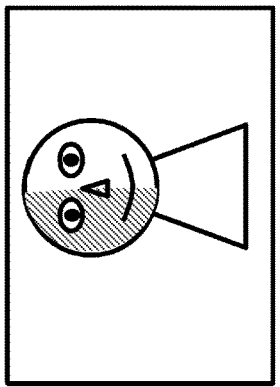

START SHADING CORRECTION → S381 SEPARATE SPECULAR/DIFFUSE REFLECTION COMPONENTS → S382 ENLARGE/REDUCE SPECULAR REFLECTION COMPONENT REGION → S383 COMBINE SPECULAR/DIFFUSE REFLECTION COMPONENTS → FINISH SHADING CORRECTION

SEPARATION OF SPECULAR/DIFFUSE REFLECTION COMPONENTS

SEPARATE COMPONENTS INTO SPECULAR REFLECTION COMPONENT OF SAME COLOR AS INCIDENT LIGHT REFLECTED ON OBJECT SURFACE AND DIFFUSE REFLECTION COMPONENT THAT REFLECTS COMPLICATEDLY INSIDE OBJECT TO DETERMINE OBJECT COLOR.

FOR EXAMPLE, IT IS POSSIBLE TO USE EXISTING TECHNIQUES DESCRIBED IN FOLLOWING DOCUMENT. [Higo et al., "REALTIME REMOVAL OF SPECULAR REFLECTION COMPONENT BASED ON DICHROMATIC REFLECTION MODEL" RESEARCH REPORT OF INFORMATION PROCESSING SOCIETY OF JAPAN (2006)]

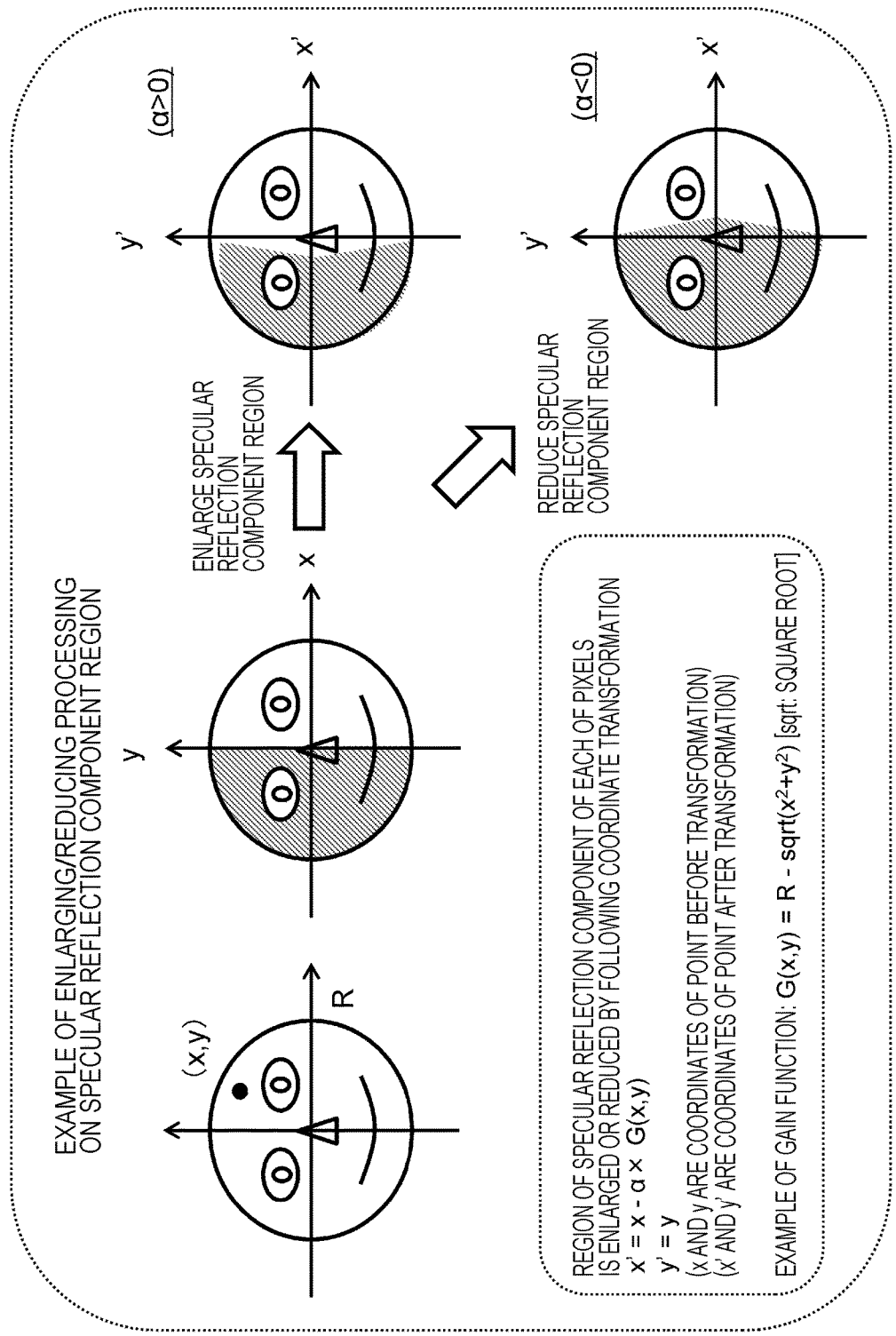

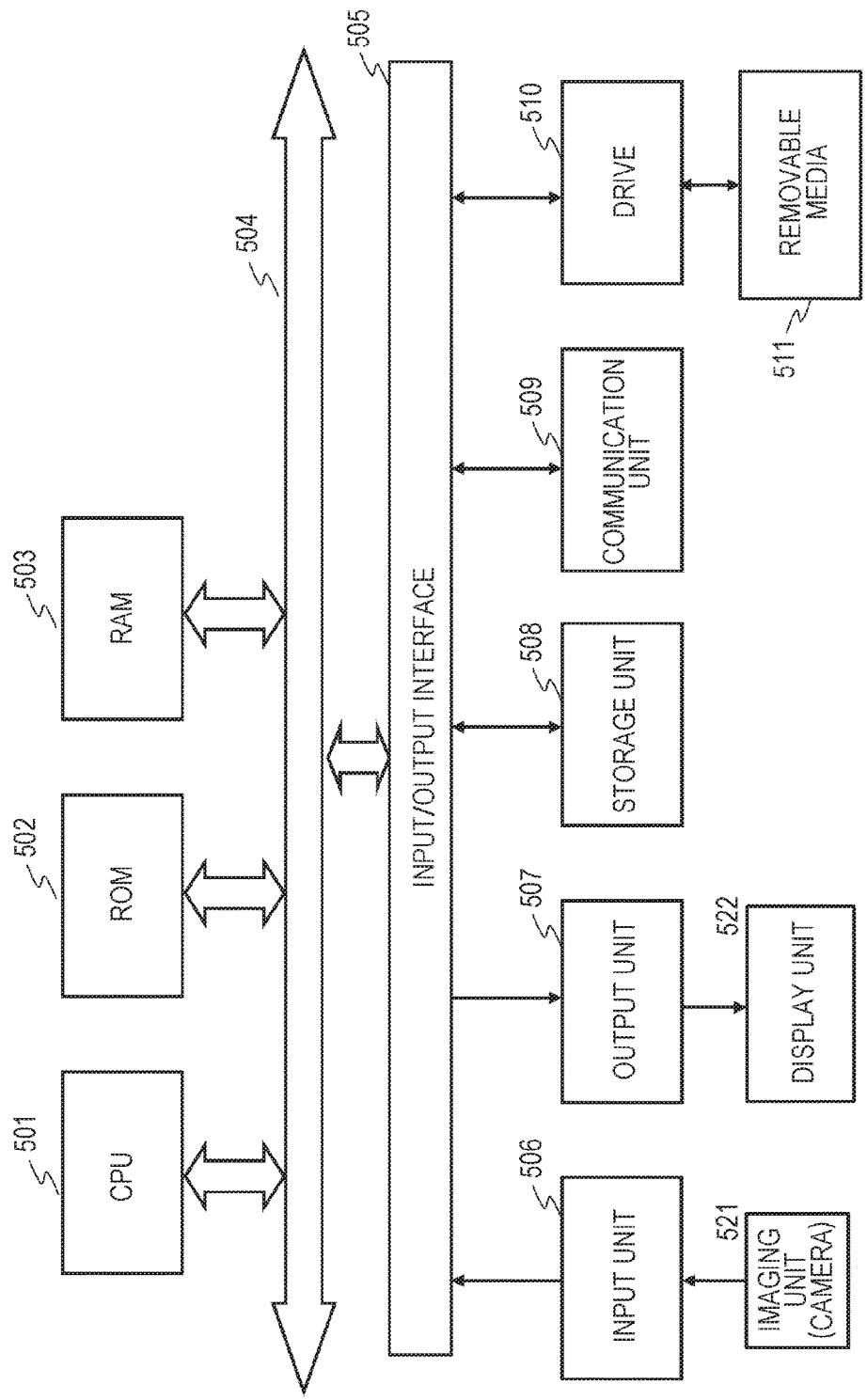

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2017/000778 filed on Jan. 12, 2017, which claims priority benefit of Japanese Patent Application No. JP 2016-026487 filed in the Japan Patent Office on Feb. 16, 2016. Each of the above-referenced applications is hereby incorporated herein by reference in its entirety.

TECHNICAL FIELD

The present disclosure relates to an information processing apparatus, an information processing system, an information processing method, and a program. More specifically, for example, the present invention relates to an information processing apparatus, an information processing system, an information processing method, and a program that transmit images and voices by bidirectional telecommunication via a network so as to execute bidirectional communication.

BACKGROUND ART

An bidirectional communication system such as a video conference system that transmits and receives images and voices through bidirectional telecommunication via a network is used in various fields.

In recent years, a large number of high-definition large displays are frequently used with enhanced quality of images and voices exchanged in telecommunication via the network, making it possible to perform communication with remote users displayed on the display with realistic feeling.

This bidirectional communication system, however, includes a problem that a line-of-sight direction of a user such as a conference participant displayed on a display unit (display) does not match the direction in which the user actually gazes.

This is because the camera that photographs the user (conference participant) is a photographed image from a certain viewpoint. An image photographed from one camera viewpoint is displayed on a display apparatus on another party.

In a case, however, where there is a viewing user viewing the display image from a direction different from the viewpoint of the camera, the viewing user would feel strange in the viewpoint direction of the user displayed on the display unit.

This problem can be serious particularly in a case where a plurality of users (for example, conference participant) is present in front of the display unit.

In a case where a plurality of viewers is present in front of the display unit, the user at the position corresponding to the position of the camera that photographed the display image on the display unit can observe the image without feeling strange. In contrast, the user existing at a position different from the position corresponding to the position of the camera that photographed the display image on the display unit, the line-of-sight of the other user (conference participant) displayed on the display unit might look completely different from the original situation.

A viewing user viewing this display image might be puzzled about to whom the displayed user is speaking to.

Note that examples of conventional technologies disclosing a configuration to solve such a problem include Patent Document 1 (Japanese Patent No. 3139100), Patent Document 2 (Japanese Patent No. 32389730), Patent Document 3 (Japanese Patent Application Laid-Open No. 2012-070081), Patent Document 4 (Japanese Patent Application Laid-Open No. 2014-096701), Patent Document 5 (Japanese Patent Application Laid-Open No. 2012-088538), and the like.

The methods disclosed in these conventional technologies, however, include a configuration that requires the number of cameras corresponding to the number of participants, a configuration that requires use of a special display, a configuration that requires special image processing of correcting an eye image of a face included in the image to change the line-of-sight direction, or the like, leading to a problem of cost increase and complication of the processing.

CITATION LIST

Patent Document

Patent Document 1: Japanese Patent No. 3139100
Patent Document 2: Japanese Patent No. 32389730
Patent Document 3: Japanese Patent Application Laid-Open No. 2012-070081
Patent Document 4: Japanese Patent Application Laid-Open No. 2014-096701
Patent Document 5: Japanese Patent Application Laid-Open No. 2012-088538

SUMMARY OF THE INVENTION

Problems to be Solved by the Invention

The present disclosure has been made in view of the above-described problems, for example, and aims to provide an information processing apparatus, imaging apparatus, information processing system, an information processing method, and a program capable of easy discrimination of to whom among the viewing users viewing the display unit, the communication participating user (displayed user) displayed in a display image of a display unit (display) used in a bidirectional communication system is speaking to, for example.

Solutions to Problems

A first aspect of the present disclosure is
an information processing apparatus including a display image generation unit that generates dialog pair identification information enabling identification of to which viewing user among a plurality of viewing users a displayed user on a display unit is speaking, and that outputs the generated dialog pair identification information together with the displayed user, to the display unit.

Furthermore, a second aspect of the present disclosure is
an information processing apparatus including a dialog pair determination unit that determines to which viewing user among a plurality of viewing users a displayed user on a display unit is speaking,
in which the dialog pair determination unit
inputs first image data obtained by photographing the displayed user and second image data obtained by photographing the viewing user, and generates dialog pair determination information indicating a pair of a displayed user and a viewing user forming a dialog pair by analyzing each of the images.

Furthermore, a third aspect of the present disclosure is an information processing system including: a transmission apparatus that executes image transmission; and a reception apparatus that receives a transmission image from the transmission apparatus and displays the transmission image on a display unit, in which, the transmission apparatus transmits:

a displayed user image to be displayed on the display unit of the reception apparatus; and dialog pair determination information indicating which displayed user is speaking to which viewing user among a plurality of viewing users viewing the display unit, the reception apparatus generates dialog pair identification information enabling identification of which displayed user is speaking to which viewing user on the basis of the dialog pair determination information, and outputs the generated information together with the displayed user, to the display unit.

Furthermore, a fourth aspect of the present disclosure is an information processing method executed in an information processing apparatus, in which the information processing apparatus includes a display image generation unit that generates a display image for a display unit, and the display image generation unit generates dialog pair identification information enabling identification of to which viewing user among a plurality of viewing users a displayed user on the display unit is speaking, and outputs the generated information together with the displayed user, to the display unit.

Furthermore, a fifth aspect of the present disclosure is a program that causes an information processing apparatus to execute information processing, in which the information processing apparatus includes a display image generation unit that generates a display image for a display unit, and the program causes the display image generation unit to execute processing of generating dialog pair identification information enabling identification of to which viewing user among a plurality of viewing users the displayed user on the display unit is speaking, and processing of outputting the generated information together with the displayed user, to the display unit.

Note that the program of the present disclosure is a program that can be provided by a storage medium or a telecommunication medium provided in a computer readable format to an information processing apparatus or a computer system that can execute various program codes, for example. By providing such a program in a computer readable format, processing according to the program is implemented on the information processing apparatus or the computer system.

Still other objects, features and advantages of the present disclosure will become apparent from the detailed description based on exemplary embodiments of the present disclosure and attached drawings to be described below. Note that in the present description, the system represents a logical set of a plurality of apparatuses, and that all the constituent apparatuses need not be in a same housing.

Effects of the Invention

According to a configuration of an exemplary embodiment of the present disclosure, it is possible to achieve a configuration enabling identification of to which viewing user the displayed user on the display unit is speaking to.

Specifically, the configuration includes a display image generation unit that generates dialog pair identification information enabling identification of to which viewing user among the plurality of viewing users the displayed user on the display unit is speaking, and outputs the generated information together with the displayed user, to the display unit. The display image generation unit generates, as the dialog pair identification information, an arrow or an icon, a face surrounding frame or a face side line, a virtual viewpoint background image or the like, directed from the displayed user forming the dialog pair to the viewing user forming the dialog pair, and displays the generated dialog pair identification information together with the displayed user, on the display unit.

With this configuration, it is possible to achieve a configuration enabling identification of to which viewing user the displayed user displayed on the display unit is speaking.

Note that effects described here in the present specification are provided for purposes of exemplary illustration and are not intended to be limiting. Still other additional effects may also be contemplated.

BRIEF DESCRIPTION OF DRAWINGS

FIGS. 2A, 2B, and 2C are diagrams illustrating a bidirectional communication system.

FIGS. 3A and 3B are diagrams illustrating problems of an image displayed on a display unit.

FIGS. 4A and 4B are diagrams illustrating problems of an image displayed on a display unit.

FIGS. 5A and 5B are diagrams illustrating an exemplary solution of a problem of an image displayed on a display unit.

FIGS. 18A, 18B, and 18C are diagrams illustrating exemplary processing executed by the information processing apparatus according to the fourth exemplary embodiment of the present disclosure.

FIG. 19 is a diagram illustrating an exemplary configuration of an information processing apparatus according to a fifth exemplary embodiment of the present disclosure.

FIGS. 21A and 21B are diagrams illustrating an example of using a face surrounding frame as dialog pair identification information.

FIGS. 23A, 23B, and 23C are diagrams illustrating a specific example of processing of an information processing apparatus in a case where a face surrounding frame is used as the dialog pair identification information.

FIGS. 24A and 24B are diagrams illustrating an example of using a face side line as the dialog pair identification information.

FIGS. 26A, 26B, and 26C are diagrams illustrating a specific example of processing of an information processing apparatus in a case where a face side line is used as the dialog pair identification information.

FIGS. 27A and 27B are diagrams illustrating an example of using a face side box as the dialog pair identification information.

FIGS. 28A and 28B are diagrams illustrating an example of using a face side sphere as the dialog pair identification information.

FIG. 29 is a flowchart illustrating a processing sequence of an information processing apparatus in a case where a face side box (or sphere) is used as the dialog pair identification information.

FIGS. 30A, 30B, and 30C are diagrams illustrating a specific example of processing of an information processing apparatus in a case where a face side box (or sphere) is used as the dialog pair identification information.

FIGS. 31A and 31B are diagrams illustrating an example of using a background perspective transformation as the dialog pair identification information.

FIGS. 33A, 33B, and 33C are diagrams illustrating a specific example of processing of an information processing apparatus in a case where a background perspective transformation is used as the dialog pair identification information.

FIG. 34 is a diagram illustrating a specific example of processing of an information processing apparatus in a case where a background perspective transformation is used as the dialog pair identification information.

FIGS. 36A and 36B are diagrams illustrating a specific example of processing of an information processing apparatus in a case where a background perspective transformation is used as the dialog pair identification information.

FIG. 37 is a diagram illustrating a specific example of processing of an information processing apparatus in a case where a background perspective transformation is used as the dialog pair identification information.

FIGS. 38A and 38B are diagrams illustrating an example in which face shading correction of a face is used as dialog pair identification information.

FIG. 39 is a flowchart illustrating a processing sequence of the information processing apparatus in a case where a face shading correction is used as the dialog pair identification information.

FIGS. 40A, 40B, 40C, 40D, and 40E are diagrams illustrating a specific example of processing of an information processing apparatus in a case where face shading correction is used as the dialog pair identification information.

FIG. 41 is a diagram illustrating a specific example of processing of an information processing apparatus in a case where face shading correction is used as the dialog pair identification information.

FIG. 42 is a diagram illustrating a specific example of processing of an information processing apparatus in a case where face shading correction is used as the dialog pair identification information.

FIG. 43 is a diagram illustrating an exemplary configuration of hardware of an information processing apparatus.

MODE FOR CARRYING OUT THE INVENTION

Figure 1:
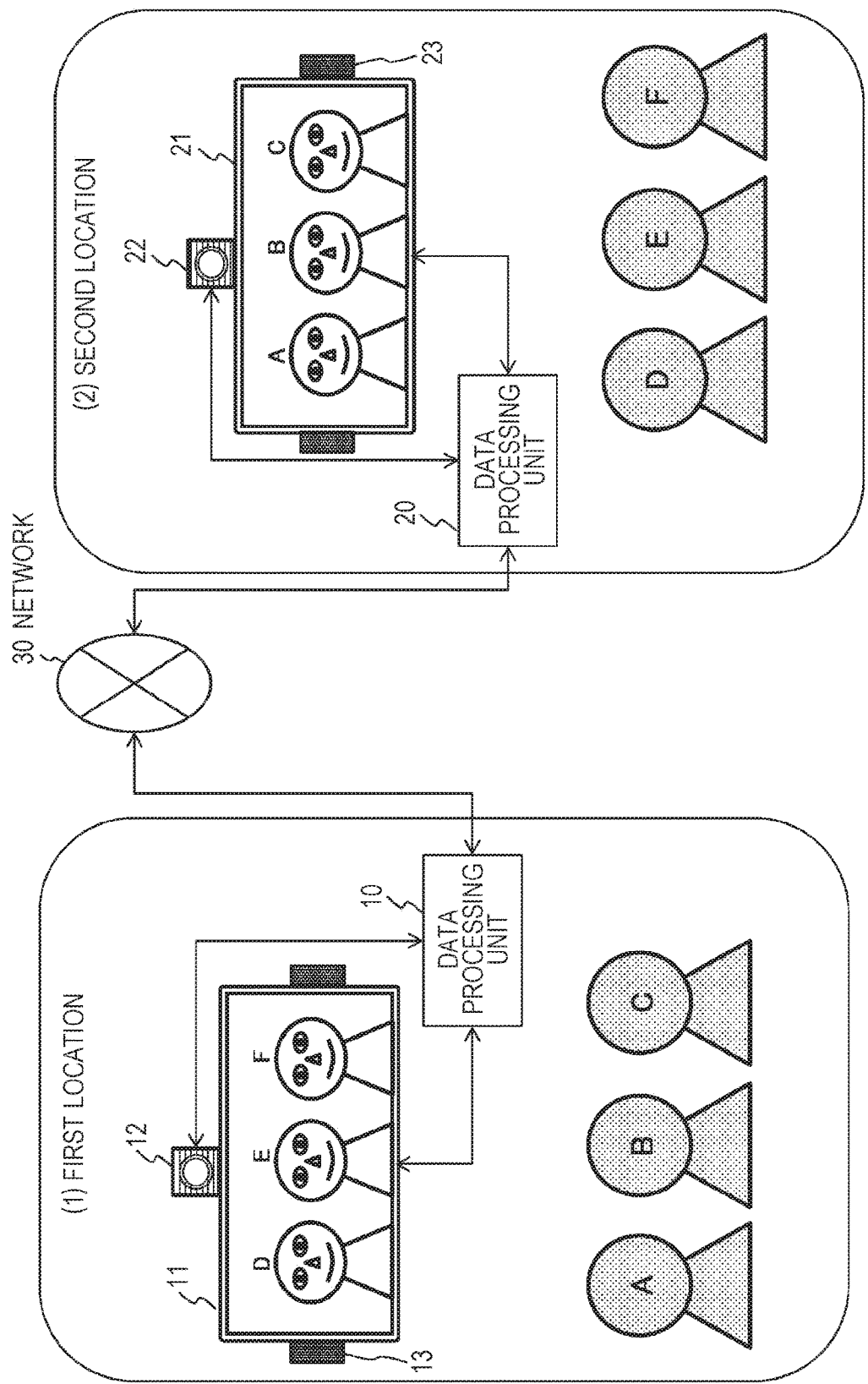
FIG. 1 is a diagram illustrating a bidirectional communication system.

Hereinafter, an information processing apparatus, an information processing system, an information processing method, and a program of the present disclosure will be described in detail with reference to the drawings. Note that the description is provided in accordance with the following items.

1. Outline and problems of configuration of bidirectional communication system 2. (First exemplary embodiment) Configuration and processing of information processing apparatus according to first exemplary embodiment of the present disclosure 2-1. Processing executed by information processing apparatus 2-2. Configuration example of information processing apparatus 3. (Second exemplary embodiment) Second exemplary embodiment of bidirectional processing system for displaying dialog pair identification information on the display unit of both locations 4. (Third exemplary embodiment) Exemplary embodiment in which a front face image can be displayed 5. (Fourth exemplary embodiment) Exemplary embodiment of correcting and displaying background image and person image 6. (Fifth exemplary embodiment) Exemplary embodiment of tracking position of viewing user to update corrected image in processing of correcting and displaying background image and person image 7. Specific example of dialog pair identification information 7-1. (1) Example of using face surrounding frame as dialog pair identification information 7-2. (2) Example of using face side line as dialog pair identification information 7-3. (3) Example of using face side box (or sphere) as dialog pair identification information 7-4. (4) Example of using perspective transformation of background image as dialog pair identification information 7-5. (5) Example of using face shading as dialog pair identification information 8. Hardware configuration example of information processing apparatus 9. Summary of the configuration of present disclosure

1. Outline and Problems of Configuration of Bidirectional Communication System First, an outline and problems of the configuration of the bidirectional communication system will be described.

FIG. 1 is a diagram illustrating an exemplary configuration of a bidirectional communication system.

FIG. 1 includes:

(1) First location; and (2) Second location.

FIG. 1 illustrates a configuration example of these two locations.

These two locations are provided at remote places separated from each other, and users at individual locations perform bidirectional communication with each other. Individual systems at individual locations are connected with each other via a network 30.

The first location includes users A, B, and C.

Moreover, the first location includes a data processing unit 10, together with a display unit (display) 11, a camera 12, and a voice input/output unit (microphone and speaker) 13, connected to the data processing unit 10.

Meanwhile, the second location includes users D, E and F.

Moreover, the second location includes a data processing unit 20, together with a display unit (display) 21, a camera 22, and a voice input/output unit (microphone and speaker) 23, connected to the data processing unit 20.

The camera 12 at the first location photographs the users A, B, and C at the first location, and photographed image data is transmitted to the data processing unit 20 at the second location via the data processing unit 10 and the network 30.

The data processing unit 20 at the second location displays a received image from the first location, on the display unit 21.

Further, the voice input/output unit (microphone and speaker) 13 at the first location obtains speech or the like of the users A, B, and C at the first location, and the obtained voice data is transmitted to the data processing unit 20 at the second location via the data processing unit 10 and the network 30.

The data processing unit 20 at the second location outputs the received voice from the first location via the voice input/output unit (microphone and speaker) 23.

Meanwhile, the camera 22 at the second location photographs the users D, E, and F at the second location, and photographed image data is transmitted to the data processing unit 10 at the first location via the data processing unit 20 and the network 30.

The data processing unit 10 at the first location displays the image received from the second location, on the display unit 11.

Moreover, the voice input/output unit (microphone and speaker) 23 at the second location obtains speech or the like of the users D, E, and F at the second location, and the obtained voice data is transmitted to the data processing unit 10 at the first location via the data processing unit 20 and the network 30.

The data processing unit 10 at the first location outputs the received voice from the second location via the voice input/output unit (microphone and speaker) 13.

This processing enables the users A, B, and C at the first location and the users D, E, and F at the second location to obtain images and speech of remote users via the display unit and the speaker, so as to perform bidirectional communication.

FIGS. 2A, 2B, and 2C are diagrams illustrating one example of a communication environment implemented in a bidirectional communication system.

FIG. 2A illustrates users A, B, and C on the first location side and users D, E, and F at the second location displayed on the display unit 11.

FIG. 2B illustrates users D, E, and F on the second location side and users A, B, and C at the first location displayed on the display unit 21.

In these locations, it is possible to communicate with each other having a realistic feeling that the other users in distant locations are present in front of one user, that is, a feeling that they are in a same conference room as illustrated in FIG. 2C.

This bidirectional communication system, however, includes a problem that a line-of-sight direction of a user displayed on the display unit (display) does not match the direction in which the user actually gazes.

This is mainly because the image photographed from one viewpoint where the camera for photographing the user at each of locations is placed is displayed on the other party's display apparatus.

This problem can be serious particularly in a case where a plurality of users (for example, conference participant) is present in front of the display unit.

This issue will be described with reference to FIGS. 3A and 3B or below.

FIGS. 3A and 3B are diagrams illustrating an exemplary display image displayed on the display unit of each of locations in the bidirectional communication system described with reference to FIGS. 1 and 2.

The display unit 11 of the first location displays images of users D, E, and F at the second location.

This image is an image photographed by the camera 22 at the second location.

Meanwhile, the images of the users A, B, and C at the first location are displayed on the display unit 21 at the second location.

This image is an image photographed by the camera 12 at the first location.

Now it is assumed that the user C at the first location starts speaking, with eye-gaze, to the user E at the center of the users D, E, and F at the second location displayed on the display unit 11.

Since the users D, E and F at the second location are displayed on the display unit 11 and the user E is displayed in a central region in the horizontal direction of the display unit, the user C speaks, with eye-gaze, to the center direction (P2) of the display unit 11.

Note that FIGS. 3A and 3B include identifiers P1, P2, and P3 from the left side of the figure as position identifiers indicating the horizontal direction of the display unit 11.

The camera 12 for photographing the users A, B, and C at the first location is fixed in the central region (P2) in the horizontal direction of the display unit.

The camera 12 photographs the viewpoint image from the position P2 and the photographed image is displayed on the display unit 21 at the second location.

The users A, B, and C at the first location displayed on the display unit 21 at the second location are set as illustrated in FIGS. 3A and 3B.

The speaking user C at the first location is speaking, with eye-gaze, to the user E displayed on the display unit 11. This line-of-sight is directed to the position (P) of the camera 12.

That is, the user C is in a state of speaking with the line-of-sight directed to the camera 12, and the image of the user C is photographed as a front-facing image with respect to the camera 12.

As a result, the image of the first location C displayed on the display unit 21 of the second location is an image facing the front.

That is, the display image of the display unit 21 at the second location is a display image in which the user C seems to be speaking to the user F at the second location.

Note that the orientation of the face is changed in the figure with the line-of-sight direction in order to clearly express the strange feeling about the line-of-sight direction of each of the users, although the actual image would give a slight level of strange feeling about the user's line-of-sight in the display image. This similarly applies to the other drawings illustrated below.

In this manner, even though the user C at the first location is speaking to the user E at the second location, the user F at the second location might misunderstand that the user C at the first location is speaking to the user F oneself.

In this manner, since the line-of-sight direction of the subject displayed on the display unit is decided by the position of the photographing viewpoint of the camera, leading to observation of an image in a line-of-sight direction different from the actual line-of-sight direction depending on the position of the user arranged in a line in front of the display unit.

FIGS. 4A and 4B are diagrams illustrating another example in which an image with an erroneous line-of-sight direction is displayed.

The display unit 11 of the first location displays images of users D, E, and F at the second location.

This image is an image photographed by the camera 22 at the second location.

Meanwhile, the images of the users A, B, and C at the first location are displayed on the display unit 21 at the second location.

This image is an image photographed by the camera 12 at the first location.

The example illustrated in FIGS. 4A and 4B is an are examples in which the user C at the first location is speaking, with eye-gaze, to the user F at the second location displayed on the display unit 11.

The users D, E, and F at the second location are displayed on the display unit 11. Since the user F is displayed in a front region (P3) from the user C on the display unit 11, the user C speaks, with eye-gaze, to a front (P3) of the display unit 11.

The camera 12 for photographing the users A, B, and C at the first location is fixed in the central region (P2) in the horizontal direction of the display unit.

The camera 12 photographs the viewpoint image from the position P2 and the photographed image is displayed on the display unit 21 at the second location.

The users A, B, and C at the first location displayed on the display unit 21 at the second location are set as illustrated in FIGS. 3A and 3B.

The speaking user C at the first location is speaking, with eye-gaze, to the user F displayed on the display unit 11. This line-of-sight is not directed to the position (P) of the camera 12.

That is, the user C is in a state of speaking with the line-of-sight directed to a direction different from the camera 12, and the image of the user C is photographed as an image with the line-of-sight directed to a direction different from the camera 12.

As a result, the image of the first location C displayed on the display unit 21 of the second location is an image facing rightward (outer side than F), as illustrated in the drawing.

That is, the display image of the display unit 21 at the second location is a display image in which the user C seems to be speaking to outer side than the user F at the second location.

Note that the orientation of the face is changed in the figure with the line-of-sight direction for simplification, although the actual image gives a slight level of strange feeling about the user's line-of-sight in the display image.

In this manner, even though the user C at the first location is speaking to the user F at the second location, the user F at the second location might misunderstand that the user C at the first location is not speaking to the user F oneself.

As described with reference to FIGS. 3A, 3B, and 4, the line-of-sight direction of the subject displayed on the display unit is decided depending on the position of the photographing viewpoint of the camera.

This line-of-sight direction is the line-of-sight direction viewed from the camera viewpoint.

Therefore, when the viewing user in front of the display unit displaying the photographed image observes the display image from the viewpoint position different from the viewpoint of the camera that photographed the image, the line-of-sight direction of the person in the display image is different from the actual line-of-sight direction, leading to hindrance of smooth communication.

An exemplary conventional configuration for solving such a problem will be described.

For example, Patent Document 2 (Japanese Patent No. 3289730) discloses a configuration, as illustrated in FIGS. 5A and 5B, in which images of various viewpoint directions are captured by a plurality of cameras 31 to 33, and the plurality of images is displayed on a multi-viewpoint image display 35.

The multi-viewpoint image display 35 is a special display that enables viewing of images that differ depending on the viewing direction.

A photographed image of a D viewpoint image photographing camera 31 displayed on the multi-viewpoint image display 35 can be viewed solely from the position of the user D at the second location.

A photographed image of a E viewpoint image photographing camera 31 displayed on the multi-viewpoint image display 35 can be viewed solely from the position of the user E at the second location.

A photographed image of a viewpoint F image photographing camera 31 displayed on the multi-viewpoint image display 35 can be viewed solely from the position of the user F at the second location.

With this configuration, the users D, E, and F at the second location can view images giving no strange feeling corresponding to their individual positions (viewpoints).

Implementation of this configuration, however, needs a special multi-viewpoint image display.

In addition, there arises a problem that the position of the camera set at the first location has to be changed with the position of the user at the second location.

Figure 6:
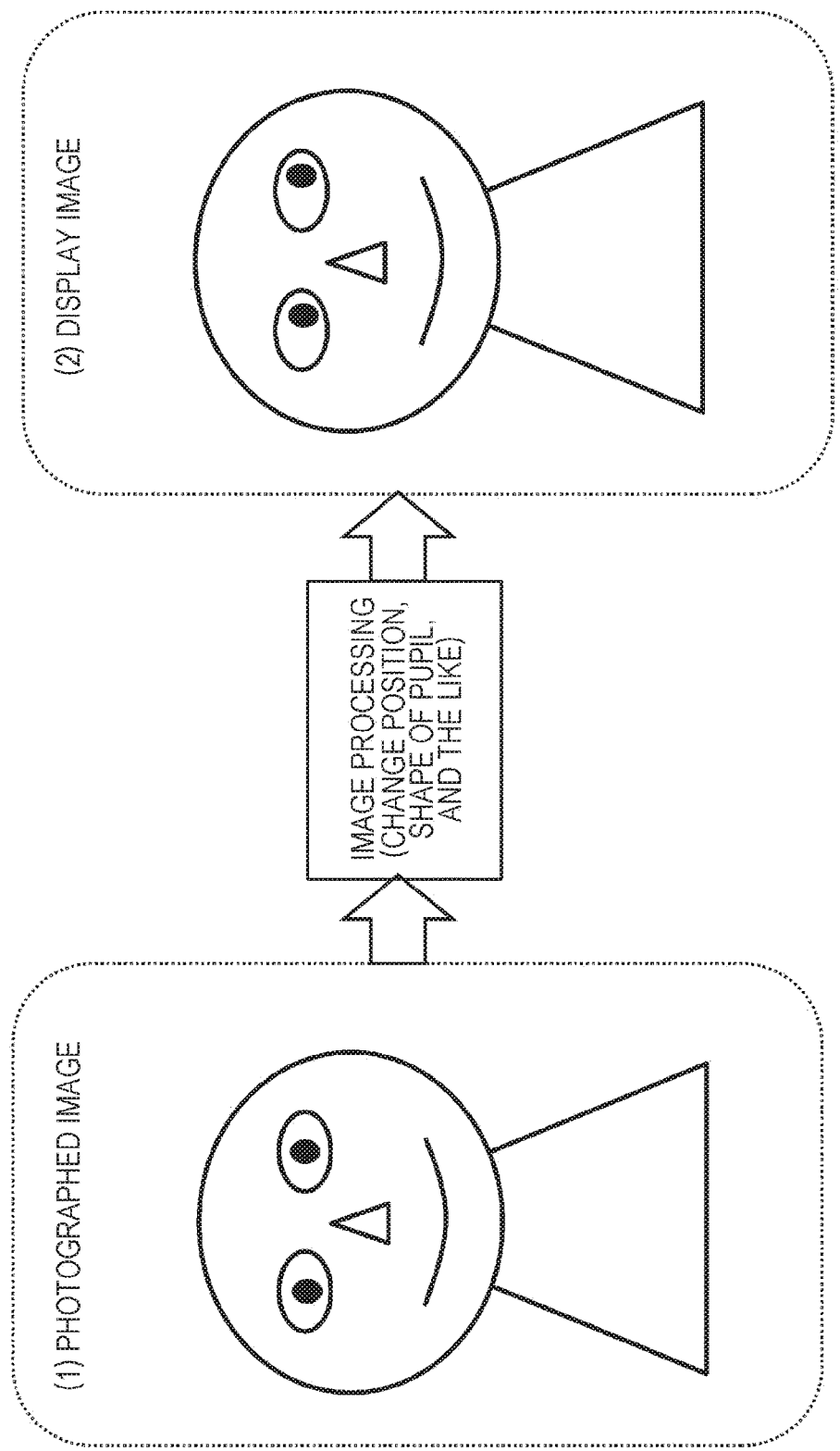
FIG. 6 is a diagram illustrating an exemplary solution of a problem of an image displayed on a display unit.

Meanwhile, as illustrated in FIG. 6, Patent Document 3 (Japanese Unexamined Patent Application Publication No. 2012-070081) discloses a configuration that corrects and displays the position, the shape, or the like of the eyes on the face of a person included in the display image so as to allow the display image on the display unit to match with the actual line-of-sight direction.

This processing, however, need to extract a face image to be displayed on the display unit, identify the image region of the eye included in the extracted face image, and perform correction processing on the eye image region in accordance with the actual line-of-sight direction of each of persons, leading to necessity of performing special image processing.

Furthermore, image correction processing like this might result in displaying an image that would give more strange feeling.

The following is description of a configuration of the present disclosure enabling clear discrimination of to whom among the viewing users viewing the display unit the communication participating user (displayed user) displayed on the display unit (display) is speaking to without causing such a problem.

2. (First Exemplary Embodiment) Configuration and Processing of Information Processing Apparatus According to First Exemplary Embodiment of Present Disclosure Hereinafter, a configuration and processing of information processing apparatus according to a first exemplary embodiment of the present disclosure will be described.

The information processing apparatus according to the present disclosure described below controls a display image on a display unit (display) used in the bidirectional communication system illustrated in FIGS. 1 and 2 described above, for example.

Hereinafter, a plurality of exemplary embodiments of the present disclosure will be sequentially described.

[2-1. Processing Executed by Information Processing Apparatus]

Processing executed by the information processing apparatus according to the first exemplary embodiment of the present disclosure will be described with reference to FIG. 7.

Figure 7:
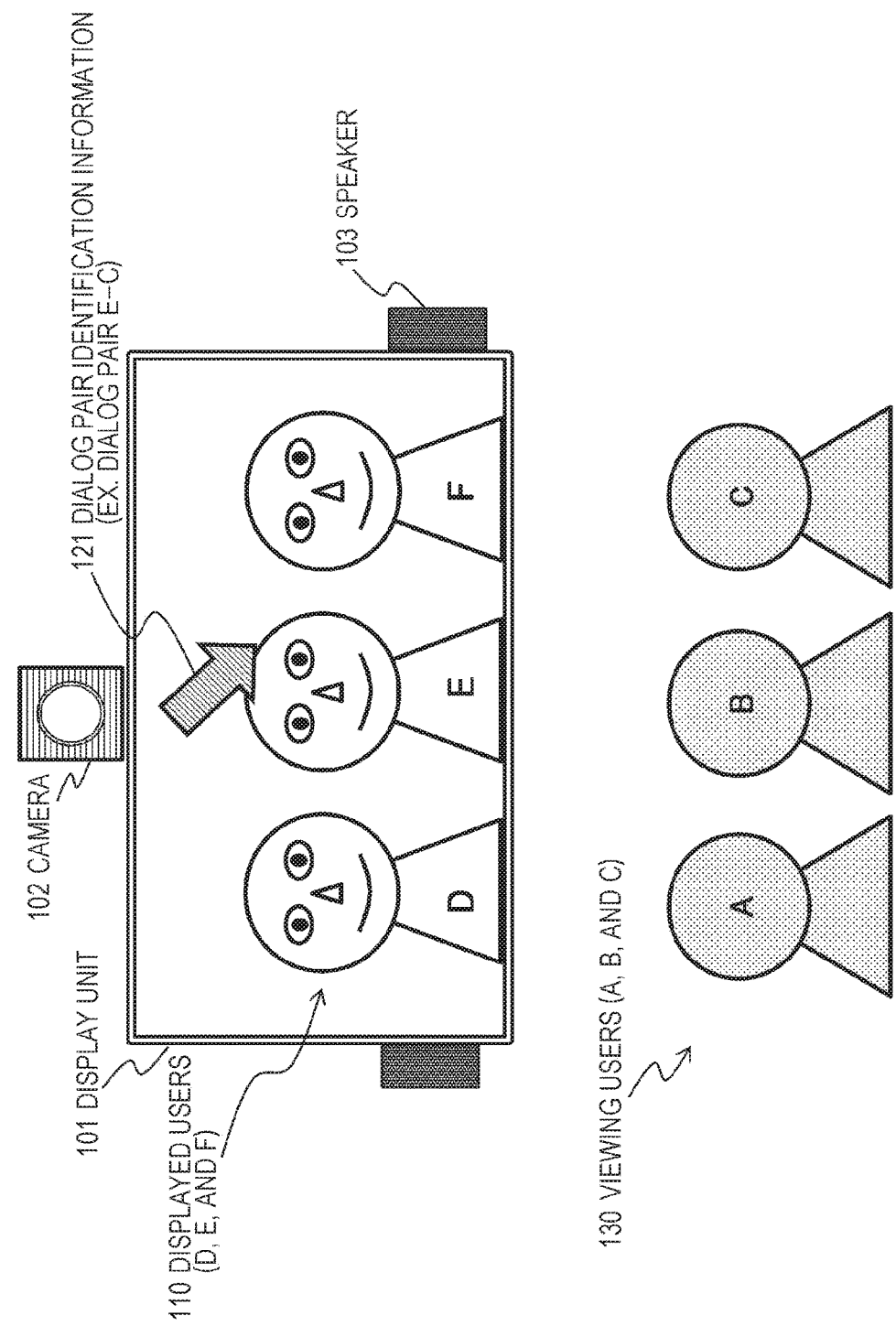
FIG. 7 is a diagram illustrating exemplary processing executed by an information processing apparatus according to a first exemplary embodiment of the present disclosure.

FIG. 7 is a diagram illustrating a state of a first location as one of the locations during execution of the bidirectional communication described with reference to FIGS. 1 and 2.

The illustration includes viewing users A to C, 130 as users of the first location, and a display unit 101. The display unit 101 includes a camera 102 and a speaker 103.

The display unit 101 displays users D to F at the second location.

Note that in the following, the user displayed on the display unit is referred to as a "displayed user", and the user viewing the display unit is referred to as a "viewing user".

The displayed users 110 illustrated in FIG. 7 are users D, E, and F, and the viewing users 130 are users A, B, and C.

It is assumed that one of the viewing users 130 (A, B, and C) and one of the displayed users 110 (D, E, and F) are speaking to each other.

In the present exemplary embodiment, "dialog pair identification information 121" indicating to which viewing user the displayed user (speaker) displayed on the display unit 101 is speaking is displayed on the display unit 101.

The arrow illustrated above the displayed user E of the display unit 101 in the figure is the "dialog pair identification information 121".

In the illustrated example, the pair of users having dialog, that is, "dialog pair" is the displayed user E and the viewing user C. That is, the dialog pair is "E-C".

In the case of the dialog pair E-C, the "arrow" being the "dialog pair identification information 121" displayed on the display unit 101 in the figure is illustrated in the vicinity of the displayed user E (upper portion in the present example) forming the dialog pair, and the direction of the arrow is displayed as a setting arrow directed toward the viewing user C of the dialog pair.

By viewing the "dialog pair identification information 121" displayed together with the displayed user 110 on the display unit 101, the viewing users A to C can correctly judge that the displayed user E is speaking to the viewer user C.

The viewing user C can immediately confirm that the displayed user E is speaking to oneself, and smooth communication is achieved.

Figure 8:
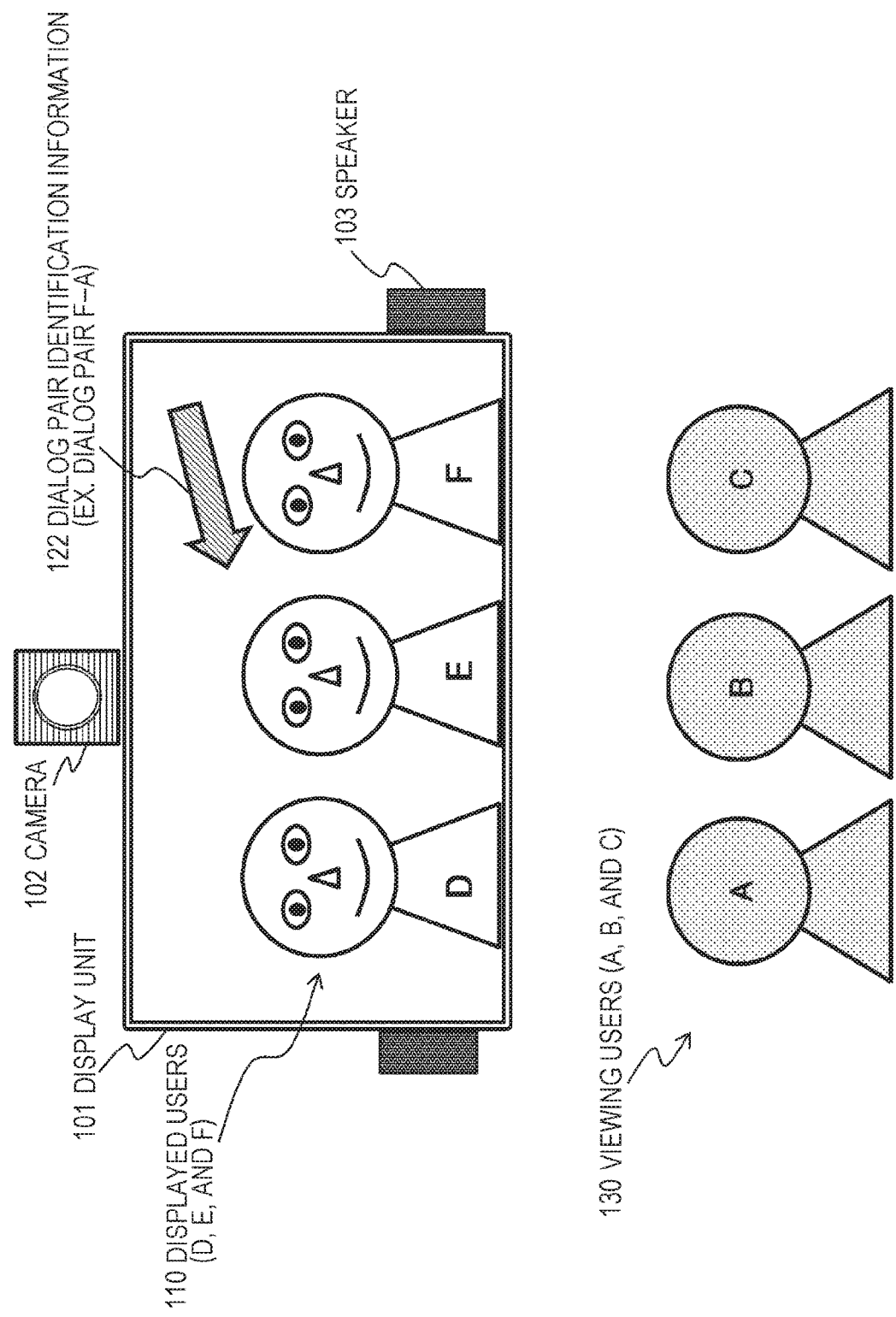
FIG. 8 is a diagram illustrating exemplary processing executed by an information processing apparatus according to the first exemplary embodiment of the present disclosure.

FIG. 8 illustrates an exemplary case where the "dialog pair" is the displayed user F and the viewing user A. That is, the dialog pair is "F-A".

In the setting of the dialog pair, the "arrow" being the "dialog pair identification information 122" displayed on the display unit 101 in the figure is illustrated in the vicinity of the displayed user F (upper portion in the present example) forming the dialog pair, and the direction of the arrow is displayed as a setting arrow directed toward the viewing user A of the dialog pair.

By viewing the "dialog pair identification information 122" displayed together with the displayed user 110 on the display unit 101, the viewing users A to C correctly judge that the displayed user F is speaking to the viewing user A.

The viewing user A can immediately confirm that the displayed user F is speaking to oneself, and smooth communication is achieved.

The examples illustrated in FIGS. 7 and 8, are examples using identification marks shaped like an "arrow" as the "dialog pair identification information".

The dialog pair identification information, however, is not limited to this arrow, but various forms are possible.

Figure 9:
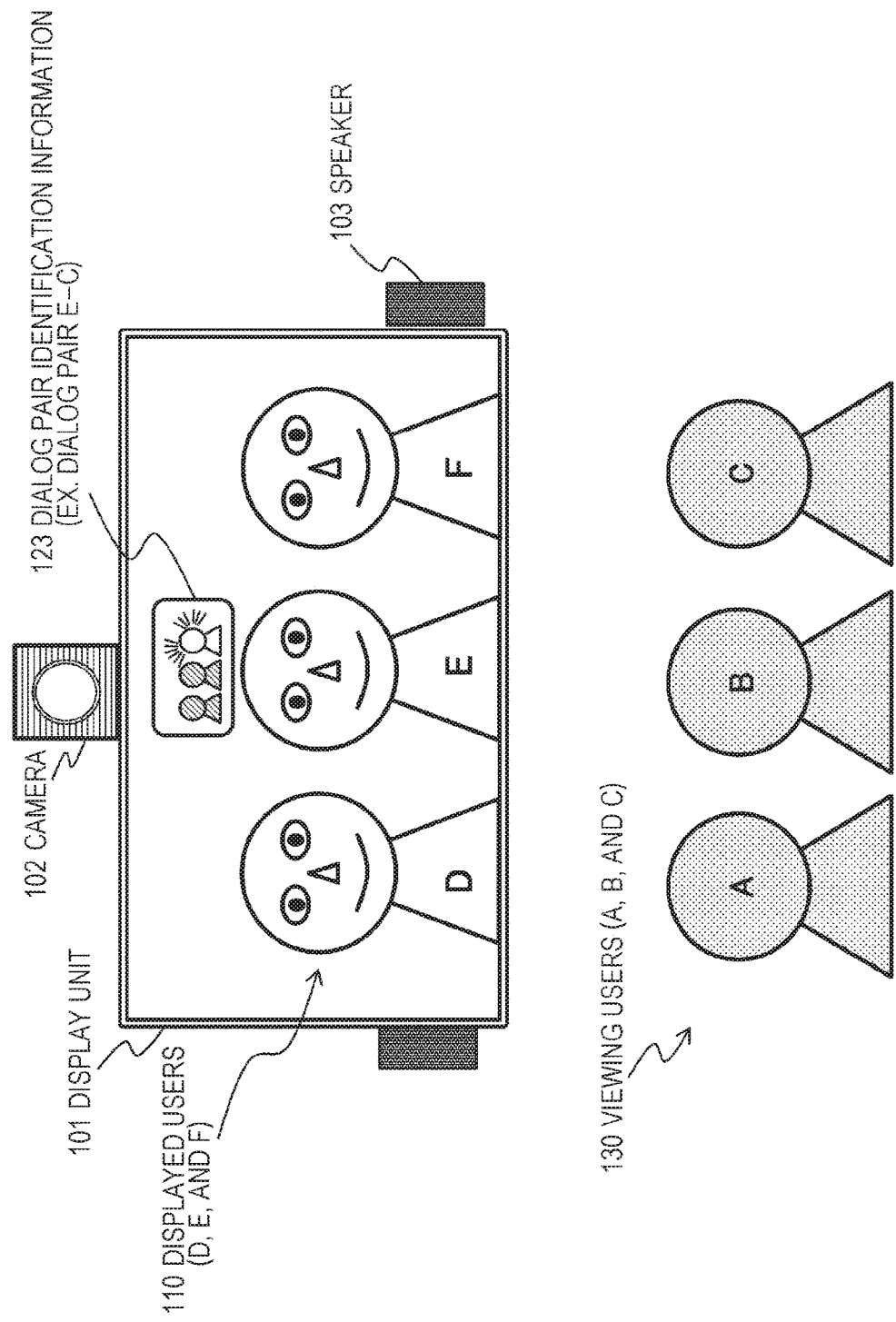
FIG. 9 is a diagram illustrating exemplary processing executed by an information processing apparatus according to the first exemplary embodiment of the present disclosure.

For example, FIG. 9 illustrates an example of using "dialog pair identification information 123" that arranges human-shaped icons similar to the arrangement of the viewing users.

The "viewing user line icon" as the "dialog pair identification information 123" displayed on the display unit 101 of FIG. 9 is indicated in the vicinity (upper portion in the present example) of the displayed user E forming the dialog pair.

Among a plurality of viewing user line icons illustrated in the "viewing user line icon", one user icon corresponding to the position of the viewing user C forming the dialog pair blinks.

By viewing the "dialog pair identification information 123" displayed together with the displayed user 110 on the display unit 101, the viewing users A to C can correctly judge that the displayed user E is speaking to the viewing user C.

The viewing user C can immediately confirm that the displayed user E is speaking to oneself, and smooth communication is achieved.

Figure 10:
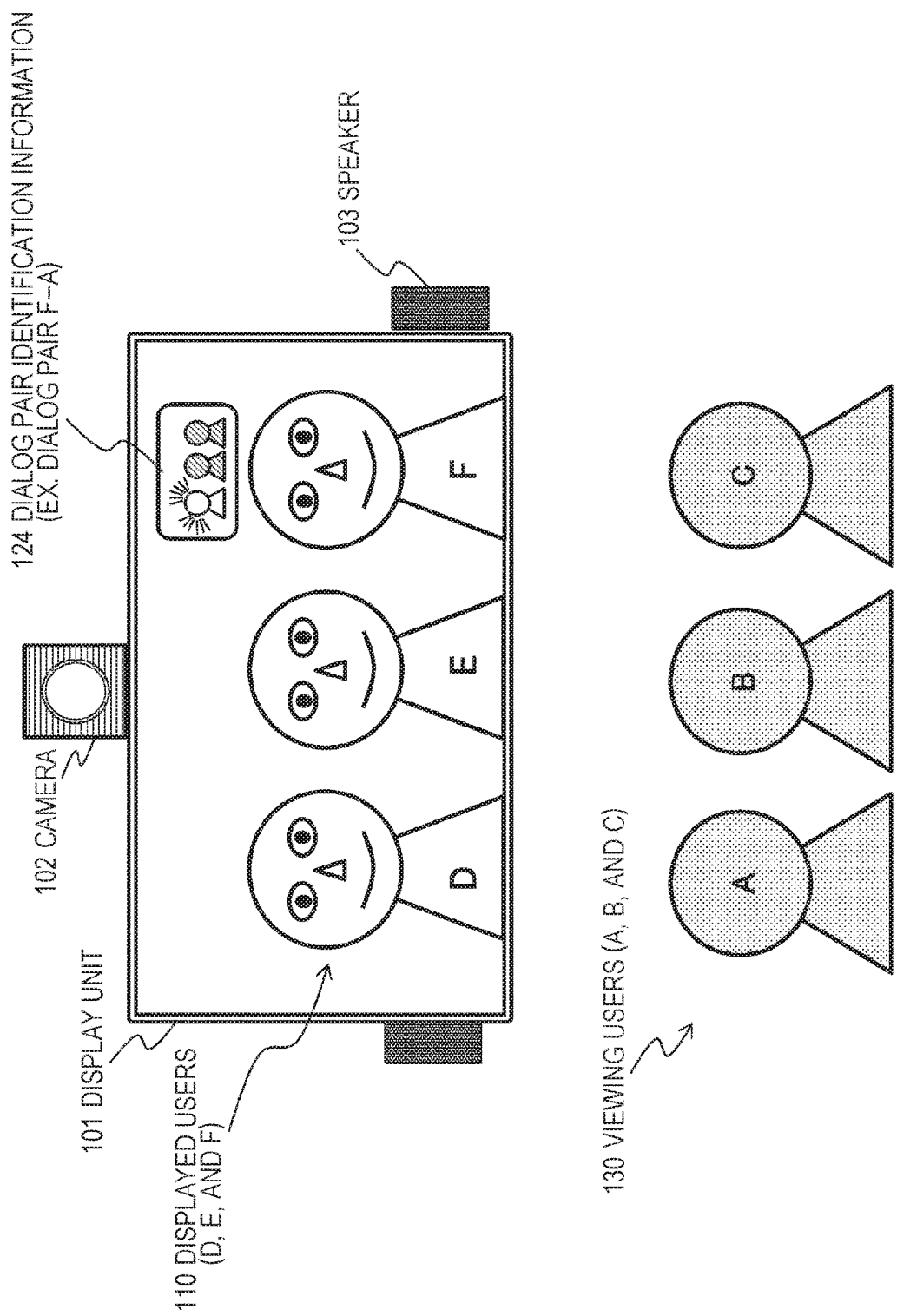
FIG. 10 is a diagram illustrating exemplary processing executed by an information processing apparatus according to the first exemplary embodiment of the present disclosure.

FIG. 10 illustrates an example in a case where the dialog pair is F-A.

The "viewing user line icon" as the "dialog pair identification information 124" displayed on the display unit 101 of FIG. 10 is indicated in the vicinity (upper portion in the present example) of the displayed user F forming the dialog pair.

Among a plurality of viewing user line icons illustrated in the "viewing user line icon", one user icon corresponding to the position of the viewing user A forming the dialog pair blinks.

By viewing the "dialog pair identification information 124" displayed together with the displayed user 110 on the display unit 101, the viewing users A to C correctly judge that the displayed user F is speaking to the viewer user A.

The viewing user A can immediately confirm that the displayed user F is speaking to oneself, and smooth communication is achieved.

An example of "dialog pair identification information" of two different modes has been described with reference to FIGS. 7 to 10.

In addition to these examples, for example, it is possible to use a display of the number indicating the position of the viewing user or the name of the viewing user, various other marks, icons or the like.

[2-2. Configuration Example of Information Processing Apparatus]

Next, a configuration of the information processing apparatus according to the first exemplary embodiment will be described with reference to FIG. 11.

Figure 11:
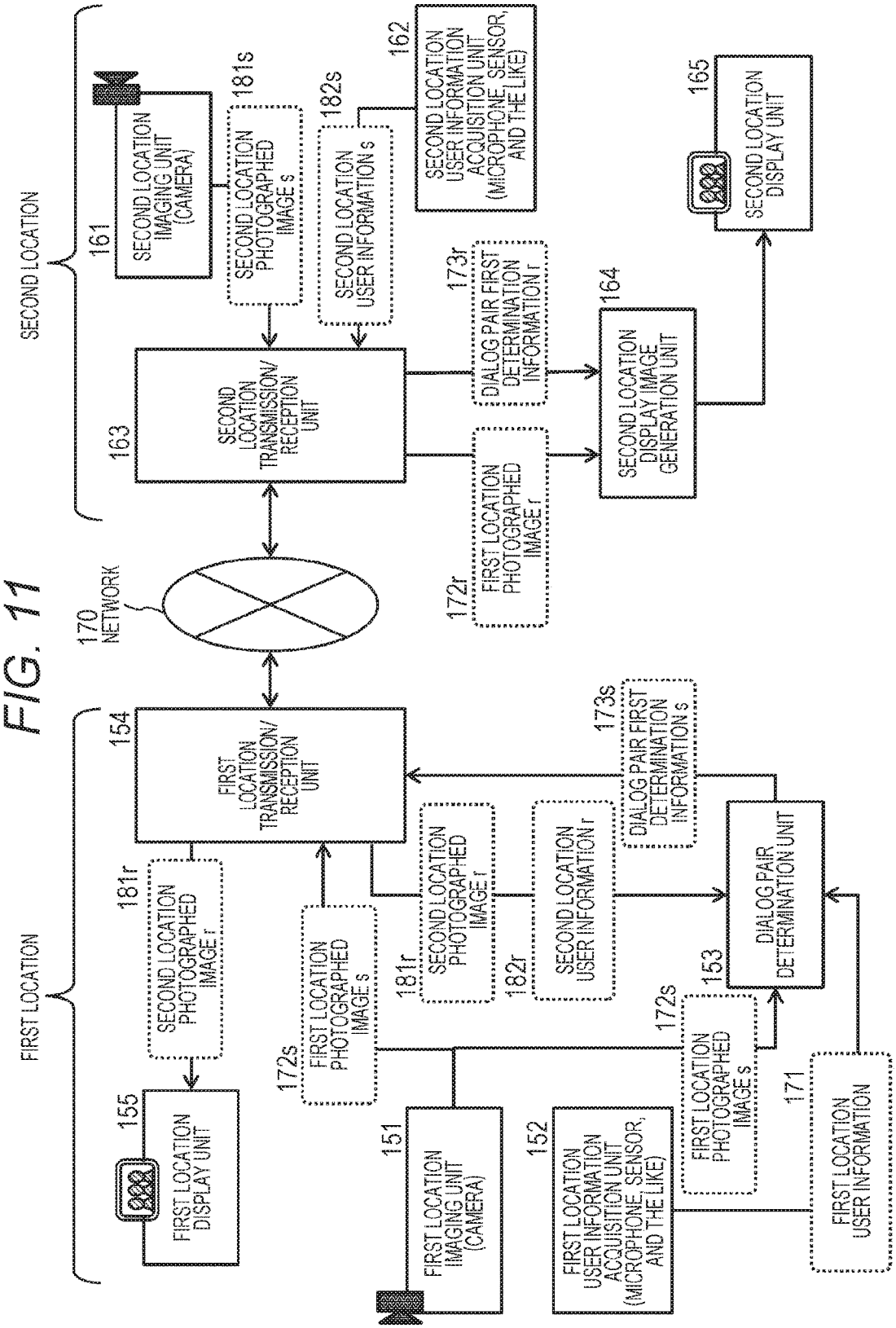
FIG. 11 is a diagram illustrating an exemplary configuration of an information processing apparatus according to the first exemplary embodiment of the present disclosure.

FIG. 11 illustrates a configuration example of an information processing apparatus of a first location and a second location, executing bidirectional communication via a network.

Apparatuses at individual locations perform telecommunication via a network 170 such as the Internet, and users at the individual locations perform bidirectional communication such as a conference.

In the configuration of the first exemplary embodiment, the "dialog pair identification information" described with reference to FIGS. 7 to 10 is superimposed and displayed on the displayed user in the display unit of the second location illustrated in FIG. 11, that is, a second location display unit 165 indicated at the lower right end of FIG. 11.

The "dialog pair identification information" is not displayed on the display unit of the first location illustrated in FIG. 11, that is, the first location display unit 155 indicated at the upper left end of FIG. 11, and a normal image including the displayed user alone is displayed.

Note that the bidirectional processing system that displays "dialog pair identification information" on the display apparatuses at both locations will be described as a second exemplary embodiment at a later stage.

First, a configuration and processing of the information processing apparatus on the first location side will be described.

The first location imaging unit (camera) 151 photographs a user at the first location, for example, users A to C.

A first location photographed image s, 172s, as the photographed image, is transmitted from the first location transmission/reception unit 154 to the second location via the network 170.

Note that, although not illustrated in the drawing, voice data is also transmitted together with the image.

Note that the data indicated by the dotted frame in the figure is data to be input/output between individual components.

Data transmitted and received between locations are discriminated such that (s) is added to the transmission side data and (r) is added to the reception side data.

The first location photographed image s, 172s which is the photographed image described above is image data transmitted from the first location to the second location, and (s) is added.

A first location photographed image r, 172r illustrated on the second location side in FIG. 11 is the same data as the "first location photographed image s, 172s" illustrated on the first location side. This is the data transmitted from the first location to the second location and received by the information processing apparatus at the second location, illustrated with (r) added.

The first location display unit 155 displays the second location photographed image r, 181r transmitted from the second location.

The first location user information acquisition unit 152 includes a microphone for acquisition of user information other than the image data obtained by the first location imaging unit (camera) 151, for example, voice data and a voice direction, a sensor for acquisition of the user position or a distance from the camera, or the like.

The user information together with the user image information photographed by the imaging unit 151 is input to the dialog pair determination unit 153.

As illustrated in the figure, the first location photographed image s, 172s and the first location user information 171 are input to the dialog pair determination unit 153.

The dialog pair determination unit 153 inputs, also from the second location, the second location photographed image r, 181r which is an image of the user on the second location side, and second location user information 182r including the voice and the position information of the user at the second location and the like.

The dialog pair determination unit 153 uses the input data to examine which pair of users among the first location side users and the second location side users are executing the dialog, namely execute dialog pair detection processing.

Specifically, the processing identifies the users executing a dialog between the first location and the second location, so as to obtain the position information of these users.

Specifically, the presence or absence of a dialog is first determined on the basis of voice data, and in a case where it is determined that a dialog is present, the users at individual locations executing the dialog is identified from the image data, the voice direction data, or the like.

This identification processing can be performed, for example, by analysis based on voice direction data or by analysis of a line-of-sight direction of a dialog user using image data or the like.

The user position information is position information needed for displaying the dialog pair identification information described above with reference to FIGS. 7 to 10, and includes the display position of the displayed user forming the dialog pair and the relative position of the viewing user in front of the display unit with respect to the display unit.

In this manner, the dialog pair determination unit 153 identifies the dialog pair using the user image, the voice, the voice direction information, the user position information, or the like obtained from each of locations, determines the position of the user forming the dialog pair, and generates dialog pair first determination information s, 173s including these pieces of information.

The dialogue pair first determination information s, 173s generated by the dialog pair determination unit 153 is transmitted to the information processing apparatus at the second location via the first location transmission/reception unit 154 and the network 170.

Note that while the configuration illustrated in FIG. 11 is a case where the dialog pair determination unit 153 generates the dialog pair determination information using the voice information and the sensor detection information other than the photographed image, it is also allowable to configure to generate the dialog pair determination information using the photographed image input from each of locations alone.

The user position is discriminated from the camera position and the positional relationship of each of the users included in the image, and the mouth movement obtained from the image is analyzed to identify the speaker executing the dialog. With this processing, it is also possible to generate dialog pair determination information by using images alone.

Next, processing executed by the information processing apparatus at the second location will be described.

A second location imaging unit (camera) 161 photographs users at the second location, for example, the users D to F.

A second location photographed image s, 181s as the photographed image is transmitted from a second location transmission/reception unit 163 to the first location via the network 170.

Note that, although not illustrated in the drawing, voice data is also transmitted together with the image.

The second location user information acquisition unit 162 includes a microphone for acquisition of user information other than the image data obtained by the second location imaging unit (camera) 161, for example, voice data and a voice direction, a sensor for acquisition of the user position or a distance from the camera, or the like.

These pieces of user information are transmitted to the first location together with the user image information photographed by the imaging unit 161 and input to the dialog pair determination unit 153 of the first location to be used for the dialog pair determination processing.

The dialog pair first determination information generated by the dialog pair determination unit 153 at the first location is input to a second location display image generation unit 164 of the information processing apparatus at the second location.

As illustrated in the figure, the first location photographed image r, 172r, together with dialog pair first determination information r, 173r generated by the dialog pair determination unit 153 at the first location are input to the second location display image generation unit 164.

The second location display image generation unit 164 applies these pieces of input data to generate a display image obtained by superimposing "dialog pair identification information" as described with reference to FIGS. 7 to 10 on the first location photographed image r, 172r including the user of the first location, and outputs the generated display image to the second location display unit 165.

The second location display image generation unit 164 identifies the displayed user and the viewing user forming the dialog pair on the basis of the dialog pair first determination information r, 173r generated by the dialog pair determination unit 153 of the first location, and further obtains position information of the users, and then, decides a display mode of "dialog pair identification information" to be displayed on the display unit on the basis of these pieces of information.

The "dialog pair identification information" is displayed on the display image including the user at the first location in accordance with the display mode decided by this processing.

As a result, the display image on which the "dialog pair identification information" as described above with reference to FIGS. 7 to 10 is superimposed is displayed on the second location display unit 165.

Note that while the configuration illustrated in FIG. 11 is a case where the display image on which the "dialog pair identification information" is superimposed is displayed on the second location display unit 165 alone, it is also possible to allow the display image on which the "dialog pair identification information" is superimposed to be displayed on the first location display unit 155 by setting an image processing unit that executes image processing similarly to the processing executed by the second location display image generation unit 164 on the first location side.

That is, it is allowable to configure to input the dialog pair first determination information s, 173s generated by the dialog pair determination unit 153 at the first location to the display image generation unit set on the first location side, and to display a display image on which the "dialog pair identification information" is superimposed, on the first location display unit 155.

Figure 12:
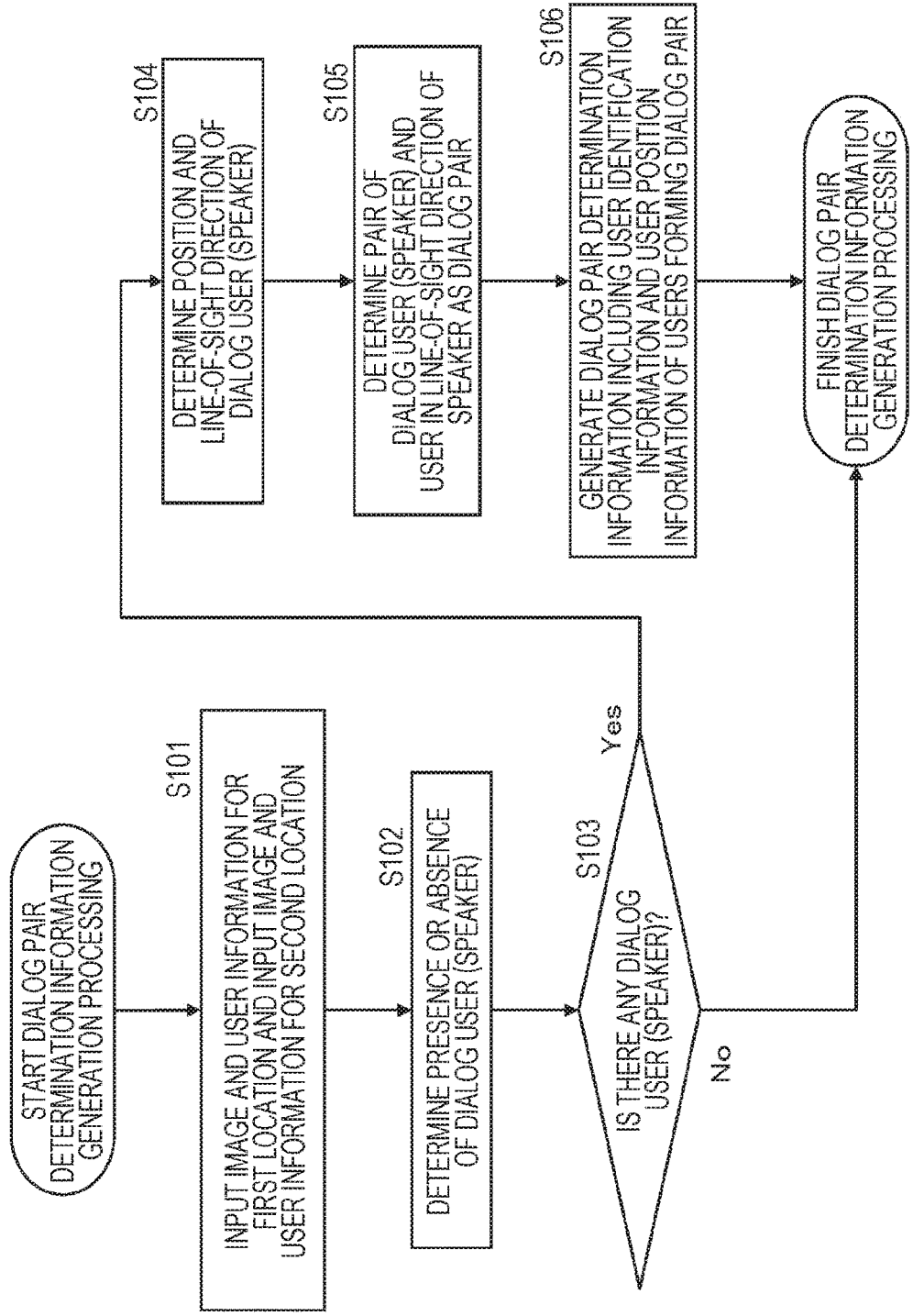
FIG. 12 is a flowchart illustrating a processing sequence executed by the information processing apparatus of the present disclosure.

Next, a sequence example of the dialog pair determination processing executed by the first location side dialog pair determination unit 153 illustrated in FIG. 11 will be described with reference to a flowchart illustrated in FIG. 12.

Hereinafter, processing of each of steps of the flowchart illustrated in FIG. 12 will be sequentially described.

(Step S101)

First, in step S101, the dialog pair determination 153 inputs the image and user information of the first location, and the image and user information of the second location.

As described above with reference to FIG. 11, the dialog pair determination unit 153 inputs the first location photographed image s, 172s which is an image of the user on the first location side, and the first location user information 171 including the voice, the position information, and the like of the user at the first location.

Furthermore, the dialog pair determination unit 153 inputs the second location photographed image r, 181r, which is the image of the user on the second location side received from the second location via the network, and the second location user information 182r including the voice and the position information, and the like of the user at the second location.

(Steps S102 to S103)

Next, the dialog pair determination unit 153 determines in steps S102 to S103 whether there is a speaker in the first location side users and the second location side users, that is, whether a dialog is being executed by using data input in step S101.

Specifically, the processing includes determination of the presence or absence of the dialog on the basis of the voice data, for example. Alternatively, determination may be performed by detecting mouth movement from the image data.

In a case where it is determined that the dialog is being performed, the processing proceeds to step S104.

In a case where it is determined that the dialog is not being performed, the processing is finished.

(Step S104)

Next, in step S104, the dialog pair determination unit 153 determines the position and the line-of-sight direction of the dialog user (speaker).

For example, the line-of-sight direction analysis of the dialog user using the image data is executed.

(Step S105)

Next, the dialog pair determination unit 153 determines in step S105 a pair including the dialog user (speaker) and the user present in the line-of-sight direction of the speaker to be a dialog pair.

Specifically, the processing identifies the users executing a dialog between the first location and the second location. This identification processing can be performed, for example, by analysis based on voice direction data or by analysis of a line-of-sight direction of a dialog user using image data or the like.

The user pair identified by this user identification processing is determined to be the dialog pair.

(Step S106)

Next, the dialog pair determination unit 153 generates in step S105 dialog pair determination information including user identification information and user position information of the users forming the dialog pair.

The user position information is position information needed for displaying the dialog pair identification information described above with reference to FIGS. 7 to 10, and includes the display position of the displayed user forming the dialog pair and the relative position of the viewing user in front of the display unit with respect to the display unit.

In this manner, the dialog pair determination unit 153 identifies the dialog pair using the user image, the voice, the voice direction information, the user position information, or the like obtained from each of locations, determines the position of the user forming the dialog pair, and generates dialog pair determination information including these pieces of information.

The dialog pair determination information generated by the dialog pair determination unit 153 is transmitted from the first location to the information processing apparatus at the second location so as to be used in generation processing of a display image including the dialog pair identification information described with reference to FIGS. 7 to 10 in the second location display image generation unit 164 of the information processing apparatus at the second location.

Figure 13:
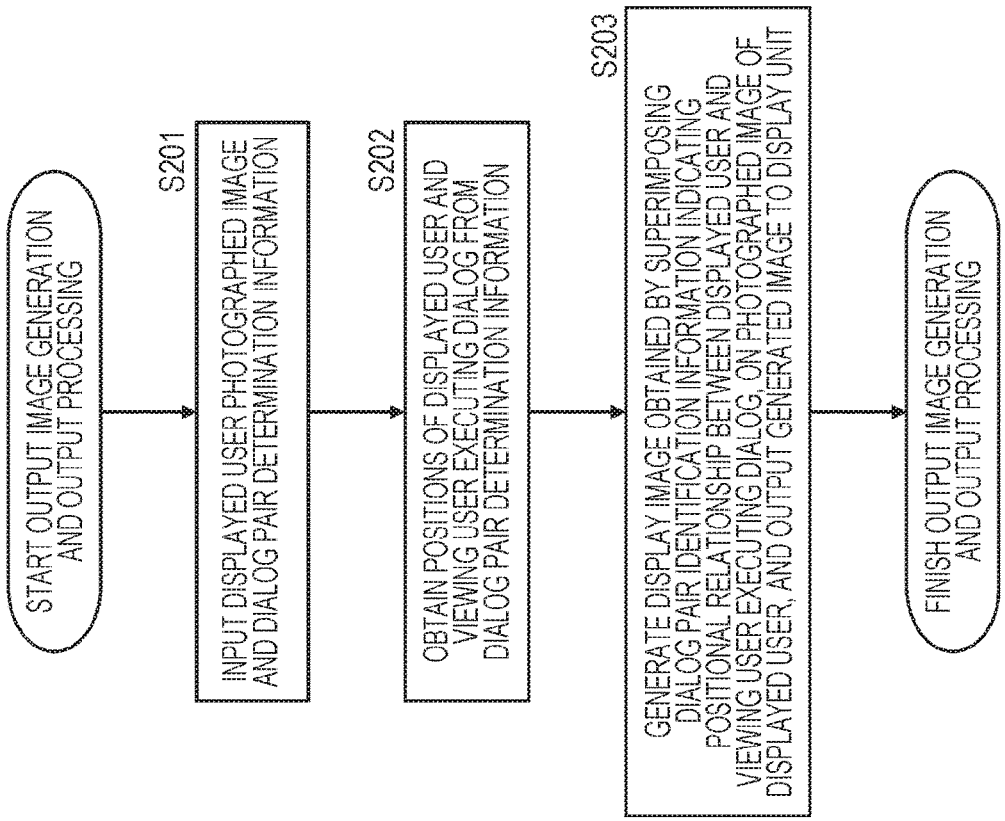
FIG. 13 is a flowchart illustrating a processing sequence executed by the information processing apparatus of the present disclosure.

Next, a processing sequence of generating and outputting a display image including dialog pair identification information to be executed in the second location display image generation unit 164 of the information processing apparatus at the second location will be described with reference to a flowchart illustrated in FIG. 13.

Hereinafter, processing of each of steps of the flowchart illustrated in FIG. 13 will be sequentially described.

(Step S201)

First, the second location display image generation unit 164 inputs in step S201 the photographed image of the displayed user and the dialog pair determination information.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information described above with reference to FIGS. 7 to 10, and includes the display position of the displayed user forming the dialog pair and the relative position of the viewing user in front of the display unit with respect to the display unit.

(Step S202)

Next, the second location display image generation unit 164 obtains in step S202 the positions of the displayed user and the viewing user executing the dialog from the dialog pair determination information input in step S201.

(Step S203)

Next, in step S203, the second location display image generation unit 164 generates a display image obtained by superimposing dialog pair identification information indicating the positional relationship between the displayed user and the viewing user executing the dialog, on the photographed image of the displayed user, and outputs the generated image to the display unit.

As described above with reference to FIG. 11, the second location display image generation unit 164 generates a display image obtained by superimposing "dialog pair identification information" as described with reference to FIGS. 7 to 10 on the first location photographed image r, 172r including the user of the first location, and outputs the generated display image to the second location display unit 165.

The second location display image generation unit 164 identifies the displayed user and the viewing user forming the dialog pair on the basis of the dialog pair first determination information r, 173r generated by the dialog pair determination unit 153 of the first location, and further obtains position information of the users, and then, decides a display mode of "dialog pair identification information" to be displayed on the display unit on the basis of these pieces of information.

The "dialog pair identification information" is displayed on the display image including the user at the first location in accordance with the display mode decided by this processing.

As a result, the display image on which the "dialog pair identification information" as described above with reference to FIGS. 7 to 10 is superimposed is displayed on the second location display unit 165.

With a view of the "dialog pair identification information" displayed on the display unit, the viewing user at the second location can immediately grasp correctly which user of the displayed users is speaking to which viewing user, leading to achievement of smooth communication.

3. (Second Exemplary Embodiment) Second Exemplary Embodiment of Bidirectional Processing System for Displaying Dialog Pair Identification Information on the Display Unit of Both Locations Next, as a second exemplary embodiment of the present disclosure, an exemplary embodiment of a bidirectional processing system that displays dialog pair identification information on each of display units arranged at a plurality of locations of execution of bidirectional communication will be described.

Figure 14:
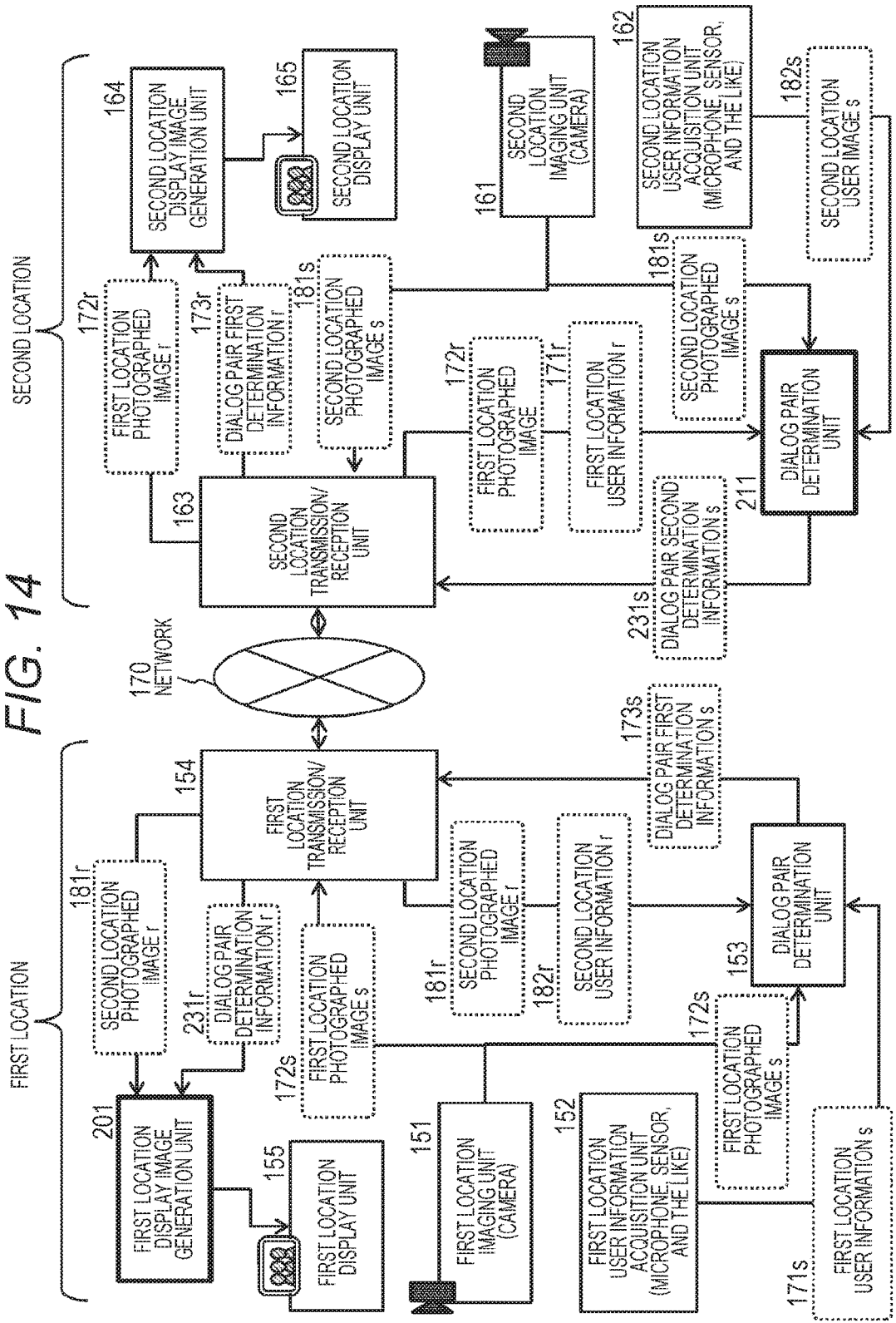
FIG. 14 is a diagram illustrating an exemplary configuration of an information processing apparatus according to a second exemplary embodiment of the present disclosure.

FIG. 14 is a diagram illustrating a configuration example of the information processing system according to the second exemplary embodiment.

Configurational difference from the system illustrated in FIG. 11 described in the first exemplary embodiment are as follows.

(a) The dialog pair determination unit 211 is set in the information processing apparatus of the second location, and (b) The first location display image generation unit 201 is set in the information processing apparatus of the first location.

The above configurations (a) and (b) are added to the configuration of FIG. 11 described in the first exemplary embodiment. This configuration displays dialog pair identification information by superimposing the information on the displayed user image not merely in the second location display unit 165 but also in the first location display unit 155.

As illustrated in FIG. 14, the dialog pair determination unit 211 of the information processing apparatus at the second location inputs the second location photographed images s, 181s and the second location user information 182s, and further inputs the first location photographed image r, 172r as reception data from the first location, and the first location user information r, 171r including voice, position information, and the like of the user of the first location.

The dialog pair determination unit 211 uses the input data to examine which pair of users among the first location side users and the second location side users are executing the dialog, namely execute dialog pair detection processing.

Specifically, the processing identifies the users executing a dialog between the first location and the second location, so as to obtain the position information of these users.

This processing is similar to the processing executed by the dialog pair determination unit 153 on the first location side described previously with reference to FIG. 11.

The dialog pair determination unit 211 identifies the dialog pair using the user image, the voice, the voice direction information, the user position information, or the like obtained from each of locations, determines the position of the user forming the dialog pair, and generates dialog pair second determination information s, 231s including these pieces of information.

The dialogue pair second determination information s, 231s generated by the dialog pair determination unit 211 is transmitted to the information processing apparatus at the first location via the second location transmission/reception unit 163 and the network 170.

Note that while the configuration illustrated in FIG. 14 is a case where the dialog pair determination unit 211 generates the dialog pair determination information using the voice information and the sensor detection information other than the photographed image, it is also allowable to configure to generate the dialog pair determination information using the photographed image input from each of locations alone.

The user position is discriminated from the camera position and the positional relationship of each of the users included in the image, and the mouth movement obtained from the image is analyzed to identify the speaker executing the dialog. With this processing, it is also possible to generate dialog pair determination information by using images alone.

The second location photographed image r, 181r, together with dialog pair second determination information r, 231r generated by the dialog pair determination unit 211 at the second location are input to the first location display image generation unit 201 at the first location.

The first location display image generation unit 201 applies these pieces of input data to generate a display image obtained by superimposing "dialog pair identification information" as described with reference to FIGS. 7 to 10 on the second location photographed image r, 181r including the user of the second location, and outputs the generated display image to the first location display unit 155.

The first location display image generation unit 201 identifies the displayed user and the viewing user forming the dialog pair on the basis of the dialog pair second determination information r, 231r generated by the dialog pair determination unit 211 of the second location, and further obtains position information of the users, and then, decides a display mode of "dialog pair identification information" to be displayed on the display unit on the basis of these pieces of information.

The "dialog pair identification information" is displayed on the display image including the user at the second location in accordance with the display mode decided by this processing.

As a result, the display image on which the "dialog pair identification information" as described above with reference to FIGS. 7 to 10 is superimposed is displayed on the first location display unit 155.

The other processing is the similar to the case of the first exemplary embodiment, and thus the description is omitted.

In the second exemplary embodiment, "dialog pair identification information" is superimposed on the display unit of both the first location and the second location in accordance with the user image of the other party's location and displayed.

As a result, both viewing users can accurately grasp to whom the displayed user displayed on the display unit is speaking to, making it possible to achieve smooth communication.

4. (Third Exemplary Embodiment) Exemplary Embodiment in which a Front Face Image can be Displayed Next, as a third exemplary embodiment of the present disclosure, an exemplary embodiment enabling the user's face displayed on the display unit to be displayed as a front-facing image will be described.

Figure 15:
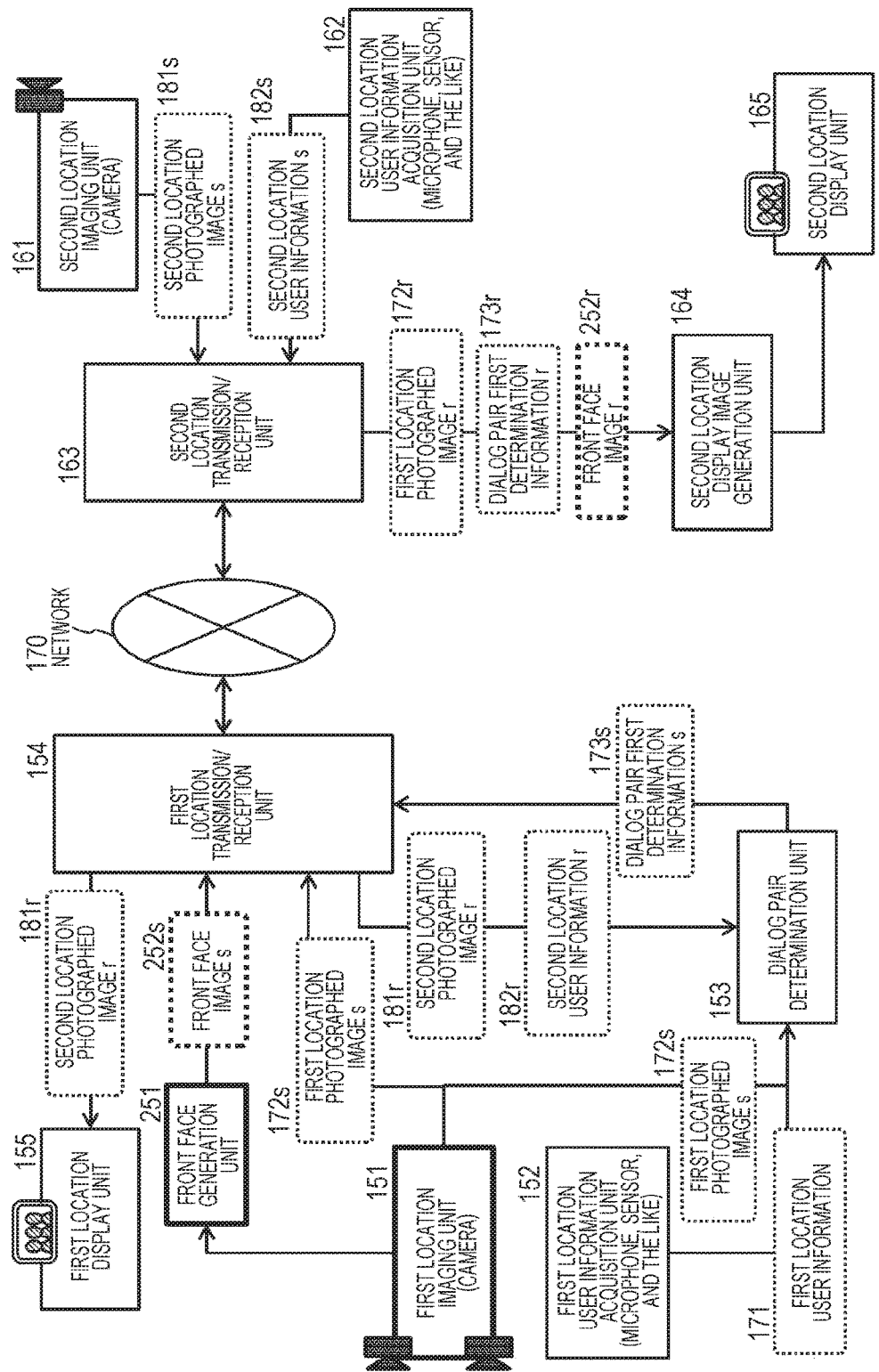
FIG. 15 is a diagram illustrating an exemplary configuration of an information processing apparatus according to a third exemplary embodiment of the present disclosure.

FIG. 15 is a diagram illustrating a configuration example of the information processing system according to the third exemplary embodiment.

Configurational differences from the system illustrated in FIG. 11 described in the first exemplary embodiment are as follows.

(a) The configuration has been changed to the configuration including a plurality of cameras to photograph the first location imaging unit 151 of the first location from a plurality of different viewpoints.

(b) A front face generation unit 251 is set in the information processing apparatus of the first location.

The above configuration changes (a) and (b) are added to the configuration of FIG. 11 described in the first exemplary embodiment, to enable displaying the displayed user's face displayed on the second location display unit 165 as a front-facing face.

The front face generation unit 251 inputs photographed images from a plurality of different viewpoints from the first location imaging unit 151 and generates a 3D model of the user as a subject using the plurality of images.

The 3D model includes three-dimensional position data of the subject and pixel value data of each of positions, and can be generated from images from different viewpoints.

The front face generation unit 251 applies the generated 3D model to generate a front face image s, 252s as a front-facing face image of the subject user, and transmits the generated image to the information processing apparatus at the second location via the network 170.

The second location display image generation unit 164 inputs the front face image r, 252r, replaces the face region of the first location photographed image r, 172r with this input front face image, and outputs the image.

Note that similarly to the first exemplary embodiment, the "dialog pair identification information" is superimposed on the image replaced by the front-facing face image so as to be displayed on the second location display unit 165.

As a result, the displayed user's face displayed on the second location display unit 165 is displayed as an image facing the front, and furthermore, as a display image on which "dialog pair identification information" as described above with reference to FIGS. 7 to 10 is superimposed.

The other processing is the similar to the case of the first exemplary embodiment, and thus the description is omitted.

In the third exemplary embodiment, the user image of the other party's location displayed on the display unit is the front-facing face image. Accordingly, the viewing user can feel that the displayed user displayed on the display unit is speaking, with eye-gaze, to the viewing user side, making it possible to achieve smooth communication.

Note that the displayed user to whom the front-facing face image is to be applied may be all the displayed users or specified displayed user as a dialog pair.

5. (Fourth Exemplary Embodiment) Exemplary Embodiment of Correcting and Displaying Background Image and Person Image Next, as a fourth exemplary embodiment of the present disclosure, an exemplary embodiment of correcting and displaying a background image and a person image to be displayed on a display unit will be described.

Figure 16:
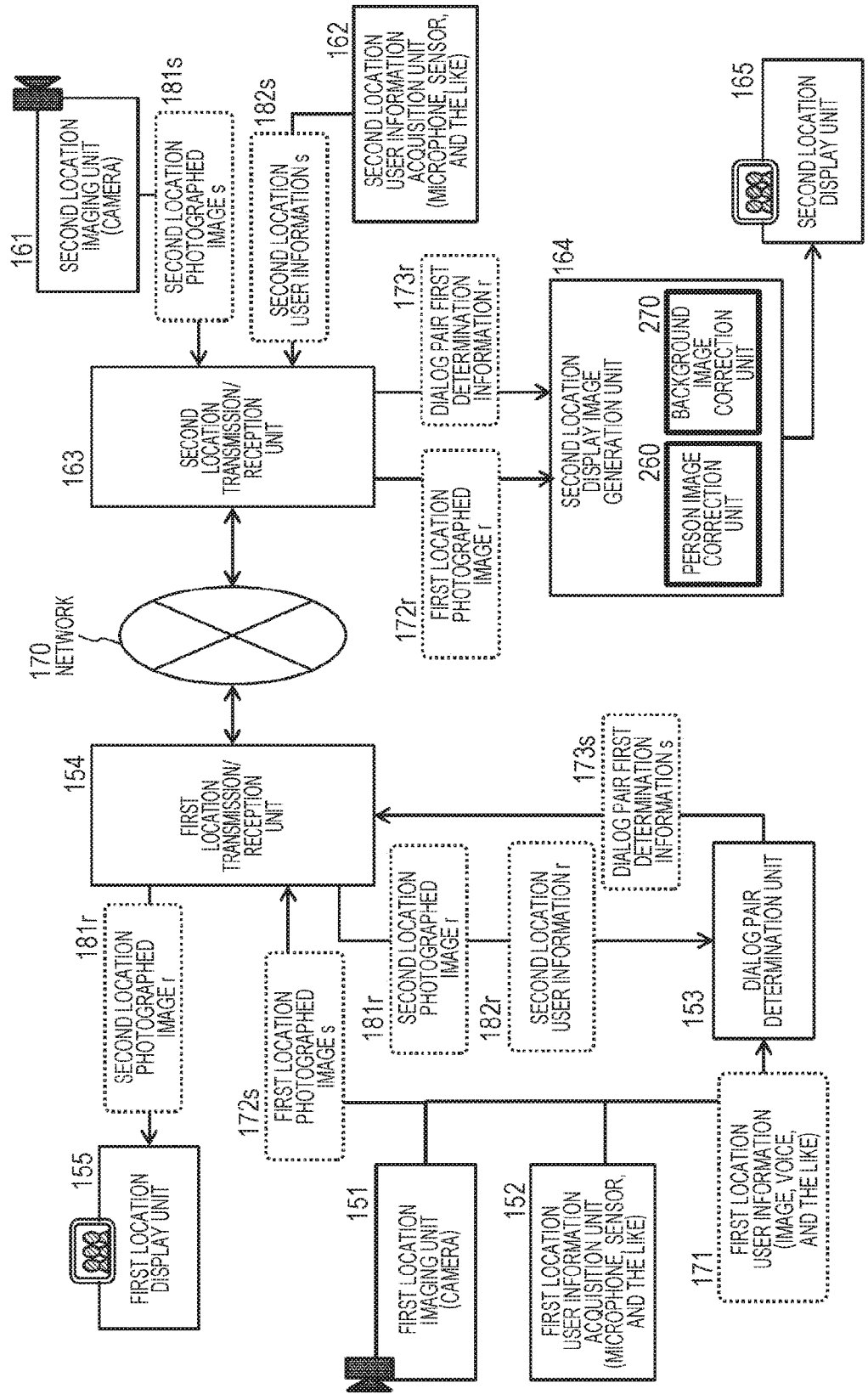
FIG. 16 is a diagram illustrating an exemplary configuration of an information processing apparatus according to a fourth exemplary embodiment of the present disclosure.

FIG. 16 is a diagram illustrating a configuration example of the information processing system according to the fourth exemplary embodiment.

Configurational differences from the system illustrated in FIG. 11 described in the first exemplary embodiment are as follows.

(a) The person image correction unit 260 and the background image correction unit 270 are set in the second location display image generation unit 164 of the second location.

The above configuration changes (a) is added to the configuration of FIG. 11 described in the first exemplary embodiment, so as to correct a image displayed on the second location display unit 165.

Figure 17:
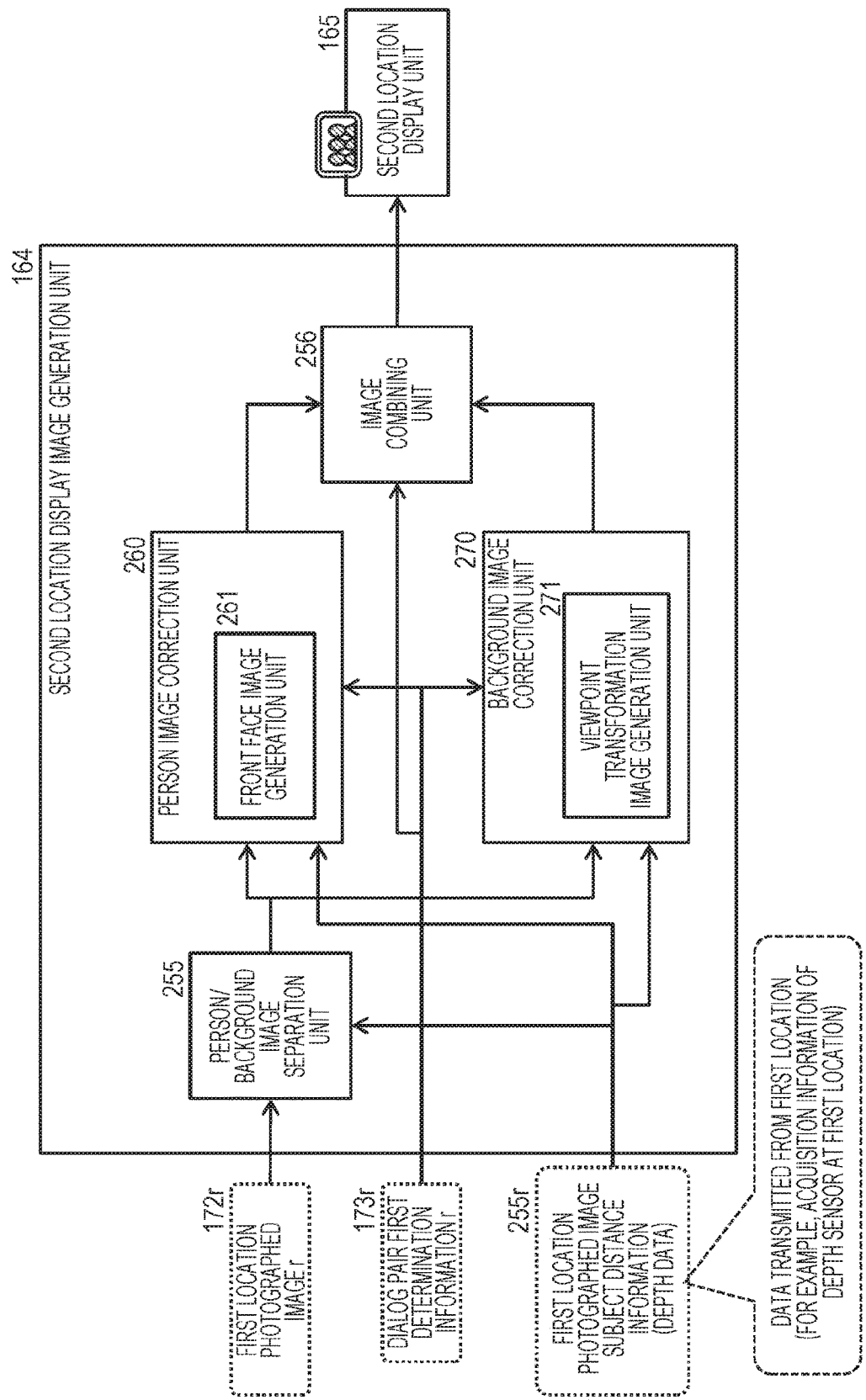
FIG. 17 is a diagram illustrating an exemplary configuration of a display image generation unit of an information processing apparatus according to a fourth exemplary embodiment of the present disclosure.

FIG. 17 illustrates a specific configuration example of the second location display image generation unit 164 at the second location.

A person/background image separation unit 255 of the second location display image generation unit 164 executes processing of separating a person image region included in the first location photographed image r, 172r from a background image region.

Note that first location photographed image subject distance information (depth data) 255r input from the first location is applied to this processing, for example.

Although not illustrated in FIG. 16, the information processing apparatus at the first location measures the subject distance using a depth sensor and transmits the measurement information to the second location.

Alternatively, it is also allowable to have a configuration as described above in the third exemplary embodiment, namely, a configuration of transmitting a plurality of images photographed from a plurality of different viewpoints to the second location, and then, the person/background image separation unit 255 may execute processing of separating the person image region from the background image region on the basis of the plurality of images.

The person image generated by the separation processing of the person/background image separation unit 255 is input to the front face image generation unit 261 of the person image correction unit 260, while the background image is input to a viewpoint transformation image generation unit 271 of a background image correction unit 270.

Incidentally, the dialog pair first determination information r, 173r and the first location photographed image subject distance information (depth data) 255r are also input to the person image correction unit 260 and the background image correction unit 270.

The front face image generation unit 261 of the person image correction unit 260 generates a front face of the displayed user similarly to the case of the front face generation unit 251 in the third exemplary embodiment described above.

Note that the displayed user to whom the front-facing face image is to be applied may be all the displayed users or specified displayed user as a dialog pair.

In addition, the viewpoint transformation image generation unit 271 of the background image correction unit 270 executes processing of changing the viewpoint and the perspective of the background image.

Note that the term "perspective" means a perspective view. An image displayed on the display unit is displayed as an image substantially corresponding to a perspective view from the viewpoint of the camera that has photographed the image. While there is no problem in a case where the camera viewpoint matches the viewpoint of the viewing user, the viewer would feel strange about the display image in a case where the camera viewpoint is different from the viewer's viewpoint.

This issue will be described with reference to FIGS. 18A, 18B, and 18C.

FIG. 18A illustrates a bidirectional communication execution environment.

Viewing users (D, E, and F) 282 are exchanging dialogs with displayed users (A, B, and C) 283 displayed on the display unit 281 with a display unit 281 arranged on a table 280.

A camera 284 is installed at an upper center of the display unit.

Note that communication is executed with a display unit with a camera arranged on a table of a same shape also at the location on the displayed users A to C, 283 side.

FIGS. 18B and 18C illustrate examples of perspectives (perspective views) as scenes observed from viewpoints of viewing users D, E, and F at this time.

FIG. 18B is a perspective example (perspective views) as a scene observed by the viewing user E at the viewpoint position corresponding to the photographing camera (the camera installed at the location of the displayed users A to C) of the image displayed on the display unit 281.

FIG. 18C is an exemplary perspective (perspective view) as a scene observed by the viewing user F at a viewpoint position different from the camera photographing the image displayed on the display unit 281.

In the example illustrated in FIG. 18B, the inclination of the side surface line of an actual table substantially is aligned with the inclination of the side surface line of a table displayed on the display unit, enabling the viewing user E to observe the image without feeling strange.

In the example illustrated in FIG. 18C, however, the inclination of the side surface line of an actual table substantially is not aligned with the inclination of the side surface line of a table displayed on the display unit, causing the viewing user F to observe the image with strange feelings.

This occurs because of a difference between the viewpoint of the viewing user and the viewpoint of the camera that photographs the image.

For example, correcting the image observed by the viewing user F would make it possible to generate an image not strange to the viewing user F.

For this processing, processing (perspective transformation processing) that transforms an image displayed on the display unit to a virtual viewpoint image photographed from the viewpoint of the viewing user F is effective.

That is, generating and displaying an image from a virtual viewpoint different from the actual camera viewpoint would make it possible to obtain an image with no strangeness in viewing the image from the position corresponding to the virtual viewpoint.

The viewpoint transformation image generation unit 271 illustrated in FIG. 17 executes generation processing of this virtual viewpoint image.

Specifically, this processing generates a virtual viewpoint image (background image) observed from the viewpoint of the viewing user identified as a dialog pair.

the first location photographed image subject distance information (depth data) 255*r* input from the first location is applied to the generation of the virtual viewpoint image, for example.

Although not illustrated in FIG. 16, the information processing apparatus at the first location measures the subject distance using a depth sensor and transmits the measurement information to the second location.

Alternatively, it is also allowable to have a configuration as described above in the third exemplary embodiment, namely, a configuration of transmitting a plurality of images photographed from a plurality of different viewpoints to the second location, and then, the viewpoint transformation image generation unit 271 may generate a virtual viewpoint image on the basis of the plurality of images.

The viewpoint transformation image generation unit 271 generates a virtual viewpoint image (background image) observed from the viewpoint of the viewing user forming the dialog pair obtained from the dialog pair first determination information r, 173*r*, and then outputs the generated image to an image combining unit 256.

The image combining unit 256 combines the front-facing person image generated by the front face image generation unit 261 with the virtual viewpoint image (background image) input from the viewpoint transformation image generation unit 271, and further superimposes the dialog pair identification information to generate a combined image, and displays the combined image on the second location display unit 165.

With this processing, the image displayed on the second location display unit 165 becomes a virtual viewpoint image observed from the viewpoint of the viewing user forming the dialog pair, and furthermore, the image being an image in which the displayed user forming the dialog pair faces the front. The viewing user can feel that the displayed user displayed on the display unit is speaking to the viewing user side, leading to achievement of smooth communication.

Note that the displayed user to whom the front-facing face image is to be applied may be all the displayed users or specified displayed user as a dialog pair.

6. (Fifth Exemplary Embodiment) Exemplary Embodiment of Tracking Position of Viewing User to Update Corrected Image in Processing of Correcting and Displaying Background Image and Person Image Next, as a fifth exemplary embodiment of the present disclosure, an exemplary embodiment of tracking a position of a viewing user to update a corrected image in processing of correcting and displaying a background image and a person image will be described.

This exemplary embodiment is an exemplary embodiment based on the above-described fourth exemplary embodiment to which a configuration of sequentially updating a virtual viewpoint image to be generated with a background image in accordance with the movement of the viewing user forming a dialog pair is added.

FIG. 19 is a diagram illustrating a configuration example of the information processing system of the fifth exemplary embodiment.

Configurational differences from the system illustrated in FIG. 16 described in the fourth exemplary embodiment are as follows.

(a) A second location photographed image s, 181*s* is input to the second location display image generation unit 164 at the second location.

The configuration change (a) is applied to the configuration of FIG. 16 described in the fourth exemplary embodiment, and the virtual viewpoint image to be generated with the background image is sequentially updated in accordance with the movement of the viewing user forming the dialog pair.

Figure 20:
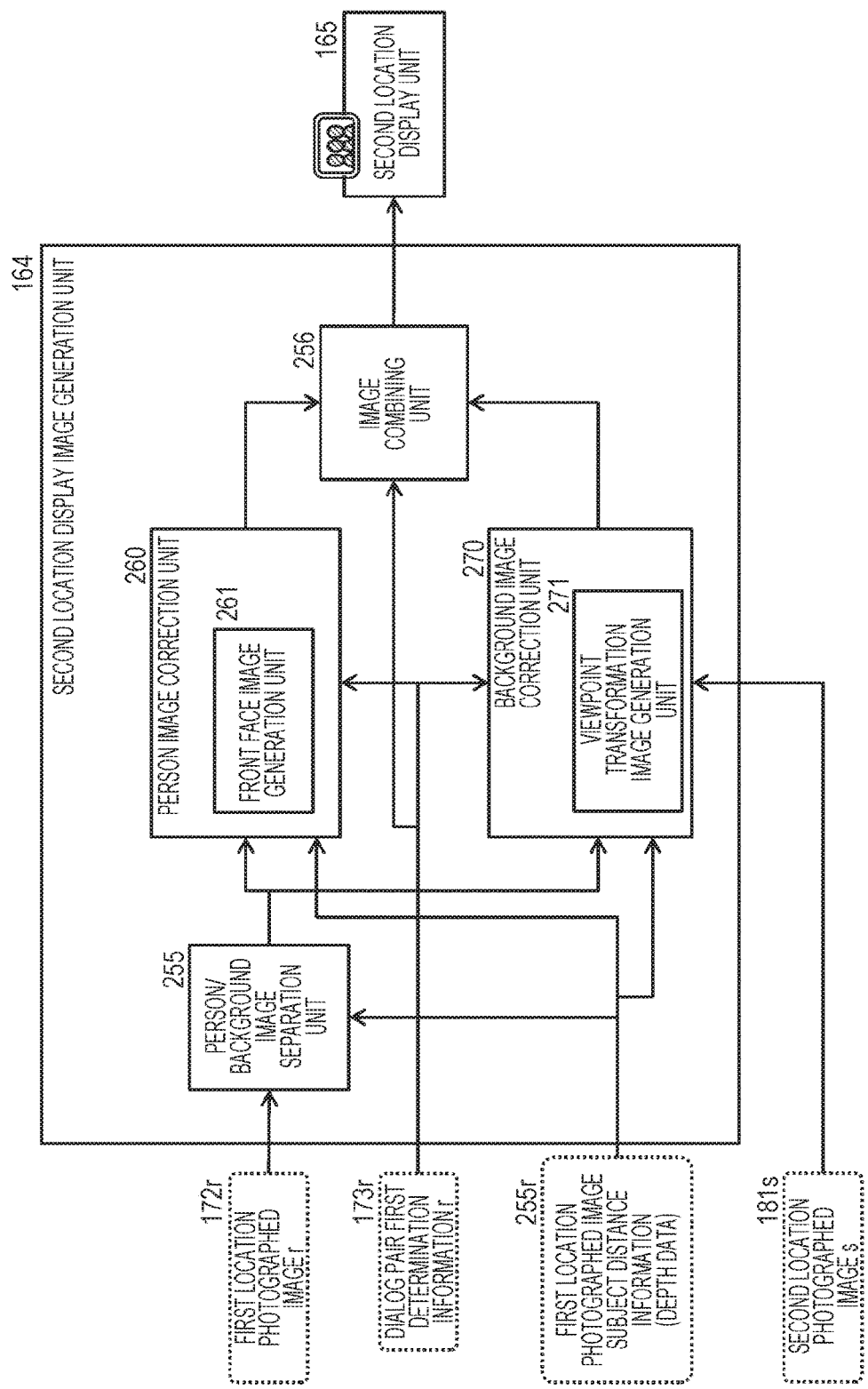
FIG. 20 is a diagram illustrating an exemplary configuration of a display image generation unit of the information processing apparatus according to the fifth exemplary embodiment of the present disclosure.

FIG. 20 illustrates a specific configuration example of the second location display image generation unit 164 at the second location.

The difference from the configuration illustrated in FIG. 17 described in the fourth exemplary embodiment is that the second location photographed images s, 181*s* are input to the background image correction unit 270.

The viewpoint transformation image generation unit 271 of the background image correction unit 270 generates a virtual viewpoint image (background image) observed from the viewpoint of the viewing user identified as a dialog pair similarly to the above-described fourth exemplary embodiment.

There is a case, however, the viewing user identified as a dialog pair move in front of the display unit or the camera.

When the viewing user specified as the dialog pair moves, the viewpoint position of the viewing user is changed.

In the present exemplary embodiment, the viewpoint transformation image generation unit 271 sequentially generates a virtual viewpoint image from the moving position of the viewing user in accordance with the moving position of the viewing user.

In other words, the viewpoint transformation image generation unit 271 sequentially updates the virtual viewpoint image according to the position of the viewing user specified as the dialog pair, and displays the updated image on the display unit.

The viewpoint transformation image generation unit 271 obtains from the second location photographed image s, 181*s* the position information of the viewing user forming a dialog pair obtained from the dialog pair first determination information r, 173*r*, and sequentially generates a virtual viewpoint image (background image) observed from this position (viewpoint) and outputs the generated images to the image combining unit 256.

The image combining unit 256 combines the front-facing person image generated by the front face image generation unit 261 with the virtual viewpoint image (background image) input from the viewpoint transformation image generation unit 271, and further superimposes the dialog pair identification information to generate a combined image, and displays the combined image on the second location display unit 165.

With this processing, the image displayed on the second location display unit 165 becomes a virtual viewpoint image observed from the viewpoint of the viewing user forming the dialog pair, and furthermore, the image being an image in which the displayed user forming the dialog pair faces the front.

Moreover, the present exemplary embodiment has a configuration in which the virtual viewpoint position of the background image is also changed together with the movement of the viewing user identified as a dialog pair, and this suppresses strangeness in the image observed even when the viewing user moves.

7. Specific Example of Dialog Pair Identification Information

The above-described exemplary embodiment includes description of specific examples of the dialog pair identification information, including the "arrow" described with reference to FIGS. 7 and 8, and the "viewing user line icon" described with reference to FIGS. 9 and 10, and furthermore, the "perspective transformation of background image" described with reference to FIG. 17.

Various types of display data can be used as the dialog pair identification information, besides these examples.

Hereinafter, various types of dialog pair identification information will be described.

Examples will be sequentially described below.

(1) Example using a face surrounding frame as dialog pair identification information
(2) Example using face side lines as dialog pair identification information
(3) Example using face side box (or sphere) as dialog pair identification information
(4) Example using perspective transformation of background image as dialog pair identification information
(5) Example of using face shading as dialog pair identification information

[7-1. (1) Example of Using Face Surrounding Frame as Dialog Pair Identification Information]

First, an example of using a face surrounding frame as the dialog pair identification information will be described.

FIGS. 21A and 21B illustrate a specific example in which the face surrounding frame is used as the dialog pair identification information.

FIGS. 21A and 21B illustrate the following two examples.

FIG. 21A Example 1 in which a dialog pair is represented by the shape of the face surrounding frame (case where the dialog pair is in the front direction of the displayed user on the screen)

FIG. 21B Example 2 in which the dialog pair is represented by the shape of the face surrounding frame (case where the dialog pair is in the right direction of the displayed user on the screen)

The example illustrated in FIG. 21A is an exemplary case where the displayed user F and the viewing user C are a dialog pair.

The viewing user C is present in front of the displayed user F.

Dialog pair identification information 301 is a face surrounding frame set around the face of the displayed user F.

From the fact that the shape of the face surrounding frame is left-right symmetrical, it is possible to determine that the displayed user F is gazing in the front direction, that is, gazing at the viewing user C as a dialog pair.

In contrast, the example illustrated in FIG. 21B is an exemplary case where the displayed user F and the viewing user A are the dialog pair.

The viewing user A is present in right direction of the displayed user F.

Dialog pair identification information 302 is a face surrounding frame set around the face of the displayed user F.

From the fact that the shape of the face surrounding frame is inclined to the right, it is possible to determine that the displayed user F is gazing in the right direction, that is, gazing at the viewing user A as a dialog pair.

In this manner, a face surrounding frame is set around the face of the displayed user as a member of the dialog pair, and the dialog pair can be identified by the shape of the set face surrounding frame.

The sequence of output image generation and output processing in the present example will be described with reference to the flowchart illustrated in FIG. 22.

Figure 22:
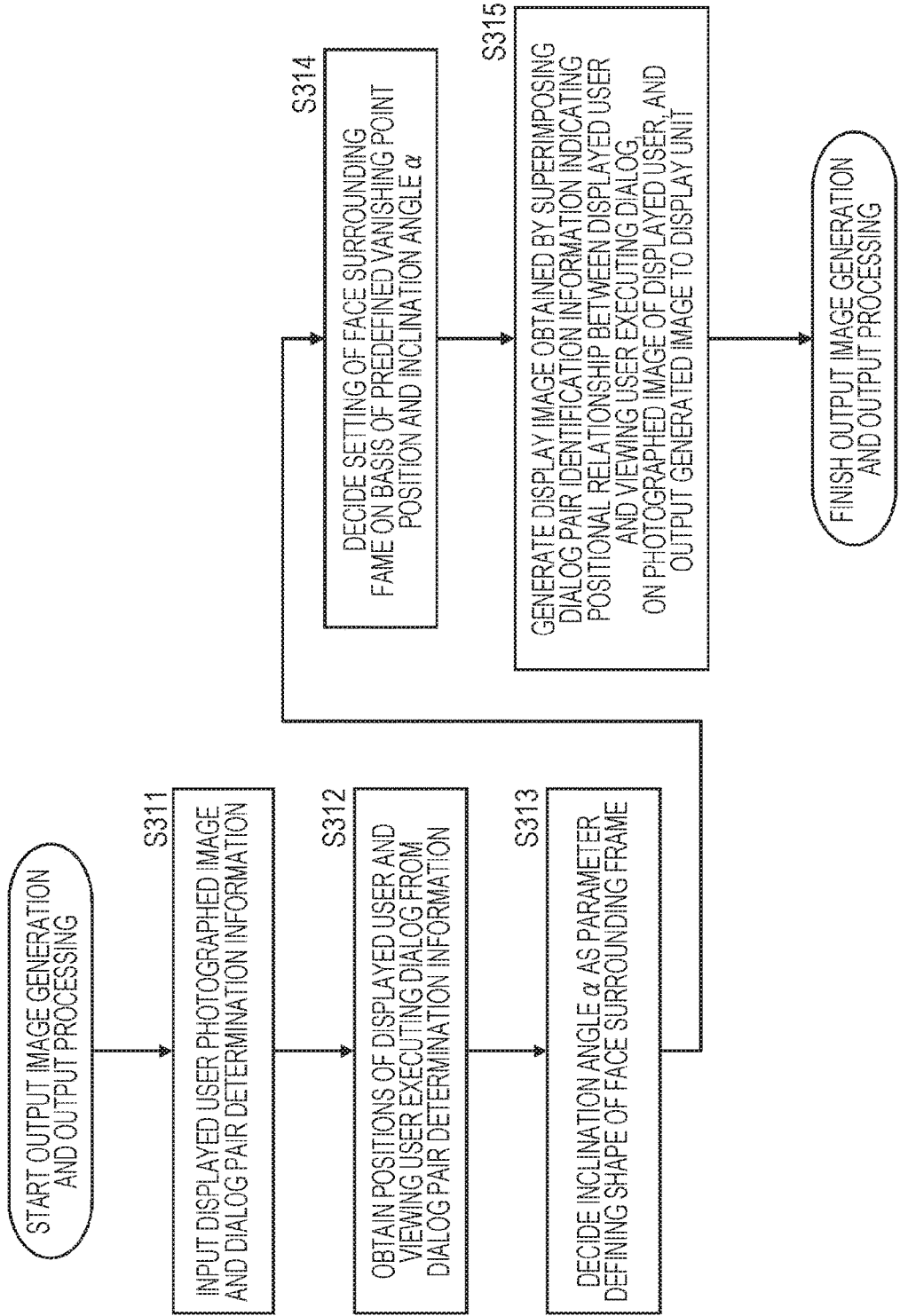
FIG. 22 is a flowchart illustrating a processing sequence of the information processing apparatus in a case where a face surrounding frame is used as the dialog pair identification information.

The processing following the flow illustrated in FIG. 22 is executed in the second location display image generation unit 164 illustrated in FIG. 11 or the like, or executed in the first location display image generation unit 201 illustrated in FIG. 14 or the like, for example.

Hereinafter, processing of each of steps of the flowchart illustrated in FIG. 22 will be sequentially described.

Note that in the following description, it is assumed that the second location display image generation unit 164 executes the processing.

(Step S311)

First, the second location display image generation unit 164 inputs in step S311 the photographed image of the displayed user and the dialog pair determination information.

As described above with reference to FIG. 11, the first location photographed image r, 172*r*, together with dialog pair first determination information r, 173*r* generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

(Step S312)

Next, the second location display image generation unit 164 obtains in step S312 the positions of the displayed user and the viewing user executing the dialog from the dialog pair determination information input in step S311.

(Step S313)

Next, in step S313, the second location display image generation unit 164 decides an inclination angle α as a parameter defining the shape of the face surrounding frame.

This processing will be described with reference to FIG. 23A.

In the example illustrated in FIG. 23A, a dialog pair is formed with a dialog pair displayed user 305 and a dialog pair viewing user 306.

As illustrated in the figure, when the angle formed by the arrow directed from the dialog pair displayed user 305 to the dialog pair viewing user 306 and the front direction of the dialog pair displayed user 305 is α0, the inclination angle is calculated using a default multiplication parameter p0 by the following calculation formula.

Inclination angle: α=p0×α0

In step S313, the inclination angle α is calculated in accordance with the above formula.

(Step S314)

Next, the second location display image generation unit 164 decides in step S314 the setting (shape) of the face surrounding frame on the basis of a default vanishing point position and the inclination angle α.

This processing will be described with reference to FIGS. 23B and 23C.

FIG. 23B illustrates an example of a face surrounding frame EFGH.

FIG. 23C illustrates an exemplary generation procedure of the face surrounding frame EFGH.

The shape decision processing of the face surrounding frame is executed in the following procedure.

The center position of the face of the displayed user of the dialog pair is defined as C.

Points vertically away from C by a predefined distance L0 are defined as P and Q.

Distance of OC=L1, and an angle β is a default value.

After the above setting, the following steps (S1) to (s4) are executed.

(s1) Calculate the inclination angle α from the positional relationship of the dialog pair.

(s2) Obtain a point O in an upper position from point C by a predefined distance L1 on a line shifted by an angle α.

(s3) Draw lines OF and OG shifted from O by an angle β.

(s4) Define EFGH surrounded by parallel lines passing through P and Q, and by lines OF and OG as the face surrounding frame EFGH.

With execution of these procedures, the face surrounding frame EFGH as illustrated in FIG. 23B is defined.

In step S314, the shape of the face surrounding frame is decided in accordance with the above processing.

(Step S315)

Next, in step S315, the second location display image generation unit 164 generates a display image obtained by superimposing a face surrounding frame as the dialog pair identification information indicating the positional relationship between the displayed user and the viewing user executing the dialog, on the photographed image of the displayed user, and outputs the generated image to the display unit.

In the present example, a face surrounding frame is set around the face of the displayed user as a member of the dialog pair, whereby the dialog pair can be identified by the shape of the set face surrounding frame.

For example, with a view of the "face surrounding frame" as the "dialog pair identification information" displayed on the display unit, the viewing user at the second location can immediately grasp correctly which user of the displayed users is speaking to which viewing user, leading to achievement of smooth communication.

[7-2. (2) Example of Using Face Side Line as Dialog Pair Identification Information]

An example of using the face side line as the dialog pair identification information will be described FIGS. 24A and 24B illustrate a specific example in which the face side line is used as the dialog pair identification information.

FIGS. 24A and 24B illustrate the following two examples.

FIG. 24A Example 1 in which a dialog pair is represented by the shape of the face side line (case where the dialog pair is in the front direction of the displayed user on the screen)

FIG. 24B Example 2 in which a dialog pair is represented by the shape of the face side line (case where the dialog pair is in the right direction of the displayed user on the screen)

The example illustrated in FIG. 24A is an exemplary case where the displayed user F and the viewing user C are a dialog pair.

The viewing user C is present in front of the displayed user F.

Dialog pair identification information 311 is a face side line set around the face of the displayed user F.

From the fact that the shape of the face side line is left-right symmetrical, it is possible to determine that the displayed user F is gazing in the front direction, that is, gazing at the viewing user C as a dialog pair.

In contrast, the example illustrated in FIG. 24B is an exemplary case where the displayed user F and the viewing user A are the dialog pair.

The viewing user A is present in right direction of the displayed user F.

Dialog pair identification information 312 is a face side line set around the face of the displayed user F.

From the fact that the shape of the face side line is inclined to the right, it is possible to determine that the displayed user F is gazing in the right direction, that is, gazing at the viewing user A as a dialog pair.

In this manner, a face side line is set around the face of the displayed user as a member of the dialog pair, and the dialog pair can be identified by the shape of the set face side line.

The sequence of output image generation and output processing in the present example will be described with reference to the flowchart illustrated in FIG. 25.

Figure 25:
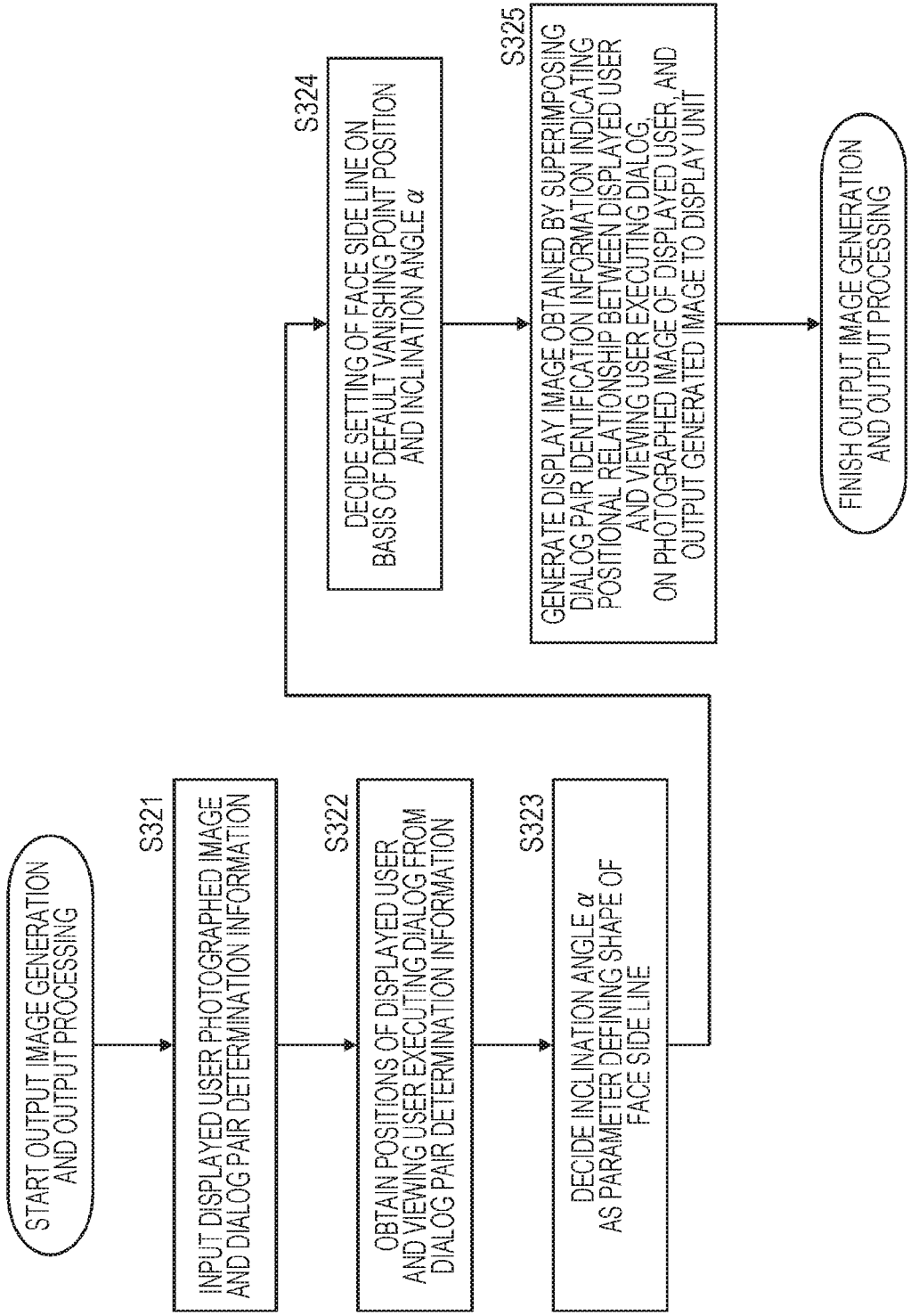
FIG. 25 is a flowchart illustrating a processing sequence of the information processing apparatus in a case where a face side line is used as the dialog pair identification information.

The processing following the flow illustrated in FIG. 25 is executed in the second location display image generation unit 164 illustrated in FIG. 11 or the like, or executed in the first location display image generation unit 201 illustrated in FIG. 14 or the like, for example.

Hereinafter, processing of each of steps of the flowchart illustrated in FIG. 25 will be sequentially described.

Note that in the following description, it is assumed that the second location display image generation unit 164 executes the processing.

(Step S321)

First, the second location display image generation unit 164 inputs in step S321 the photographed image of the displayed user and the dialog pair determination information.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

(Step S322)

Next, the second location display image generation unit 164 obtains in step S322 the positions of the displayed user and the viewing user executing the dialog from the dialog pair determination information input in step S321.

(Step S323)

Next, in step S323, the second location display image generation unit 164 decides an inclination angle α as a parameter defining the shape of the face side line.

This processing will be described with reference to FIG. 26A.

In the example illustrated in FIG. 26A, a dialog pair is formed with a dialog pair displayed user 305 and a dialog pair viewing user 306.

As illustrated in the figure, when the angle formed by the arrow directed from the dialog pair displayed user 305 to the dialog pair viewing user 306 and the front direction of the dialog pair displayed user 305 is α0, the inclination angle is calculated using a default multiplication parameter p0 by the following calculation formula.

Inclination angle: α=p0×α0

In step S323, the inclination angle α is calculated in accordance with the above formula.

(Step S324)

Next, the second location display image generation unit 164 decides in step S324 the setting (shape) of the face side line on the basis of a default vanishing point position and the inclination angle α.

This processing will be described with reference to FIGS. 26B and 26C.

FIG. 26B illustrates an example of face side lines EF and GH.

FIG. 26C illustrates an example of generation procedure of the face side lines EF and GH.

The face side line shape decision processing is executed in the following procedure.

The center position of the face of the displayed user of the dialog pair is defined as C.

Points vertically away from C by a predefined distance L0 are defined as P and Q.

Distance of OC=L1, and an angle β is a default value.

After the above setting, the following steps (S1) to (s4) are executed.

(s1) Calculate the inclination angle α from the positional relationship of the dialog pair.

(s2) Obtain a point O in an upper position from point C by a predefined distance L1 on a line shifted by an angle α.

(s3) Draw lines OF and OG shifted from O by an angle β.

(s4) Obtain EFGH surrounded by the parallel line passing through P and Q and by lines OF and OG, and define line EF and line GH as the face side lines EF and GH.

With execution of these procedures, the face side lines EF and GH as illustrated in FIG. 26B are defined.

In step S324, the shape of the face side line is decided in accordance with the above processing.

(Step S325)

Next, in step S325, the second location display image generation unit 164 generates a display image obtained by superimposing a face side line as the dialog pair identification information indicating the positional relationship between the displayed user and the viewing user executing the dialog, on the photographed image of the displayed user, and outputs the generated image to the display unit.

In the present example, a face side line is set around the face of the displayed user as a member of the dialog pair, whereby the dialog pair can be identified by the shape of the set face side line.

For example, with a view of the "face side line" as the "dialog pair identification information" displayed on the display unit, the viewing user at the second location can immediately grasp correctly which user of the displayed users is speaking to which viewing user, leading to achievement of smooth communication.

[7-3. (3) Example of Using Face Side Box (or Sphere) as Dialog Pair Identification Information]

Next, an example of using a face side box (or sphere) as the dialog pair identification information will be described.

Specific examples using the face side box (or sphere) as the dialog pair identification information are illustrated in FIGS. 27A, 27B, 28A, and 28B.

FIGS. 27A and 27B illustrate the following two examples.

FIG. 27A Example 1 in which a dialog pair is represented by the shape of the face side box (case where the dialog pair is in the front direction of the displayed user on the screen)

FIG. 27B Example 2 in which a dialog pair is represented by the shape of the face side box (case where the dialog pair is in the right direction of the displayed user on the screen)

The example illustrated in FIG. 27A is an exemplary case where the displayed user F and the viewing user C are a dialog pair.

The viewing user C is present in front of the displayed user F.

Dialog pair identification information 321 is a face side box set around the face of the displayed user F.

From the fact that the arrangement of the face side box is left-right symmetrical, it is possible to determine that the displayed user F is gazing in the front direction, that is, gazing at the viewing user C as a dialog pair.

In contrast, the example illustrated in FIG. 27B is an exemplary case where the displayed user F and the viewing user A are the dialog pair.

The viewing user A is present in right direction of the displayed user F.

Dialog pair identification information 322 is a face side box set around the face of the displayed user F.

From the fact that the arrangement shape of the face side box is inclined to the right, it is possible to determine that the displayed user F is gazing in the right direction, that is, gazing at the viewing user A as a dialog pair.

FIGS. 28A and 28B illustrate the following two examples.

FIG. 28A Example 1 in which a dialog pair is represented by the shape of the face side box (case where the dialog pair is in the front direction of the displayed user on the screen)

FIG. 28B Example 2 in which a dialog pair is represented by the shape of the face side box (case where the dialog pair is in the right direction of the displayed user on the screen)

The example illustrated in FIG. 28A is an exemplary case where the displayed user F and the viewing user C are a dialog pair.

The viewing user C is present in front of the displayed user F.

Dialog pair identification information 331 is a face side sphere set around the face of the displayed user F.

From the fact that the arrangement of the face side sphere is left-right symmetrical, it is possible to determine that the displayed user F is gazing in the front direction, that is, gazing at the viewing user C as a dialog pair.

In contrast, the example illustrated in FIG. 28B is an exemplary case where the displayed user F and the viewing user A are the dialog pair.

The viewing user A is present in right direction of the displayed user F.

Dialog pair identification information 332 is a face side sphere set around the face of the displayed user F.

From the fact that the arrangement shape of the face side sphere is inclined to the right, it is possible to determine that the displayed user F is gazing in the right direction, that is, gazing at the viewing user A as a dialog pair.

In this manner, a face side box (or sphere) is set around the face of the displayed user as a member of the dialog pair, whereby the dialog pair can be identified by the arrangement of the set face side box (sphere) that has been set.

The sequence of output image generation and output processing in the present example will be described with reference to the flowchart illustrated in FIG. 29.

The processing following the flow illustrated in FIG. 29 is executed in the second location display image generation unit 164 illustrated in FIG. 11 or the like, or executed in the first location display image generation unit 201 illustrated in FIG. 14 or the like, for example.

Hereinafter, processing of each of steps of the flowchart illustrated in FIG. 29 will be sequentially described.

Note that in the following description, it is assumed that the second location display image generation unit 164 executes the processing.

(Step S331)

First, the second location display image generation unit 164 inputs in step S331 the photographed image of the displayed user and the dialog pair determination information.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

(Step S332)

Next, the second location display image generation unit 164 obtains in step S332 the positions of the displayed user and the viewing user executing the dialog from the dialog pair determination information input in step S331.

(Step S333)

Next, in step S333, the second location display image generation unit 164 decides an inclination angle α as a parameter defining the arrangement of the face side box (or sphere).

This processing will be described with reference to FIG. 30A.

In the example illustrated in FIG. 30A, a dialog pair is formed with a dialog pair displayed user 305 and a dialog pair viewing user 306.

As illustrated in the figure, when the angle formed by the arrow directed from the dialog pair displayed user 305 to the dialog pair viewing user 306 and the front direction of the dialog pair displayed user 305 is α0, the inclination angle is calculated using a default multiplication parameter p0 by the following calculation formula.

$$\text{Inclination angle: } \alpha = p0 \times \alpha 0$$

In step S333, the inclination angle α is calculated in accordance with the above formula.

(Step S334)

Next, the second location display image generation unit 164 decides in step S334 the setting (arrangement) of the face side box (or sphere) on the basis of a default vanishing point position and the inclination angle α.

This processing will be described with reference to FIGS. 30B and 30C.

FIG. 30B illustrates an example of face side boxes (or spheres) EF and GH.

FIG. 30C illustrates an exemplary generation procedure of face side boxes (or spheres) EF and GH.

The face side box (or sphere) arrangement decision processing is executed in the following procedure.

The center position of the face of the displayed user of the dialog pair is defined as C.

Points vertically away from C by a predefined distance L0 are defined as P and Q.

Distance of OC=L1, and an angle β is a default value.

After the above setting, the following steps (S1) to (s4) are executed.

(s1) Calculate the inclination angle α from the positional relationship of the dialog pair.

(s2) Obtain a point O in an upper position from point C by a predefined distance L1 on a line shifted by an angle α.

(s3) Draw lines OF and OG shifted from O by an angle β.

(s4) Obtain intersections EFGHIJ of the parallel lines passing through C, P, and Q, and OF and OG, and define each of the intersections EFGHIJ as the arrangement position of the face side boxes (or spheres).

With execution of these procedures, arrangement of the face side box (or sphere) as illustrated in FIG. 30B is decided.

In step S334, the arrangement of the face side box (or sphere) is decided in accordance with the above processing.

(Step S335)

Next, in step S335, the second location display image generation unit 164 generates a display image obtained by superimposing a face side box (or sphere) as the dialog pair identification information indicating the positional relationship between the displayed user and the viewing user executing the dialog, on the photographed image of the displayed user, and outputs the generated image to the display unit.

In the present example, a face side box (or sphere) is set around the face of the displayed user as a member of the dialog pair, whereby the dialog pair can be identified by the arrangement of the set face side box (sphere) that has been set.

For example, with a view of the "face side box (or sphere)" as the "dialog pair identification information" displayed on the display unit, the viewing user at the second location can immediately grasp correctly which user of the displayed users is speaking to which viewing user, leading to achievement of smooth communication.

[7-4. (4) Example of using Perspective Transformation of Background Image as Dialog Pair Identification Information]

Next, an example of using a background image perspective transformation as the dialog pair identification information will be described.

This processing example corresponds to a specific processing example of the processing of identifying a dialog pair with application of a viewpoint transformation image (perspective transformation image) of the background image described above with reference to FIGS. 16 to 20.

FIGS. 31A and 31B illustrate a specific example using a viewpoint transformation image (perspective transformation image) of the background image as the dialog pair identification information.

FIGS. 31A and 31B illustrate the following two examples.

FIG. 31A Example 1 in which a dialog pair is represented by a viewpoint transformation image (perspective transformation image) of the background image (case where the dialog pair is in the front direction of the displayed user on the screen)

FIG. 31B Example 2 in which a dialog pair is represented by a viewpoint transformation image (perspective transformation image) of the background image (case where the dialog pair is in the right direction of the displayed user on the screen)

The example illustrated in FIG. 31A is an exemplary case where the displayed user E and the viewing user B are a dialog pair.

The viewing user B is present in front of the displayed user E.

The background image is a virtual viewpoint image (perspective transformation image) viewed from the viewpoint of the viewing user B.

The viewing user B as a dialog pair can determine that the displayed user E as a dialog pair is gazing in the front direction, that is, gazing at the viewing user B as the dialog pair.

In contrast, the example illustrated in FIG. 31B is an exemplary case where the displayed user E and the viewing user A are the dialog pair.

The viewing user A is present in right direction of the displayed user E.

The background image is a virtual viewpoint image (perspective transformation image) viewed from the viewpoint of the viewing user A.

The viewing user A as a dialog pair can determine that the displayed user E as a dialog pair is gazing in the right direction, that is, gazing at the viewing user A as the dialog pair.

In this manner, the background image of the displayed user as a member of the dialog pair to the viewpoint transformation image (perspective transformation image) observed from the viewpoint of the viewing user as a constituent mark of the dialog pair, making it possible to identify the dialog pair.

The sequence of output image generation and output processing in the present example will be described with reference to the flowchart illustrated in FIG. 32.

Figure 32:
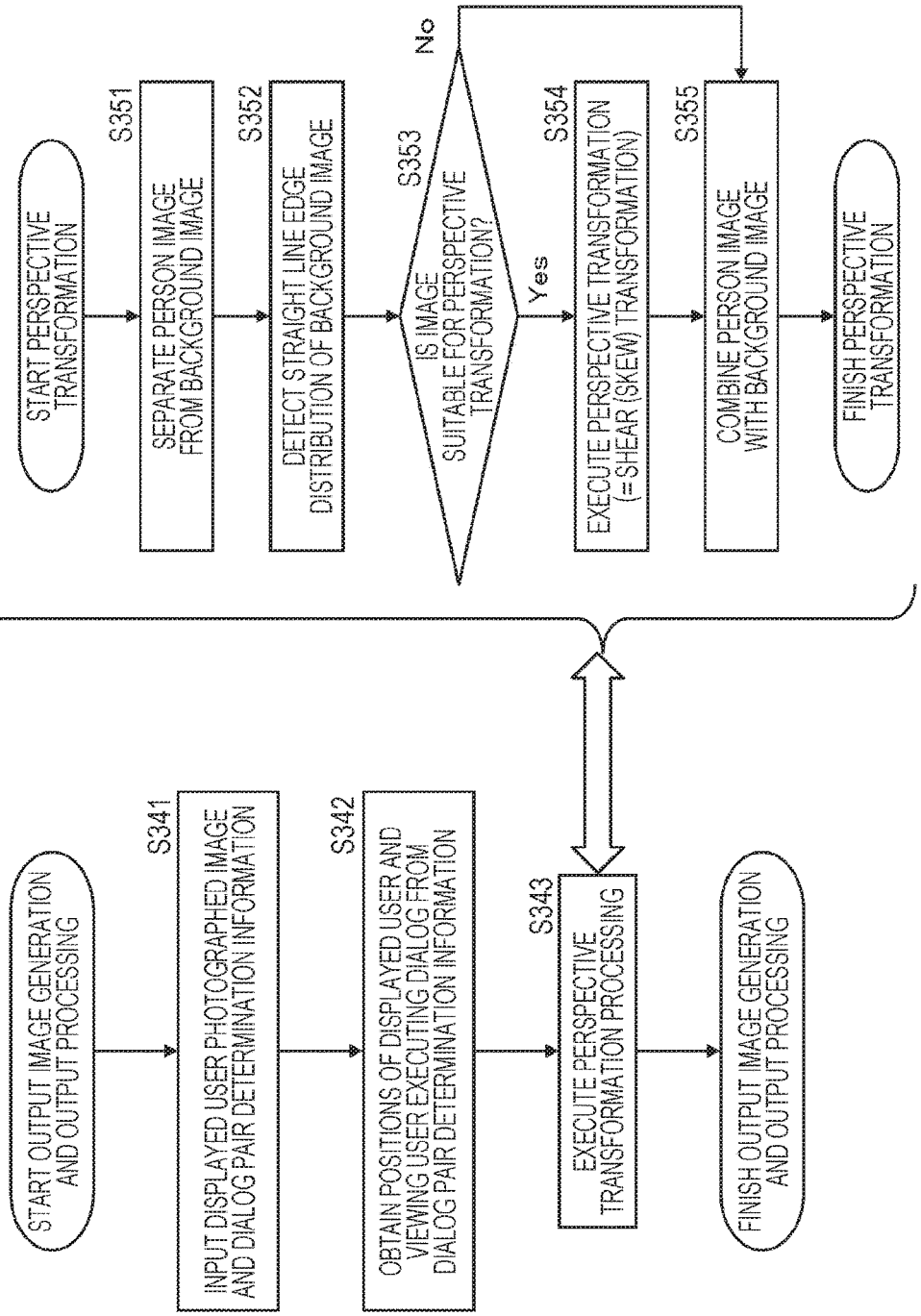
FIG. 32 is a flowchart illustrating a processing sequence of the information processing apparatus in a case where a background perspective transformation is used as the dialog pair identification information.

The processing following the flow illustrated in FIG. 32 is executed in the second location display image generation unit 164 illustrated in FIG. 11 or the like, or executed in the first location display image generation unit 201 illustrated in FIG. 14 or the like, for example.

Hereinafter, processing of each of steps of the flowchart illustrated in FIG. 32 will be sequentially described.

Note that in the following description, it is assumed that the second location display image generation unit 164 executes the processing.

(Step S341)

First, the second location display image generation unit 164 inputs in step S341 the photographed image of the displayed user and the dialog pair determination information.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

(Step S342)

Next, the second location display image generation unit 164 obtains in step S342 the positions of the displayed user and the viewing user executing the dialog from the dialog pair determination information input in step S341.

(Step S343)

Next, the second location display image generation unit 164 executes in step S343 generation processing of the viewpoint transformation image (perspective transformation image) of the background image.

A detailed sequence of step S343 is the flow illustrated on the right side of FIG. 32. Hereinafter, processing of each of steps S351 to S355 of this flow will be described.

(Step S351)

Step S351 is processing of separating a person image from a background image.

This processing is similar to the processing executed by the person/background image separation unit 255 of the second location display image generation unit 164 described above with reference to FIG. 17.

The second location display image generation unit 164 executes processing of separating a person image region included in the first location photographed image r, 172r from a background image region.

Note that first location photographed image subject distance information (depth data) 255r input from the first location is applied to this processing, for example.

Alternatively, it is also allowable to have a configuration as described above in the third exemplary embodiment, namely, a configuration of transmitting a plurality of images photographed from a plurality of different viewpoints to the second location, and then, the person/background image separation unit 255 may execute processing of separating the person image region from the background image region on the basis of the plurality of images.

(Steps S352 and S353)

In step S352 performs processing of detecting a straight line edge portion from a background image.

Step S353 performs processing of determining whether an image is suitable for perspective transformation, from the edge detected in step S352.

Step S352 executes processing of detecting a straight line edge which is a straight line portion such as an outline of a wall, a desk, and the like included in the background region. Step S353 determines whether the image is an image suitable for perspective transformation, from the detected edge.

This specific processing example will be described with reference to FIGS. 33A, 33B, 33C, 34, and 35.

FIGS. 33A, 33B, and 33C includes the following drawings.

FIG. 33A Edge detection example a (example in which an edge suitable for perspective transformation is detected)

FIG. 33B Example of edge detection b (example in which an edge suitable for perspective transformation is not detected)

FIG. 33C Edge detection, perspective transformation conformity determination processing procedure.

The edge detection and perspective transformation conformity determination processing is performed in accordance with the following processing (s1) to (s3).

(s1) Divide the background into right/left sections about the face position as the center.

(s2) Obtain straight line edges included in each of the backgrounds of the left and right regions.

(s3) Obtain frequency distribution in the edge direction with conditions:

"(Condition 1) Edges are aligned diagonally upward to the right, in the left region"; and "(Condition 2) Edges are aligned diagonally upward to the left, in the left region".

In a case where the conditions 1 and 2 are satisfied (example a in FIG. 33A, for example), perspective transformation is to be performed as an image suitable for perspective transformation.

In a case where the conditions 1 and 2 are not satisfied (example b in FIG. 33B, for example), perspective transformation is not to be performed as an image unsuitable for perspective transformation.

FIG. 34 is a diagram illustrating a specific example of the edge detection processing from the background image.

For the nine pixels $P_i$ including the verification target pixel of the background region and the surrounding eight pixels, edge detection filters $Dx_i$ and $Dy_i$ are multiplied to calculate the following scores Sx and Sy.

$$Sx = \Sigma_i P_i \times Dx_i,$$

$$Sy = \Sigma_i P_i \times Dy_i$$

where, i=0, . . . , 8

Note that a Sobel filter, a Previtt filter, or the like, illustrated in FIG. 34 can be applied as the edge detection filter, for example.

Furthermore, comparison between a default threshold $S_{th}$ and the calculated scores Sx and Sy is executed.

$$|Sx| < S_{th} \text{ and,}$$

$$|Sy| < S_{th}$$

In a case where the above determination formula is satisfied, it is determined that the verification target pixel is not an edge region, and determination is performed for the next verification target pixel.

The verification processing is executed for all the pixels of the background image, and for the pixels determined to be the edge regions, an edge angle $\alpha_2$ is calculated by the following formula.

$$\alpha_2 = \tan^{-1}(Sx/Sy)$$

where, $0° \leq \alpha_2 < 180°$

The above edge angle calculation processing is performed for all the pixels so as to obtain the frequency distribution of the edge angle.

Figure 35:
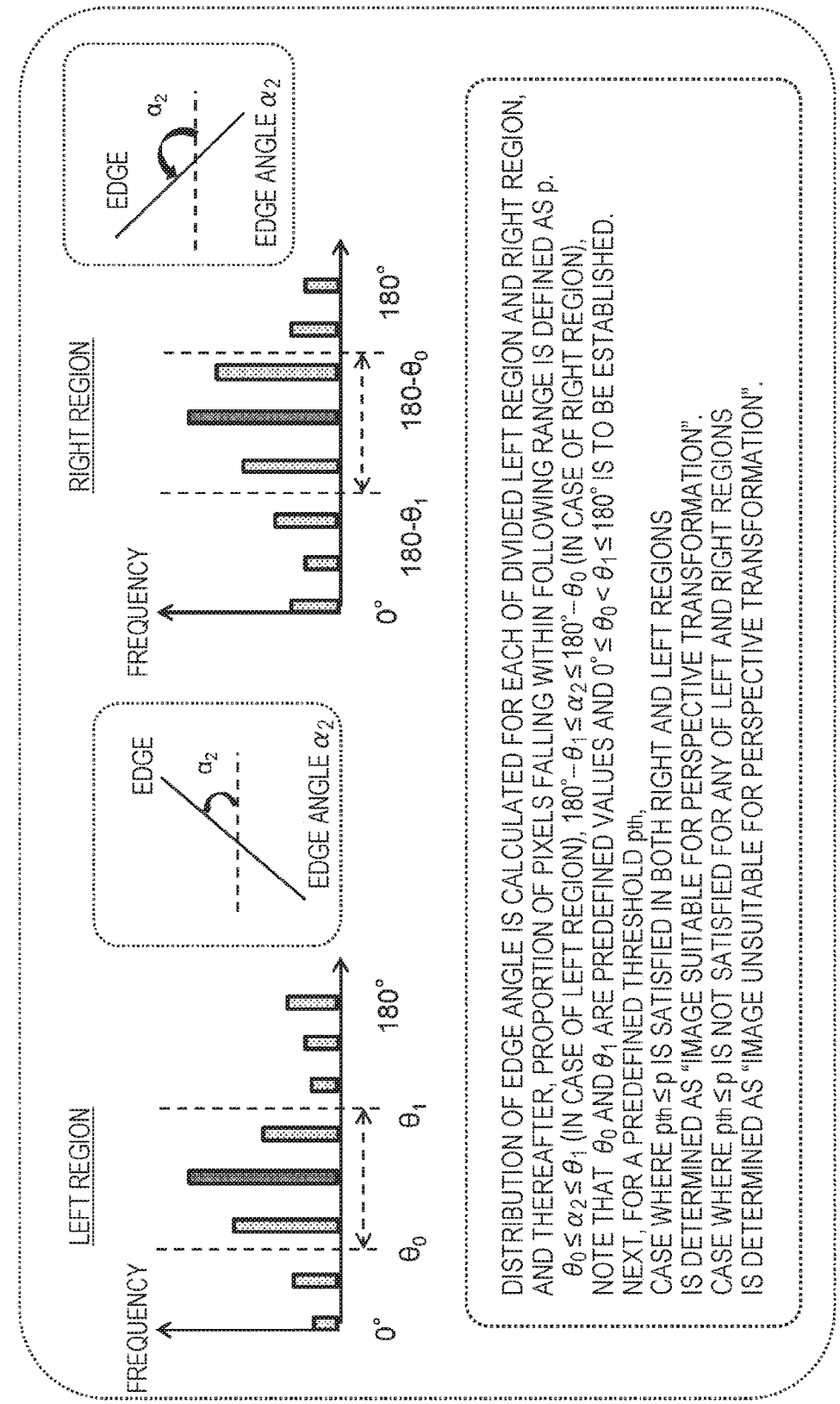
FIG. 35 is a diagram illustrating a specific example of processing of an information processing apparatus in a case where a background perspective transformation is used as the dialog pair identification information.

FIG. 35 illustrates an example of distribution of edge angles.

As illustrated in FIG. 35, the frequency distribution of the edge angle is calculated for each of the divided left region and the right region of the face of the displayed user forming the dialog pair, and thereafter, an in-tolerance range edge angle occupancy p is calculated for all the pixels of the background, in accordance with the following procedure.

$$\theta_0 \leq \alpha_2 \leq \theta_1 \text{ (in the case of the left region), and}$$

$$180° - \theta_1 \leq \alpha_2 \leq 180° - \theta_0 \text{ (in the case of the right region)}$$

The proportion of the pixels falling within the above-described range is defined as the in-tolerance range edge angle occupancy p.

Note that $\theta_0$ and $\theta_1$ are predefined values and $0° \leq \theta_0 < \theta_1 \leq 180°$ is to be established.

Next, for a default threshold $p_{th}$, $$p_{th} \leq p$$

A case where the above determination formula is satisfied in both the right and left regions is determined as "an image suitable for perspective transformation".

The case where the above determination formula is not satisfied for any of the left and right regions is determined as "an image unsuitable for perspective transformation".

In steps S352 to S353, a straight line edge portion is detected from the background image in accordance with this processing procedure, and it is determined from the detected edge whether the image is suitable for perspective transformation.

In a case where it is determined that it is not suitable for perspective transformation, the processing is stopped.

In a case where it is determined that the image is suitable for perspective transformation, the processing proceeds to step S354.

(Step S354)

In a case where it is determined that the image is suitable for perspective transformation, the processing proceeds to step S354, and perspective transformation (shear (skew) transformation) is executed. This corresponds to the generation processing of a virtual viewpoint image (perspective transformation image).

This processing example executes shear (skew) transformation simpler than the generation of the virtual viewpoint transformation image so as to generate a pseudo virual viewpoint image.

This processing will be described with reference to FIGS. 36A and 36B.

In the example illustrated in FIG. 36A, a dialog pair includes the dialog pair displayed user 305 and the dialog pair viewing user 306.

As illustrated in the figure, when the angle formed by the arrow directed from the dialog pair displayed user 305 to the dialog pair viewing user 306 and the front direction of the dialog pair displayed user 305 is α0, the inclination angle is calculated using a default multiplication parameter p0 by the following calculation formula.

$$\text{Inclination angle: } \alpha = p0 \times \alpha 0$$

First, the inclination angle α is calculated in accordance with the above formula.

As illustrated in FIG. 36B, shear (skew) transformation (=perspective transformation) is executed using the inclination angle α.

FIG. 36B illustrates:

(a) Coordinates before perspective transformation (b) Coordinate after perspective transformation These two image coordinates are illustrated in the figure.

(a) Coordinates (x, y) before perspective transformation are transformed to (b) coordinates (x', y') before perspective transformation.

The transformation formulas are as follows.

$$x' = x + \tan \alpha \times y$$

$$y' = y$$

Following the above transformation formula, (a) the coordinates (x, y) before perspective transformation are transformed into (b) coordinates before perspective transformation (x', y').

Step S354 executes this perspective transformation processing.

(Step S355)

Next, in step S355, the second location display image generation unit 164 generates a display image obtained by superimposing a viewpoint transformation image (perspective transformation image) of the background image as the dialog pair identification information indicating the positional relationship between the displayed user and the viewing user executing the dialog, on the photographed image of the displayed user, and outputs the generated image to the display unit.

Note that this image combining processing needs interpolation processing of a missing region in some cases.

This interpolation processing will be described with reference to FIG. 37.

A missing region corresponding to a person region as illustrated in FIG. 37 sometimes occurs when a human region is combined after perspective transformation is performed on a background image from which the human region has been cut out.

For such a missing region, a predetermined pixel value is set by interpolation processing.

This interpolation processing can be performed using an existing technique of "image inpainting technique", for example. An example of this interpolation processing is described in a document [A. Criminisi et al., Region filling and object removal by exemplar-based image inpainting, IEEE Trans. on Image Processing, 2004].

In this manner in the present example, it is possible to set the viewpoint transformation image (perspective transformation image) of the background image and possible to identify the dialogue pair by the viewpoint transformation image (perspective transformation image) of the background image.

For example, with a view of the "viewpoint transformation image (perspective transformation image) of the background image" as the "dialog pair identification information" displayed on the display unit, the viewing user at the second location can immediately grasp correctly which user of the displayed users is speaking to which viewing user, leading to achievement of smooth communication.

[7-5. (5) Example of Using Face Shading as Dialog Pair Identification Information]

Next, an example using the face shading as the dialog pair identification information will be described.

FIGS. 38A and 38B illustrate a specific example in which the face shading is used as the dialog pair identification information.

FIGS. 38A and 38B illustrate the following two examples.

FIG. 38A Example 1 in which a dialog pair is represented by a shading of a face (case where the dialog pair is in the front direction of the displayed user of the screen)

FIG. 38B Example 2 in which a dialog pair is represented by a shading of a face (case where the dialog pair is in the right direction of the displayed user of the screen)

The example illustrated in FIG. 38A is an exemplary case where the displayed user E and the viewing user B are a dialog pair.

The viewing user B is present in front of the displayed user E.

The face shading is provided in a state divided into two portions, namely, a bright portion and a dark portion in the right and left about the center of the displayed user E.

The viewing user B as a dialog pair can determine that the displayed user E as a dialog pair is gazing in the front direction, that is, gazing at the viewing user B as the dialog pair.

In contrast, the example illustrated in FIG. 38B is an exemplary case where the displayed user E and the viewing user C are the dialog pair.

Viewing user C is present in the left direction of displayed user E.

The face shading is set such that the bright portion on the right from the center of the displayed user E is larger than the dark portion on the left.

The viewing user C as a dialog pair can determine that the displayed user E as a dialog pair is gazing in the left direction, that is, gazing at the viewing user C as the dialog pair.

In this manner, shadings are set in the face image of the displayed user as a member of the dialog pair, making it possible to identify the dialog pair.

The sequence of output image generation and output processing in the present example will be described with reference to the flowchart illustrated in FIG. 39.

The processing following the flow illustrated in FIG. 39 is executed in the second location display image generation unit 164 illustrated in FIG. 11 or the like, or executed in the first location display image generation unit 201 illustrated in FIG. 14 or the like, for example.

Hereinafter, processing of each of steps of the flowchart illustrated in FIG. 39 will be sequentially described.

Note that in the following description, it is assumed that the second location display image generation unit 164 executes the processing.

(Step S361)

First, the second location display image generation unit 164 inputs in step S361 the photographed image of the displayed user and the dialog pair determination information.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

(Step S362)

Next, the second location display image generation unit 164 obtains in step S362 the positions of the displayed user and the viewing user executing the dialog from the dialog pair determination information input in step S361.

(Step S363)

Next, in step S363, the second location display image generation unit 164 decides an inclination angle α as a parameter defining the shape of the face shading.

This processing will be described with reference to FIG. 40A.

In the example illustrated in FIG. 40A, a dialog pair includes the dialog pair displayed user 305 and the dialog pair viewing user 306.

As illustrated in the figure, when the angle formed by the arrow directed from the dialog pair displayed user 305 to the dialog pair viewing user 306 and the front direction of the dialog pair displayed user 305 is α0, the inclination angle is calculated using a default multiplication parameter p0 by the following calculation formula.

Inclination angle: α=p0×α0

In step S363, the inclination angle α is calculated in accordance with the above formula.

(Step S364)

Next, the second location display image generation unit 164 executes in step S364 generation processing of face shading.

A detailed sequence of step S364 is the flow illustrated on the right side of FIG. 39. Hereinafter, processing of each of steps S371 to S374 of this flow will be described.

(Step S371)

Step S371 is processing of detecting a face region of a person forming the dialog pair.

As described above with reference to FIG. 11, the first location photographed image r, 172r, together with dialog pair first determination information r, 173r generated by the dialog pair determination unit 153 at the first location are input to the second location display image generation unit 164.

The dialog pair determination information includes user identification information of a user of the dialog pair and user position information. The user position information is position information needed for displaying the dialog pair identification information, and includes the display position of the displayed user forming the dialog pair and the relative position of the viewing user in front of the display unit with respect to the display unit.

Existing techniques can also be applied to face detection.

(Steps S372 and S373)

Step S372 is a luminance distribution measurement processing of the face region.

In step S373 performs processing of determining whether an image is suitable for shading correction of setting shadings in the face image on the basis of the face region luminance distribution detected in step S372.

This specific processing example will be described with reference to FIG. 40B.

FIG. 40B illustrates diagrams illustrating the following.

FIG. 40C Example of luminance distribution measurement processing

FIG. 40D Example of luminance distribution measurement result

FIG. 40E Example of shading correction conformity determination processing

The measurement processing of the luminance distribution of the face image is executed as follows.

The luminance distribution is separately measured separately for each of the left and right regions with respect to the face region of the displayed user.

Define as follows:

Luminance distribution of left region: HL (I)
Luminance distribution of the right region: HR (I)
(I is the luminance)

As a result, as illustrated in FIG. 40B, luminance distribution data (histogram) of each of the left and right regions is obtained, for example.

The shading correction conformity determination processing is executed as follows.

A difference $S_d$ in the luminance distribution of the left and right regions is calculated in accordance with the following calculation formula.

$$S_d = \Sigma_I((H_L(I) - H_R(I))^2 / (H_L(I) + H_R(I)))$$

Further, the calculated value $S_d$ is compared with a default threshold $S_{d0}$.

$$S_{d0} \le S_d$$

In a case where the above determination formula is satisfied, the luminance distribution of the left and right regions are largely different, and thus, it is determined that the image is suitable for shading correction.

In a case where the above determination formula is not satisfied, it is determined that the image is not suitable for shading correction.

Steps S372 and S373 performs luminance distribution measurement processing of the face region and determination of whether the image is suitable for the shading correction with these procedures.

In a case where it is determined that the image is not suitable for shading correction, the processing is stopped.

In a case where it is determined that the image is suitable for shading correction, the processing proceeds to step S374.

(Step S374)

In step S374, luminance transformation (shading correction) of the face image is executed.

Specific processing example will be described with reference to FIG. 41.

FIG. 41 illustrates a specific sequence of luminance transformation (shading correction) of a face image as a flow.

The luminance transformation (shading correction) of the face image is executed in accordance with the following processing procedure.

(Step S381) Separation of specular/diffuse reflection components (Step S382) Expansion/contraction of the specular reflection component (Step S383) Combining specular/diffuse reflection components The output of the pixel value of the face image includes a specular reflection component of the same color as the incident light reflected on the object surface and a diffuse reflection component that reflects complicatedly inside the object and to determine the object color. Step S381 executes processing of separating these components from each other. Note that for this separation processing, for example, it is possible to use existing techniques described in the following documents [Higo et al., "Realtime Removal of Specular Reflection Component Based on Dichromatic Reflection Model" Research report of Information Processing Society of Japan (2006)]

Next, step S382 executes enlargement/reduction processing of the separated specular reflection component. Enlargement of the specular reflection component is executed in order to increase the bright region, and reduction of the specular reflection component is executed in order to increase the dark region.

The example illustrated in FIG. 41 is an example of enlarging specular reflection components.

Step S383 executes processing of combining specular/diffuse reflection components.

In this manner, the shading correction is executed by adjusting the specular component.

FIG. 42 is a diagram illustrating an example of enlargement/reduction processing of a specific specular reflection component.

The region of the specular reflection component of each of pixels included in the face image is enlarged or reduced by the following coordinate transformation.

$$x'=x-\alpha \times G(x,y)$$

$$y'=y$$

where, x, y are the coordinates of the point before transformation, x', y' are the coordinates of the point after transformation, and G is a gain function.

As the gain function, the following gain function can be applied.

$$G(x,y)=R-\text{sqrt}(x^2+y^2)$$

where, sqrt: square root

Note that R is a value representing the face size and corresponds to the length of the radius when the shape of the face is approximated to a circle.

The shading correction processing of step S374 illustrated in FIG. 39 is executed in this procedure.

In the present example, as described above, it is possible to set the face shading to enable identification of the dialog pair identifiable by the face shading.

For example, with a view of the "face shading" as the "dialog pair identification information" displayed on the display unit, the viewing user at the second location can immediately grasp correctly which user of the displayed users is speaking to which viewing user, leading to achievement of smooth communication.

Note that, while various types of dialog pair identification information have been described, these may be used separately or may be used in combination of plurality of pieces of information.

8. Hardware Configuration Example of Information Processing Apparatus

Next, an example of the hardware configuration of the information processing apparatus will be described with reference to FIG. 43.

FIG. 43 is a diagram illustrating a hardware configuration example of an information processing apparatus that executes processing according to the present disclosure.

A central processing unit (CPU) 501 functions as a control unit or a data processing unit that executes various types of processing in accordance with a program stored in a read only memory (ROM) 502 or a storage unit 508. For example, the processing according to the sequence described in the above exemplary embodiment is executed. A random access memory (RAM) 503 stores programs executed by the CPU 501, data, or the like. The CPU 501, the ROM 502, and the RAM 503 are mutually connected by a bus 504.

The CPU 501 is connected to an input/output interface 505 via the bus 504. The input/output interface 505 is connected to an input unit 506 that inputs a photographed image of an imaging unit 521, and including various switches, a keyboard, a mouse, a microphone, and the like that can be used for user input, and also connected to an output unit 507 that executes data output to a display unit 522, a speaker, or the like. The CPU 501 executes various types of processing in accordance with an instruction input from the input unit 506, and outputs processing results to the output unit 507, for example.

The storage unit 508 connected to the input/output interface 505 includes a hard disk and the like, for example, and stores a program to be executed by the CPU 501 and various data. A communication unit 509 functions as a transmission/reception unit for Wi-Fi communication, Bluetooth (registered trademark) (BT) communication, and other data communication via a network such as the Internet and a local area network, and communicates with an external apparatus.

A drive 510 connected to the input/output interface 505 drives a removable medium 511 such as a magnetic disk, an optical disk, a magneto-optical disk, a semiconductor memory such as a memory card, and executes data recording or reading.

9. Summary of the Configuration of the Present Disclosure

The exemplary embodiments of the present disclosure have been described in detail with reference to specific exemplary embodiments. Still, it is self-evident that those skilled in the art can make modifications and substitutions of the exemplary embodiments without departing from the scope and spirit of the present disclosure. That is, the present invention has been disclosed in the form of exemplification, and should not be interpreted restrictively. In order to judge the scope and spirit of the present disclosure, the scope of claims should be taken into consideration.

Note that the technology disclosed in this specification can be configured as follows.

(1) An information processing apparatus including a display image generation unit that generates dialog pair identification information enabling identification of to which viewing user among a plurality of viewing users a displayed user on a display unit is speaking, and that outputs the generated dialog pair identification information together with the displayed user onto the display unit.

(2) The information processing apparatus according to (1), in which the information processing apparatus inputs image data of the displayed user via a data transmission/reception unit, and the display image generation unit displays the dialog pair identification information being superimposed on the image data of the displayed user.

(3) The information processing apparatus according to (1) or (2), in which the display image generation unit inputs dialog pair determination information, discriminates the displayed user and the viewing user forming a dialog pair from each other on the basis of the input dialog pair determination information, and outputs, to the display unit, the dialog pair identification information enabling identification of the displayed user and the viewing user forming the dialog pair.

(4) The information processing apparatus according to any of (1) to (3),
in which the display image generation unit
generates an arrow directed from a displayed user forming a dialog pair to a viewing user forming a dialog pair, as the dialog pair identification information, and displays the generated arrow in the vicinity of the displayed user forming the dialog pair displayed on the display unit.

(5) The information processing apparatus according to any of (1) to (3),
in which the display image generation unit
generates an icon enabling identification of a viewing user forming a dialog pair, as the dialog pair identification information, and displays the generated icon in the vicinity of the displayed user forming the dialog pair displayed on the display unit.

(6) The information processing apparatus according to (3),
in which the information processing apparatus inputs the dialog pair determination information via the data transmission/reception unit, and
the display image generation unit
discriminates the displayed user and the viewing user forming the dialog pair from each other on the basis of the dialog pair determination information input via the data transmission/reception unit.

(7) The information processing apparatus according to (3) or (6),
in which the dialog pair determination information is information generated by using an image of the displayed user and an image of the viewing user.

(8) The information processing apparatus according to any of (1) to (7),
in which the display image generation unit displays a front face image generated on the basis of a face image of a displayed user forming a dialog pair together with the dialog pair identification information, on the display unit.

(9) The information processing apparatus according to any of (1) to (8), in which the display image generation unit
displays a virtual viewpoint image of a background observed from a viewpoint of a viewing user forming a dialog pair, on the display unit.

(10) The information processing apparatus according to (9),
in which the display image generation unit
sequentially updates the viewpoint of the virtual viewpoint image on the basis of the viewpoint changed in accordance with a change of a position of the viewing user forming the dialog pair, and displays the updated virtual viewpoint image on the display unit.

(11) The information processing apparatus according to any of (1) to (10),
in which the display image generation unit
generates a face surrounding frame having an outline inclined in a direction of a viewing user forming a dialog pair, as the dialog pair identification information, around a face image of a displayed user forming the dialog pair, and displays the generated face surrounding frame around the face of the displayed user forming the dialog pair, displayed on the display unit.

(12) The information processing apparatus according to any of (1) to (10),
in which the display image generation unit
generates a face side line having a line inclined in a direction of a viewing user forming a dialog pair, as the dialog pair identification information, around a face image of a displayed user forming the dialog pair, and displays the generated face side line on both sides of the face of the displayed user forming the dialog pair, displayed on the display unit.

(13) The information processing apparatus according to any of (1) to (10),
in which the display image generation unit
generates a mark arranged on a line inclined in a direction of a viewing user forming a dialog pair, as the dialog pair identification information, around a face image of a displayed user forming the dialog pair, and displays the generated mark on both sides of the face of the displayed user forming the dialog pair, displayed on the display unit.

(14) The information processing apparatus according to any of (1) to (10),
in which the display image generation unit
generates a shading correction face image having luminance of a face image of a displayed user forming a dialog pair changed in accordance with a direction of a viewing user forming the dialog pair, as the dialog pair identification information, and displays the generated shading correction face image on the display unit.

(15) An information processing apparatus including a dialog pair determination unit that determines to which viewing user among a plurality of viewing users a displayed user on a display unit is speaking,
in which the dialog pair determination unit
inputs first image data obtained by photographing the displayed user and second image data obtained by photographing the viewing user, and generates dialog pair determination information indicating a pair of a displayed user and a viewing user forming a dialog pair by analyzing each of the images.

(16) An information processing system including: a transmission apparatus that executes image transmission; and a reception apparatus that receives a transmission image from the transmission apparatus and displays the transmission image on a display unit,
in which the transmission apparatus transmits:
a displayed user image to be displayed on the display unit of the reception apparatus; and
dialog pair determination information indicating which displayed user is speaking to which viewing user among a plurality of viewing users viewing the display unit, and
the reception apparatus
generates dialog pair identification information enabling identification of which displayed user is speaking to which viewing user on the basis of the dialog pair determination information, and outputs the generated dialog pair identification information together with the displayed user, to the display unit.

(17) An information processing method executed in an information processing apparatus,
in which the information processing apparatus includes a display image generation unit that generates a display image for a display unit, and
the display image generation unit generates
dialog pair identification information enabling identification of to which viewing user among a plurality of viewing users a displayed user on the display unit is speaking, and outputs the generated dialog pair identification information together with the displayed user, to the display unit.

(18) A program that causes an information processing apparatus to execute information processing,
in which the information processing apparatus includes a display image generation unit that generates a display image for a display unit, and
the program causes the display image generation unit to execute processing of generating dialog pair identification information enabling identification of to which viewing user among a plurality of viewing users the displayed user on the display unit is speaking, and processing of outputting the generated dialog pair identification information together with the displayed user, to the display unit.

In addition, the series of processing described in the specification can be executed by hardware, software, or a combination of both. In the case of executing the processing by software, it is possible to allow the program recording processing sequences to be installed and executed on a memory within a computer, incorporated in dedicated hardware, or possible to allow the program to be installed and executed on a general-purpose computer capable of executing various types of processing. For example, the program can be recorded in the recording medium in advance. The program can be installed from a recording medium to a computer, or can be received via a network such as a local area network (LAN) and the to be installed in a recording medium such as a built-in hard disk.

Note that the various types of processing described in the specification may be executed in parallel or individually in accordance with the processing capability of the apparatus that executes the processing or in accordance with necessity, in addition to execution in time series following the description. Moreover, in the present description, the system represents a logical set of a plurality of apparatuses, and that all the constituent apparatuses need not be in a same housing.

INDUSTRIAL APPLICABILITY

As described above, according to a configuration of an exemplary embodiment of the present disclosure, it is possible to achieve a configuration enabling identification of to which viewing user the displayed user on the display unit is talking.

Specifically, the configuration includes a display image generation unit that generates dialog pair identification information enabling identification of to which viewing user among the plurality of viewing users the displayed user on the display unit is speaking, and outputs the generated information together with the displayed user, to the display unit. The display image generation unit generates, as the dialog pair identification information, an arrow or an icon, a face surrounding frame or a face side line, a virtual viewpoint background image or the like, directed from the displayed user forming the dialog pair to the viewing user forming the dialog pair, and displays the generated dialog pair identification information together with the displayed user, on the display unit.

With this configuration, it is possible to achieve a configuration enabling identification of to which viewing user the displayed user displayed on the display unit is speaking.

REFERENCE SIGNS LIST 10, 20 Data processing unit
11, 21 Display unit (display)
12, 22 Camera
13, 23 Speaker
30 Network
101 Display unit
102 Camera
103 Speaker
110 Displayed user
121 to 124 Dialog pair identification information
130 Viewing user
151 First location imaging unit
152 First location user information acquisition unit
153 Dialog pair determination unit
154 First location transmission/reception unit
155 First location display unit
161 Second location imaging unit
162 Second location user information acquisition unit
163 Second location transmission/reception unit
164 Second location display image generation unit
165 Second location display unit
201 First location display image generation unit
211 Dialog pair determination unit
251 Front face generation unit
255 Person/background image separation unit
256 Image combining unit
260 Person image correction unit
261 Front face image generation unit
270 Background image correction unit
271 Viewpoint transformation image generation unit
280 Table
281 Display unit
282 Viewing user
283 Displayed user
284 Camera
301, 302 Dialog pair identification information
305 Dialog pair displayed user
306 Dialog pair viewing user
311, 312 Dialog pair identification information
321, 322 Dialog pair identification information
331, 332 Dialog pair identification information
341, 342 Dialog pair identification information
351, 352 Dialog pair identification information
501 CPU
502 ROM
503 RAM
504 Bus
505 Input/output interface
506 Input unit
507 Output unit
508 Storage unit
509 Communication unit
510 Drive
511 Removable medium
521 Imaging unit
522 Display unit

The invention claimed is:

1. An information processing apparatus, comprising:
a display image generation unit configured to:
control a display unit to display image data of a user;
generate dialog pair identification information to identify a viewing user of a plurality of viewing users that is in a conversation with the user,
wherein the viewing user and the user form a dialog pair;
generate a front face image based on a face image of the user; and
control the display unit to display each of the generated front face image and the generated dialog pair identification information.

2. The information processing apparatus according to claim 1, wherein
the information processing apparatus is configured to input the image data of the user via a data transmission/reception unit, and
the display image generation unit is further configured to control the display unit to superimpose the generated dialog pair identification information on the image data of the user.

3. The information processing apparatus according to claim 1, wherein the display image generation unit is further configured to:
   input dialog pair determination information;
   discriminate the user from the viewing user based on the inputted dialog pair determination information; and
   output, to the display unit, the dialog pair identification information based on the discrimination.

4. The information processing apparatus according to claim 3, wherein
   the information processing apparatus is configured to input the dialog pair determination information via a data transmission/reception unit, and
   the display image generation unit is further configured to discriminate the user from the viewing user based on the dialog pair determination information inputted via the data transmission/reception unit.

5. The information processing apparatus according to claim 3, wherein generation of the dialog pair determination information is based on an image of the user and an image of the viewing user.

6. The information processing apparatus according to claim 1, wherein the display image generation unit is further configured to:
   generate, as the dialog pair identification information, an arrow directed from the displayed image data of the user to the viewing user; and
   control the display unit to display the generated arrow in vicinity of the displayed image data of the user.

7. The information processing apparatus according to claim 1, wherein the display image generation unit is further configured to:
   generate an icon as the dialog pair identification information; and
   control the display unit to display the generated icon in vicinity of the displayed image data of the user.

8. The information processing apparatus according to claim 1, wherein the display image generation unit is further configured to control the display unit to display a virtual viewpoint image of a background observed from a viewpoint of the viewing user.

9. The information processing apparatus according to claim 8, wherein the display image generation unit is further configured to:
   sequentially update the viewpoint of the virtual viewpoint image based on a change in the viewpoint, wherein the change in the viewpoint is based on a change of a position of the viewing user; and
   control the display unit to display the virtual viewpoint image having the updated viewpoint.

10. The information processing apparatus according to claim 1, wherein the display image generation unit is further configured to:
   generate, as the dialog pair identification information, a face surrounding frame having an outline inclined in a direction of the viewing user; and
   control the display to display the generated face surrounding frame around the face image of the user.

11. The information processing apparatus according to claim 1, wherein the display image generation unit is further configured to:
   generate, as the dialog pair identification information, a face side line having a line inclined in a direction of the viewing user; and
   control the display unit to display the generated face side line on each side of the face image of the user.

12. The information processing apparatus according to claim 1, wherein the display image generation unit is further configured to:
   generate, as the dialog pair identification information, a mark arranged on a line inclined in a direction of the viewing user; and
   control the display unit to display the generated mark on each side of the face image of the user.

13. The information processing apparatus according to claim 1, wherein the display image generation unit is further configured to:
   generate, as the dialog pair identification information, a shading correction face image having luminance of the face image of the user, wherein a change in the shading correction face image is based on a direction of the viewing user; and
   control the display unit to display the generated shading correction face image.

14. A first information processing apparatus, comprising:
   a dialog pair determination unit configured to:
   input first image data and second image data, wherein
      the first image data is based on photograph of a plurality of viewing users, and
      the second image data is based on photograph of a user;
   determine a viewing user of the plurality of viewing users that is in a conversation with the user;
   generate dialog pair determination information that indicates a dialog pair of the user and the viewing user, wherein the generation of the dialog pair determination information is based on analysis of each of the inputted first image data and the inputted second image data; and
   transmit the generated dialog pair determination information to a second information processing apparatus, wherein
   the second information processing apparatus:
      generates, based on the dialog pair determination information, dialog pair identification information to identify the viewing user that is in the conversation with the user,
      generates a front face image based on a face image of the user, and
      controls a display unit to display each of the generated front face image, the generated dialog pair identification information, and the second image data of the user.

15. An information processing system, comprising:
   a transmission apparatus; and
   a reception apparatus that comprises a display unit, wherein
   the transmission apparatus is configured to transmit:
      an image of a user to be displayed on the display unit; and
      dialog pair determination information that indicates a viewing user of a plurality of viewing users that is in a conversation with the user, and
   the reception apparatus is configured to:
      generate dialog pair identification information to identify the viewing user that is in the conversation with the user, wherein the generation of the dialog pair identification information is based on the dialog pair determination information;
      generate a front face image based on a face image of the user; and control the display unit to display each of the generated front face image, the generated dialog pair identification information, and the image of the user.

16. An information processing method, comprising:

controlling a display unit to display image data of a user;

generating dialog pair identification information to identify a viewing user of a plurality of viewing users that is in a conversation with the user, wherein the viewing user and the user form a dialog pair;

generating a front face image based on a face image of the user; and controlling the display unit to display each of the generated front face image and the generated dialog pair identification information.

17. A non-transitory computer-readable medium having stored thereon computer-executable instructions that, when executed by a processor, cause the processor to execute operations, the operations comprising:

controlling a display unit to display image data of a user;

generating dialog pair identification information to identify a viewing user of a plurality of viewing users that is in a conversation with the user, wherein the viewing user and the user form a dialog pair;

generating a front face image based on a face image of the user; and controlling the display unit to display each of the generated front face image and the generated dialog pair identification information.

18. An information processing apparatus, comprising:

a display image generation unit configured to:

control a display unit to display image data of a user;

generate, as dialog pair identification information, a face surrounding frame to identify a viewing user of a plurality of viewing users that is in a conversation with the user, wherein the viewing user and the user form a dialog pair, and the face surrounding frame has an outline inclined in a direction of the viewing user; and control the display unit to display the generated face surrounding frame around a face image of the user and the generated dialog pair identification information.

* * * * *